(12) United States Patent
Shinohara et al.

(10) Patent No.: US 8,400,585 B2
(45) Date of Patent: Mar. 19, 2013

(54) SURFACE LIGHT SOURCE DEVICE AND LIQUID CRYSTAL DISPLAY DEVICE

(75) Inventors: Masayuki Shinohara, Nagaokakyo (JP); Yasuhiro Tanoue, Otsu (JP); Takako Ishikawa, Kusatsu (JP); Yoshihiro Ueno, Kusatsu (JP)

(73) Assignee: OMRON Corporation, Kyoto (JP)

( * ) Notice: Subject to any disclaimer, the term of this patent is extended or adjusted under 35 U.S.C. 154(b) by 175 days.

(21) Appl. No.: 13/003,324

(22) PCT Filed: Jul. 8, 2009

(86) PCT No.: PCT/JP2009/003184
§ 371 (c)(1),
(2), (4) Date: Apr. 8, 2011

(87) PCT Pub. No.: WO2010/004745
PCT Pub. Date: Jan. 14, 2010

(65) Prior Publication Data
US 2011/0187967 A1    Aug. 4, 2011

(30) Foreign Application Priority Data
Jul. 10, 2008  (JP) ................................. 2008-180147

(51) Int. Cl.
*G02F 1/1335* (2006.01)
(52) U.S. Cl. ............... 349/65; 349/61; 349/62; 349/63; 349/67; 349/68
(58) Field of Classification Search .............. 349/61, 349/62, 63, 65, 67, 68, 69, 70
See application file for complete search history.

(56) References Cited

U.S. PATENT DOCUMENTS

| 7,452,119 B2* | 11/2008 | Onishi et al. ............ 362/620 |
| 7,528,898 B2* | 5/2009 | Hashimoto ............... 349/58 |
| 2011/0310332 A1* | 12/2011 | Boyd et al. ............... 349/65 |

FOREIGN PATENT DOCUMENTS

| JP | 5-88174 A | 4/1993 |
| JP | 2004-95390 A | 3/2004 |
| JP | 2008-15467 A | 1/2008 |

OTHER PUBLICATIONS

International Search Report w/translation from PCT/JP2009/003184 dated Oct. 13, 2009 (2 pages).
Written Opinion from PCT/JP2009/003184 dated Oct. 13, 2009 (3 pages).

* cited by examiner

*Primary Examiner* — Jennifer Doan
(74) *Attorney, Agent, or Firm* — Osha Liang LLP

(57) ABSTRACT

A surface light source device includes a point source of light and a light guide plate causing light from the point source of light introduced from a light incident end face and emitted from a light emission surface to outside. The light guide plate is formed of a light introducing portion provided at an end of a light guide plate body. The point source of light is placed facing the light incident end face positioned at an end face of the light introducing portion. Along a region of the light introducing portion adjacent to the light guide plate body, a directivity converting portion is provided. The directivity converting portion is configured by arranging V-grooved directivity conversion patterns in an arc shape. A region of the light introducing portion has a thickness equal to that of the light guide plate body and has a surface positioned in the same plane.

19 Claims, 55 Drawing Sheets

(a)
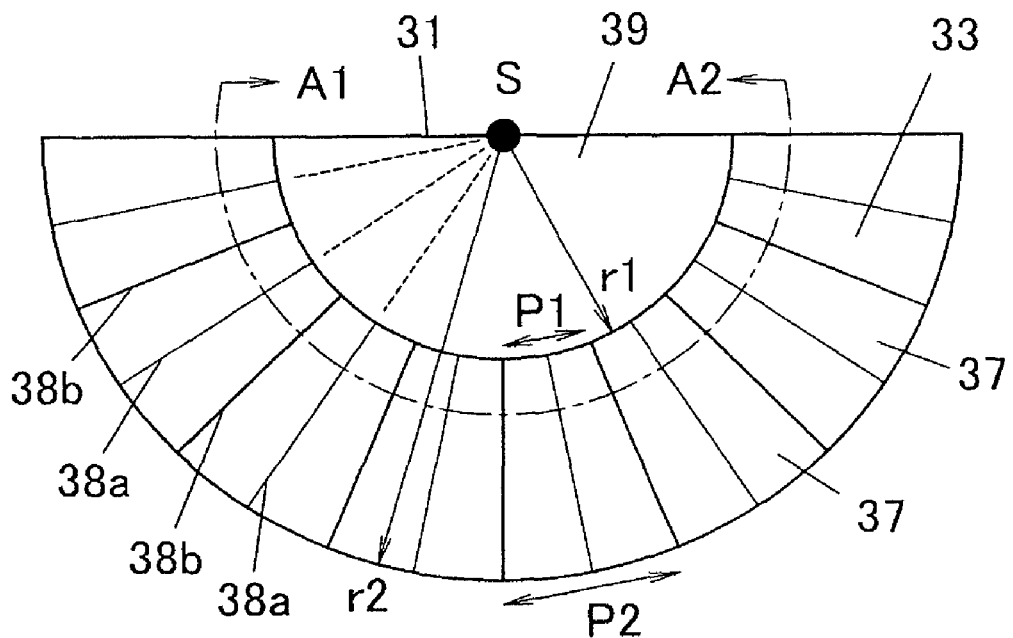
(b)
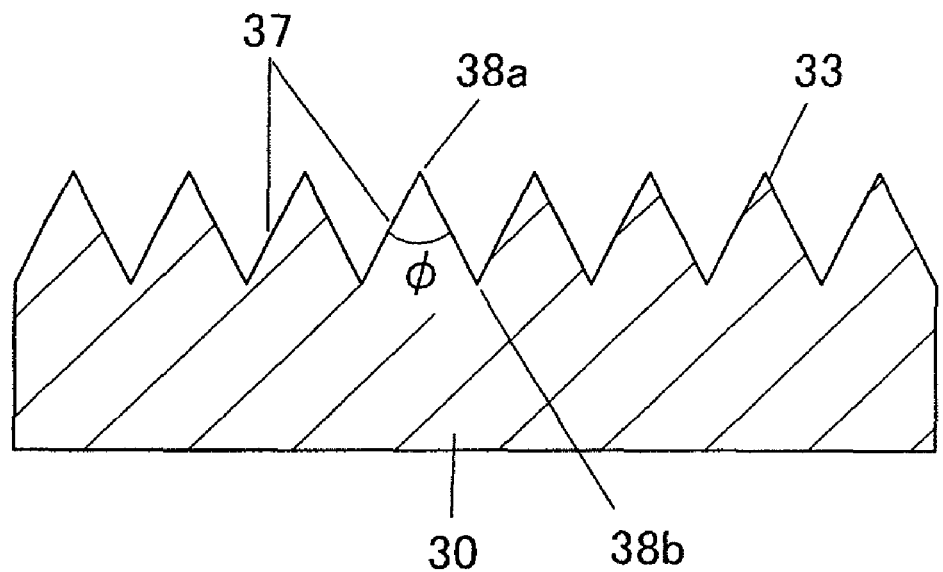
Fig.10

(a)
(b)
(c)
(d)
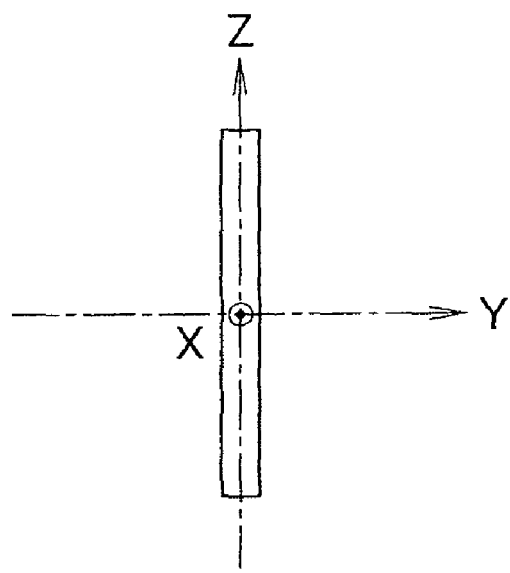
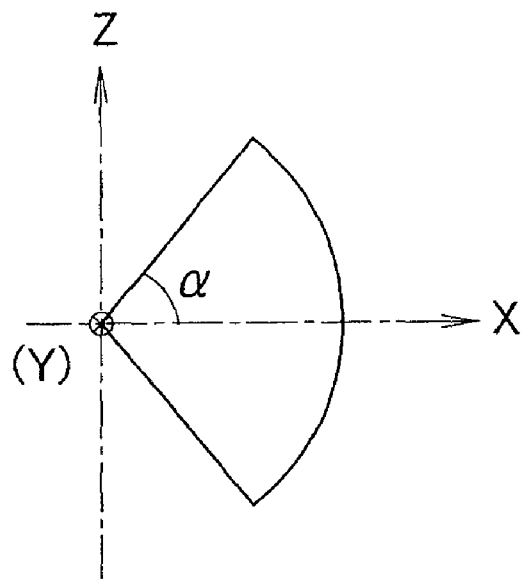
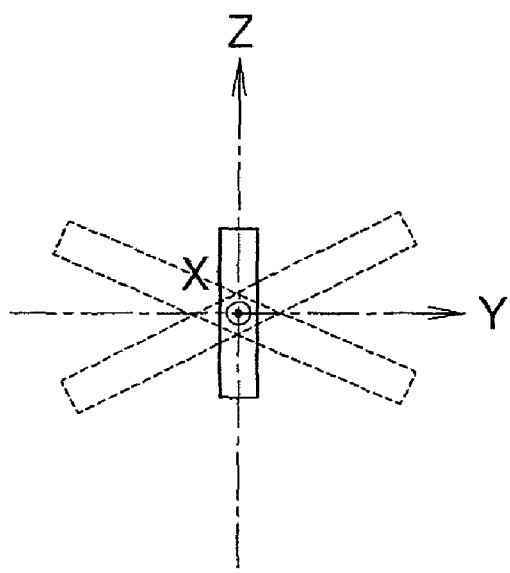
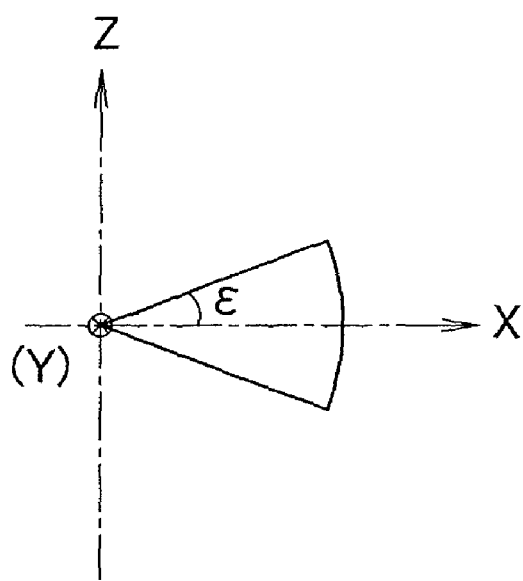
Fig.12

(a)
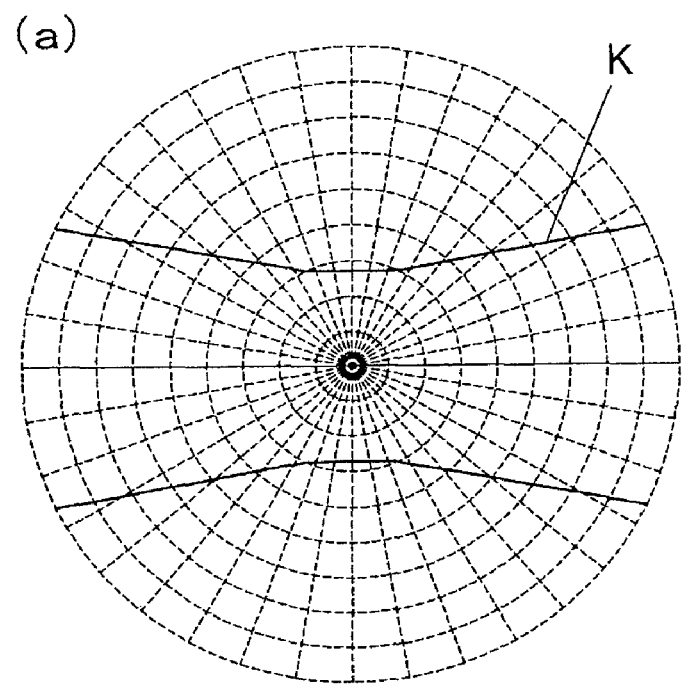
(b)
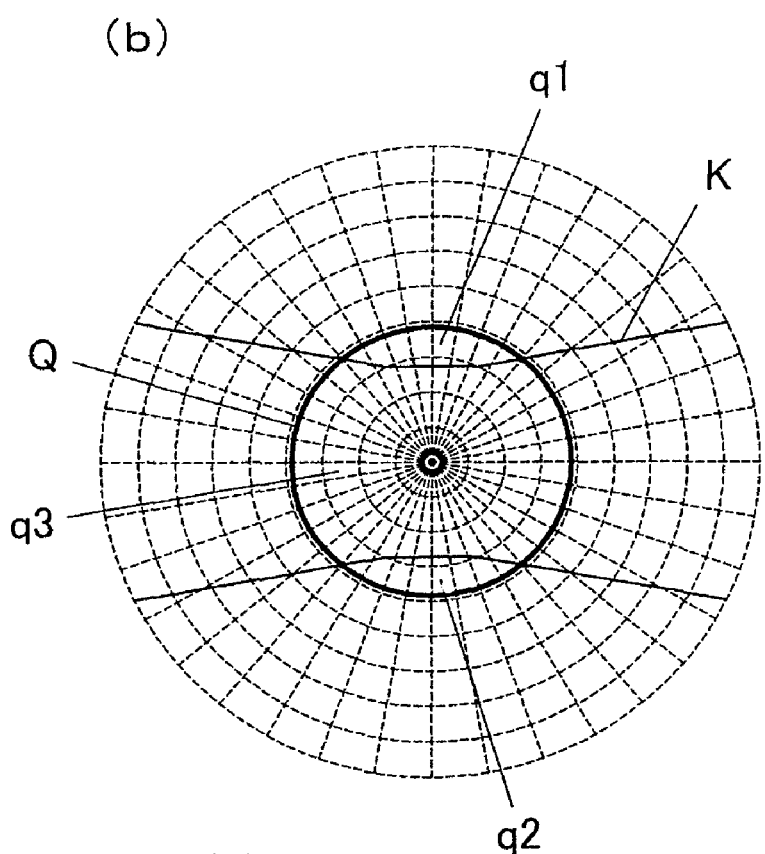
Fig.13

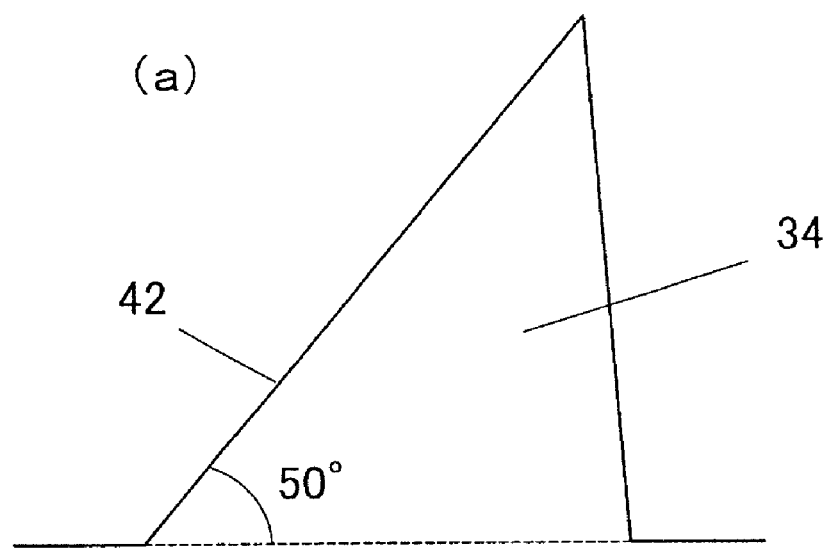
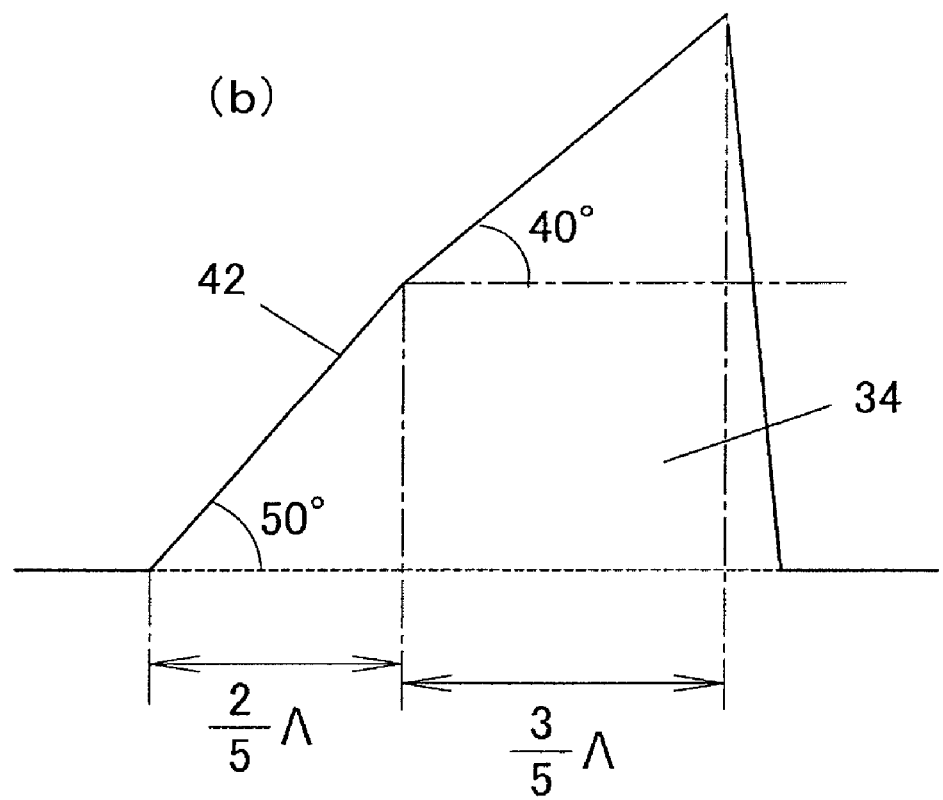
Fig.22

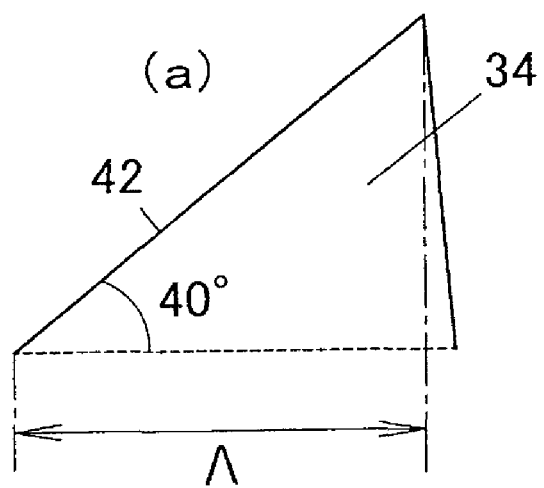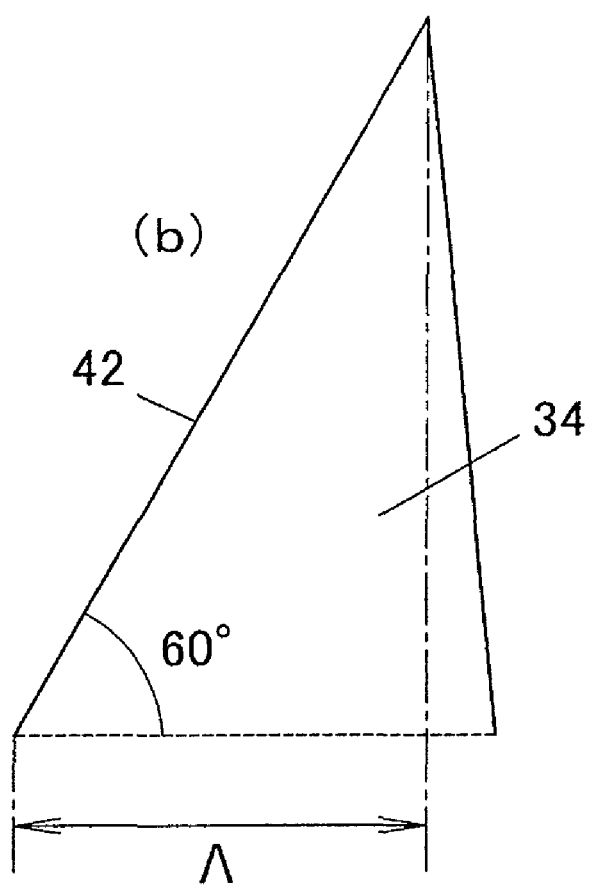
Fig.23

(a)
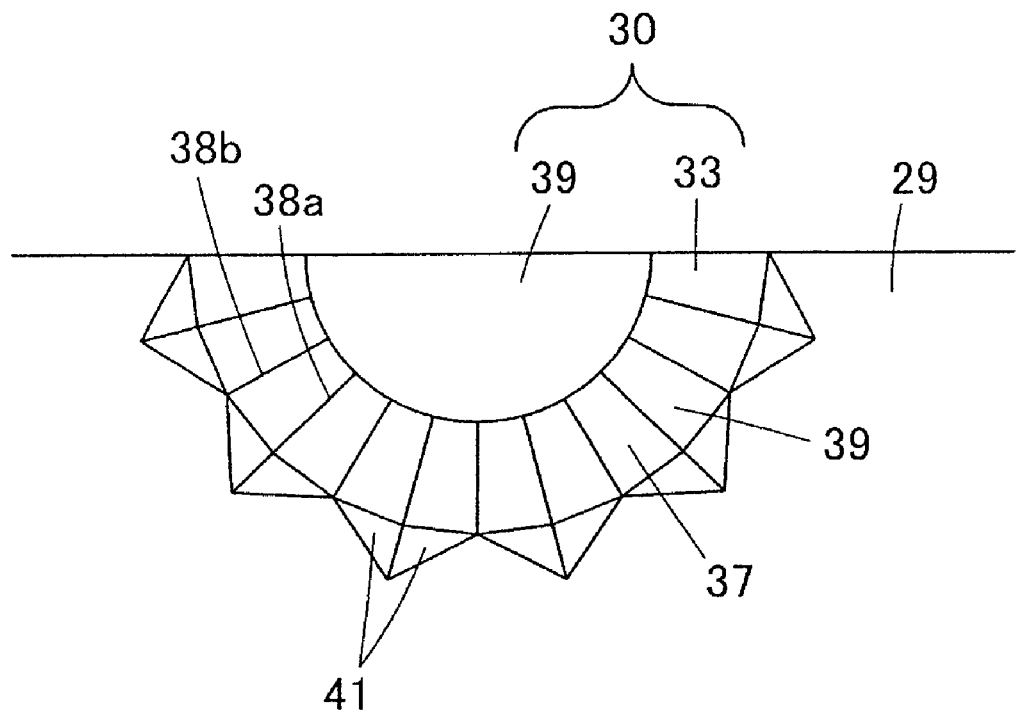
(b)
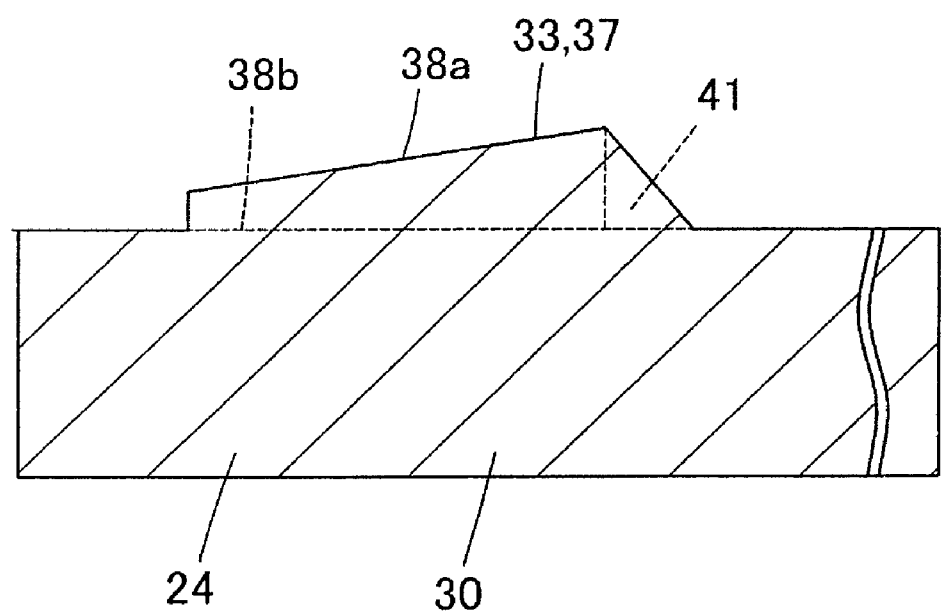
Fig.33

(a)
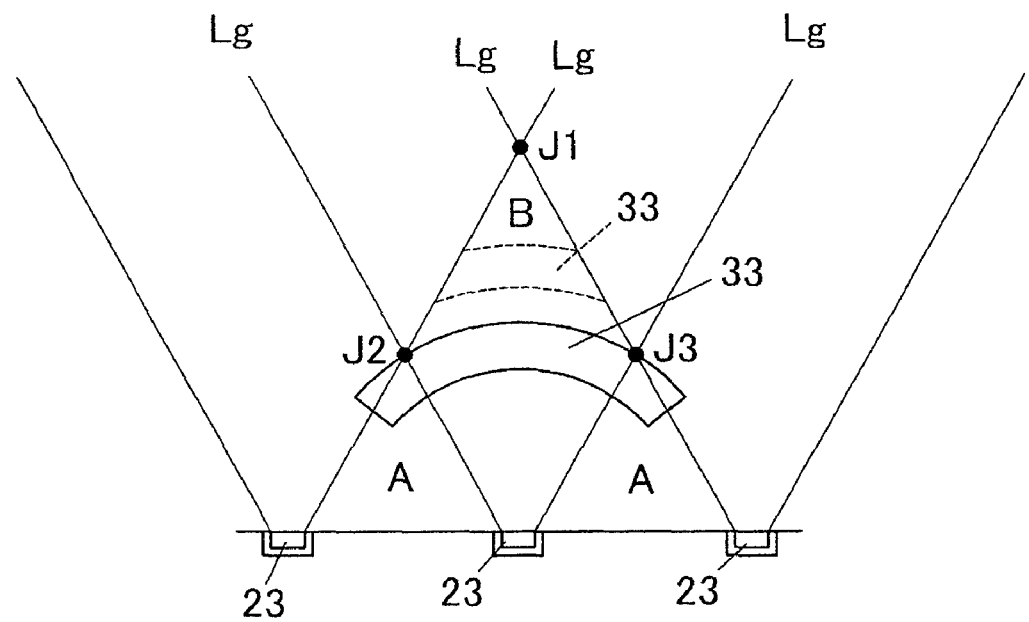
(b)
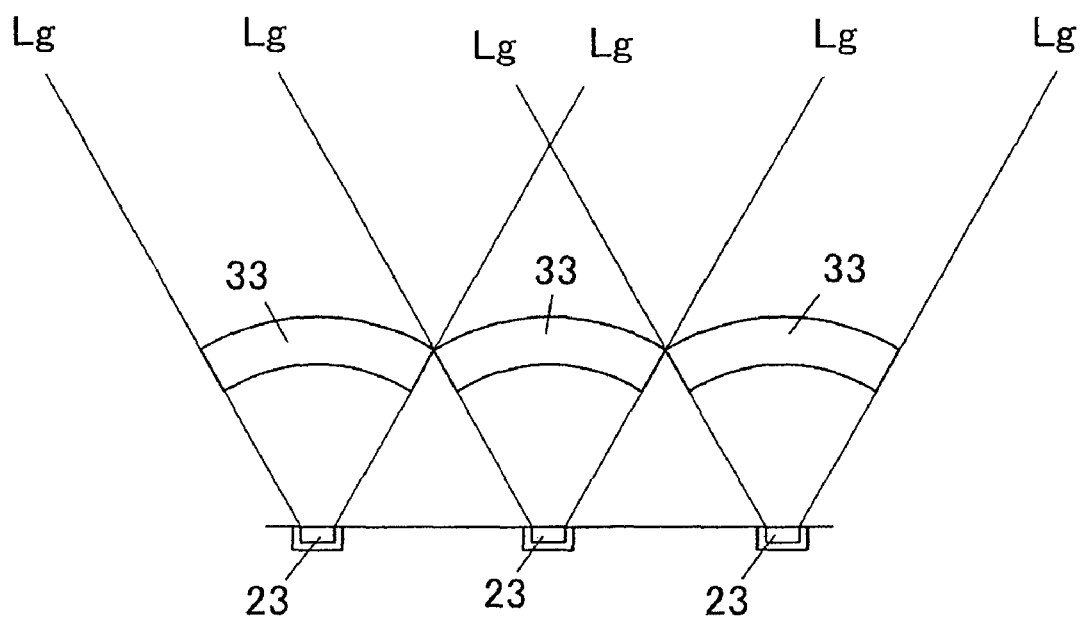
Fig.38

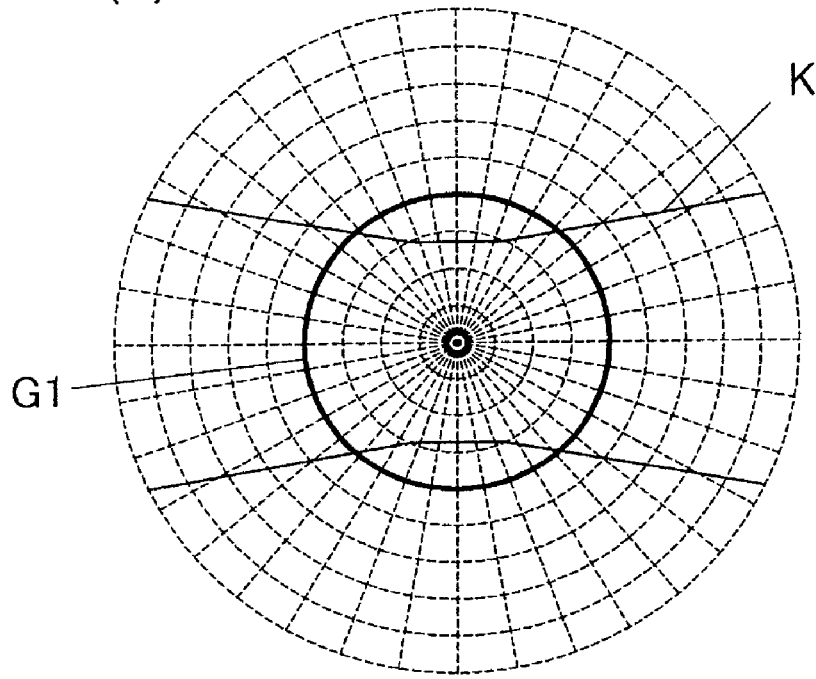
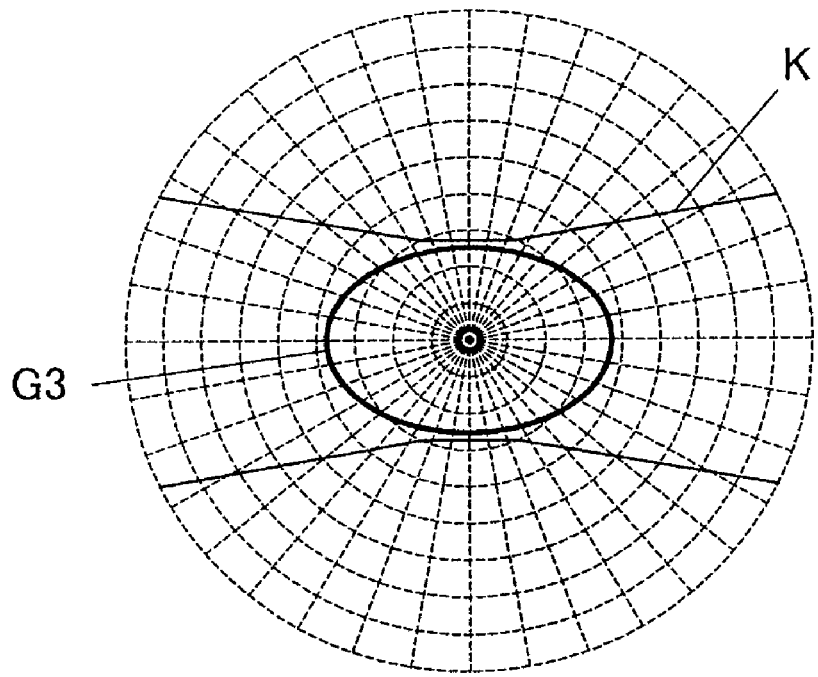
Fig.42

(a)
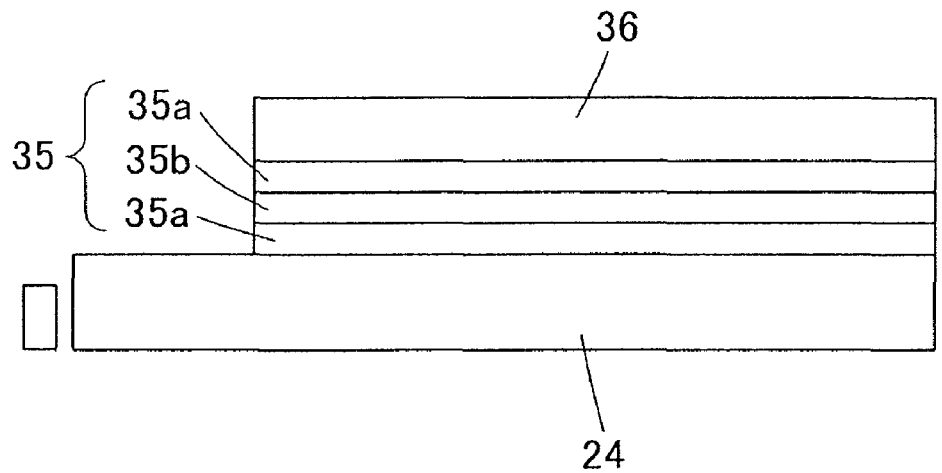
(b)
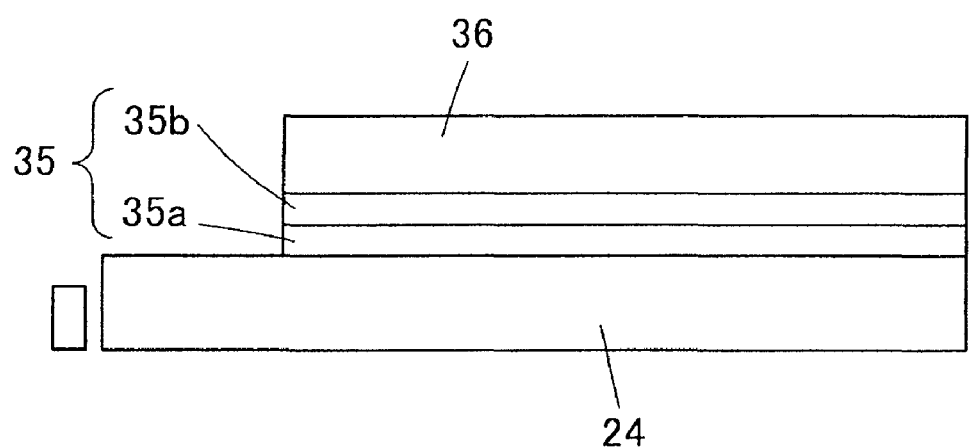
(c)
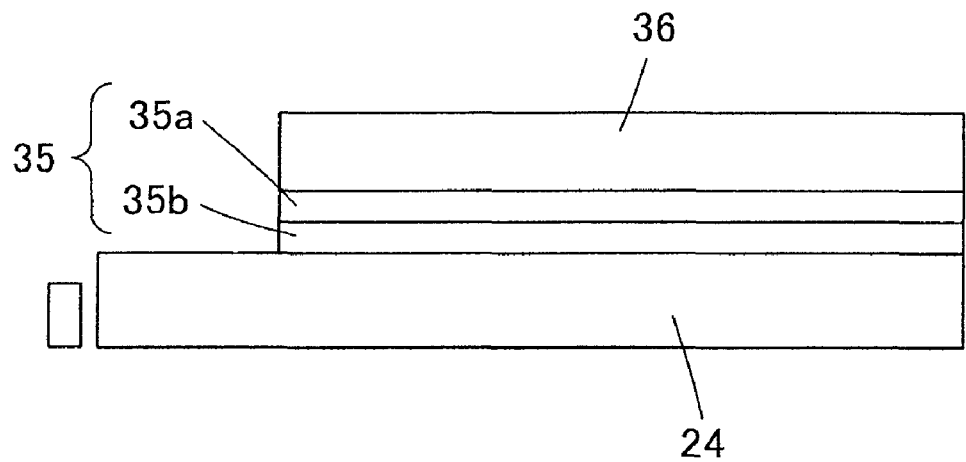
Fig.44

(a)
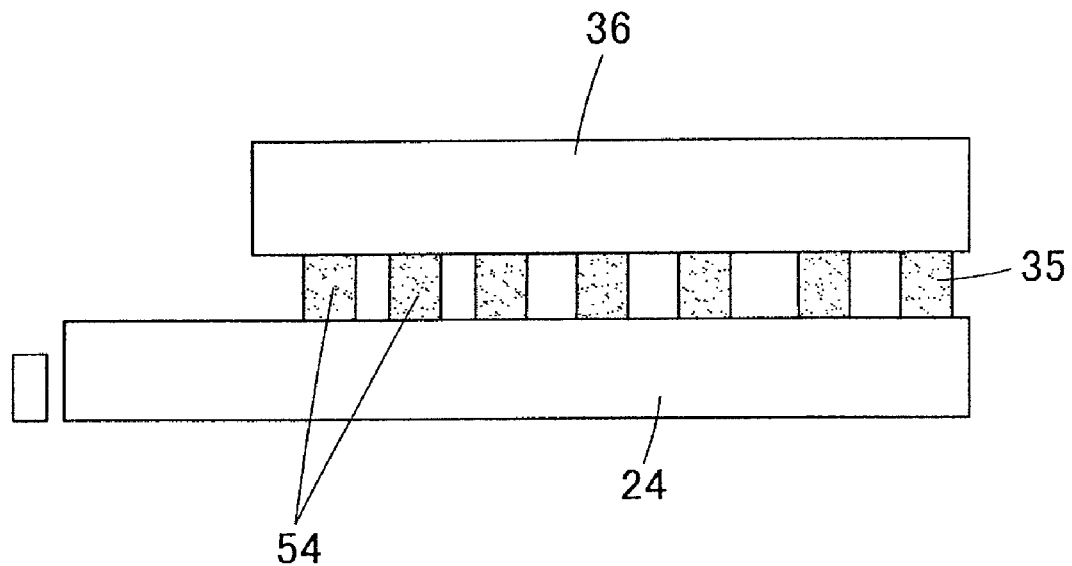
(b)
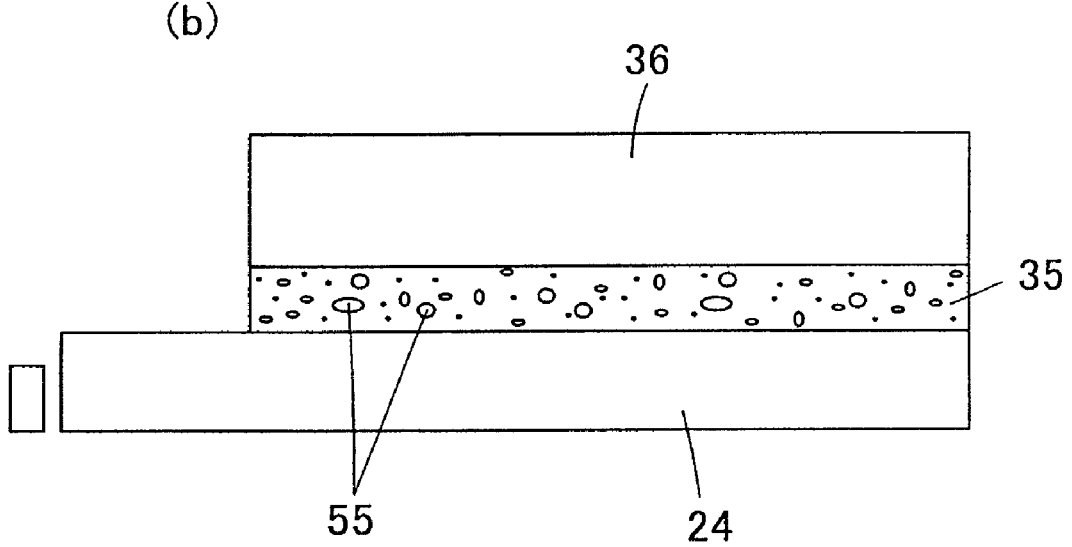
Fig.45

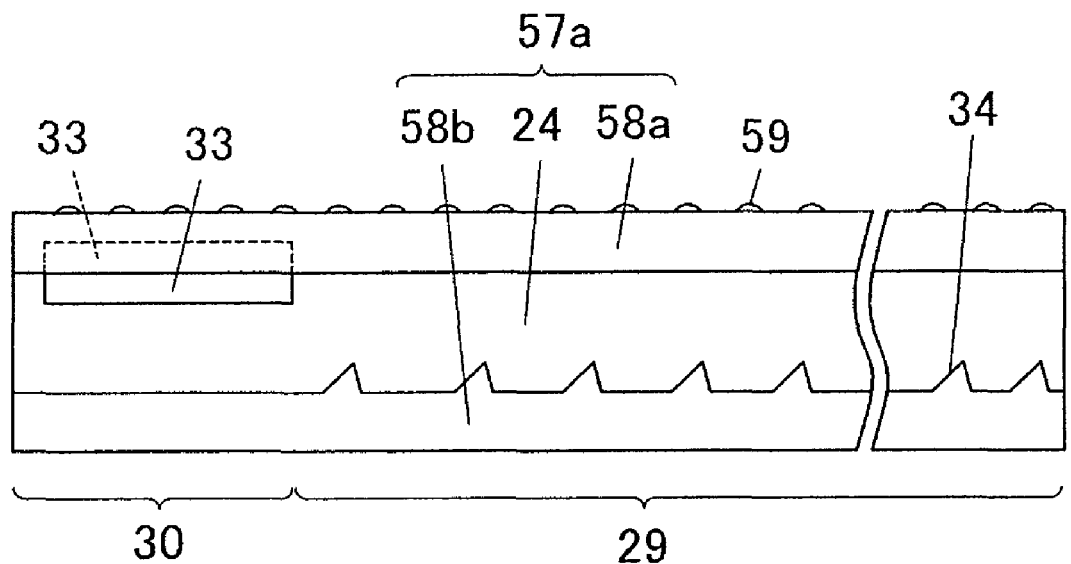
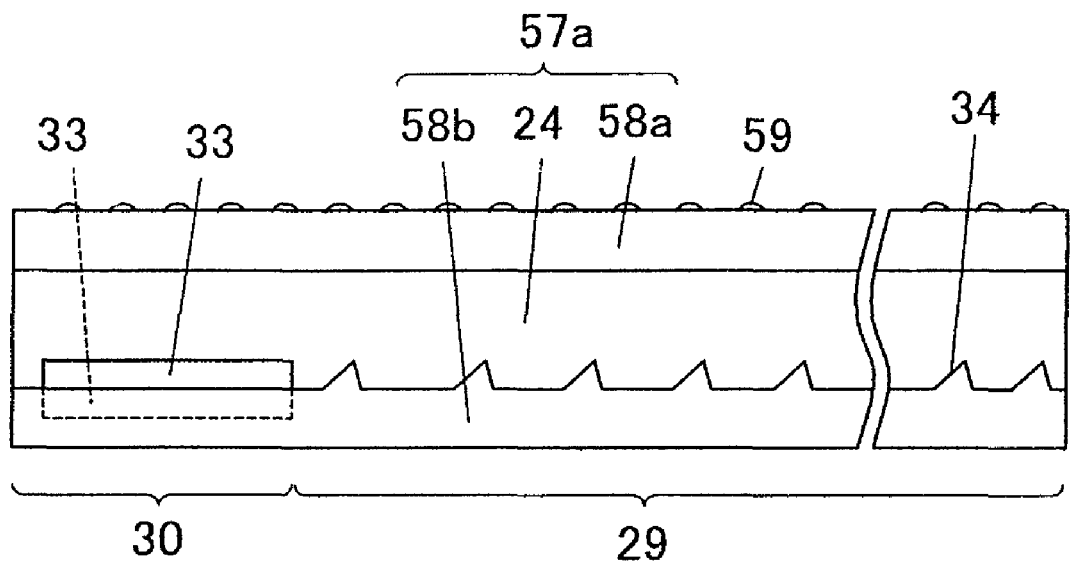
Fig.47

SURFACE LIGHT SOURCE DEVICE AND LIQUID CRYSTAL DISPLAY DEVICE

TECHNICAL FIELD

The one or more embodiments of the present invention relate to surface light source devices and liquid crystal display devices and, more specifically, to a surface light source device with a light guide plate that can be slimmed down and a liquid crystal display device using the surface light source device.

BACKGROUND ART

To slim down a backlight used in a liquid crystal display device or the like, it is required to omit an additional sheet, such as a light diffusion sheet, and also reduce the thickness of a light guide plate itself.

However, when the thickness of the light guide plate is reduced, the light guide plate becomes slim like a sheet, and tends to be warped. And, when the light guide plate tends to be warped, assembling a backlight is difficult, and light can be leaked from a warped portion of the light guide plate. Therefore, as a method of preventing warping of the slimmed light guide plate, there is a method of affixing the light guide plate to the back surface of a liquid crystal display panel with an adhesive or the like without interposing an air layer between the light guide plate and the liquid crystal display panel.

An example of a liquid crystal display device with a light guide plate bonded to the back surface of a liquid crystal display panel is described in Patent Document 1 (Japanese Unexamined Patent Application Publication No. 5-88174), first comparative example (FIG. 3 of Patent Document 1). In this liquid crystal display device 11, as depicted in FIG. 1, an acrylic plate (having a refractive index of 1.49) with both surfaces being smooth is used as a light guide plate 12, and a connection layer 13 (a two-part-curable silicone having a refractive index of 1.51) having a refractive index higher than that of the light guide plate 12 is used to laminate the light guide plate 12 to the back surface of a scattering-type liquid crystal display panel 14 without interposing an air layer therebetween. Also, at a position facing each of both end faces of the light guide plate 12, a light source 15 formed of a cold-cathode tube is located.

In this liquid crystal display device 11, as depicted in FIG. 2(a), a light beam L emitted from the light source 15 and then entering the inside of the light guide plate 12 passes from the light guide plate 12 to a connection layer 13, and further enters the liquid crystal display panel 14 for scattering at a pixel in a scattered state (a whitish state), thereby being outputted forward to cause the pixel to emit light.

However, in this liquid crystal display device, because the refractive index of the connection layer 13 is higher than the refractive index of the light guide plate 12, as a light beam L indicated by a dotted line in FIG. 2(a), total reflection of light does not occur at an interface between the connection layer 13 and the light guide plate 12. Therefore, the light beam L entering the light guide plate 12 is not guided inside the light guide plate 12, and ends up in being emitted from the liquid crystal display panel 14 near the light source 15. As a result, as depicted in a luminance distribution of FIG. 2(b), a portion near any of the light sources 15 has a high luminance of light emission and is bright, but a portion away from any of the light sources 15 (that is, a center portion between the light sources 15) has a low luminance of light emission and is dark.

To solve unevenness in luminance of light emission as described above, in a first embodiment (FIG. 1 of Patent Document 1) described in Patent Document 1, as depicted in FIG. 3, a thin film 16 having a refractive index lower than that of the light guide plate 12 is partially formed on the surface of the light guide plate 12. Also, the area rate of the thin film 16 at a portion near any of the light sources 15 is set large, and the area rate of the thin film 16 at a portion away from any of the light sources 15 is set small. Furthermore, the light guide plate 12 having the thin film 16 formed thereon is laminated to the back surface of the liquid crystal display panel 14 via the connection layer 13 having a refractive index higher than that of the light guide plate 12. Here, the light guide plate 12 is formed of an acrylic plate having a refractive index of 1.49, a two-part-curable silicone having a refractive index of 1.41 is used as the thin film 16, and a two-part-curable silicone having a refractive index of 1.51 is used as the connection layer 13.

In the first embodiment of Patent Document 1, because the thin film 16 is formed on the surface of the light guide plate 12, light inside the light guide plate 12 is totally reflected off the interface between the light guide plate 12 and the thin film 16, thereby being guided inside the light guide plate 12. Moreover, because the area rate of the thin film 16 is large at a portion near any of the light sources 15, the ratio of the light passing through gaps between each thin film 16 to be emitted from the liquid crystal display panel 14 is small. Because the area rate of the thin film 16 is small at a portion away from any of the light sources 15 with a small amount of light reached, the ratio of light passing through gaps between each thin film 16 to be emitted from the liquid crystal display panel 14 is large. As a result, the luminance of light emission can be made uniform over the entire display surface of the liquid crystal display device.

Furthermore, in a second embodiment (FIG. 2 of Patent Document 1) described in Patent Document 1, as depicted in FIG. 4, asperities 17 in a prism shape are partially formed on the surface of the light guide plate 12, and the degree of surface roughness of the asperities 17 is made low at a portion near any of the light sources 15, and the degree of surface roughness of the asperities 17 is made high at a portion away from any of the light sources 15. Also, the light guide plate 12 having the asperities 17 formed thereon is laminated to the back surface of the liquid crystal display panel 14 via the connection layer 13 having a refractive index lower than that of the light guide plate 12. Here, the light guide plate 12 is formed of an acrylic plate having a refractive index of 1.49, and a two-part-curable silicone having a refractive index of 1.41 is used as the connection layer 13.

In the second embodiment of Patent Document 1, because the refractive index of the connection layer 13 is lower than the refractive index of the light guide plate 12, in a smooth region on the surface of the light guide plate 12, light inside the light guide plate 12 is trapped inside the light guide plate 12 due to total reflection, and is guided inside the light guide plate 12. On the other hand, light entering the asperities 17 is scattered by the asperities 17, thereby passing though the inside of the connection layer 13 and further being scattered at a pixel of the liquid crystal display panel 14 in a scattered state for light emission. Moreover, because the degree of surface roughness of the asperities 17 is low at a portion near any of the light sources 15, the ratio of light scattered at the asperities 17 and emitted from the liquid crystal display panel 14 is small. Because the degree of surface roughness of the asperities 17 is high at a portion away from any of the light sources 15 with a small amount of light reached, the ratio of light scattered at the asperities 17 and emitted from the liquid crystal display panel 14 is large. As a result, the luminance of light emission can be made uniform over the entire display surface of the liquid crystal display device.

In the first embodiment of Patent Document 1, the directivity characteristic of light inside a plane perpendicular to the light guide plate 12 is depicted in FIG. 5(a). The spread (directivity characteristic) of light immediately before entering the light guide plate 12 is ±90°, but because the refractive index of the light guide plate 12 is ng=1.49, the spread of light immediately after entering the light guide plate 12 is represented as $$\pm\arcsin(1/1.49)=\pm42.2°.$$

On the other hand, a critical angle of total reflection at the interface between the light guide plate 12 and the thin film 16 is represented as $$\pm\arcsin(1.41/1.49)=71.1°.$$

This critical angle of 71.1° corresponds to 18.9° when measured from a horizontal direction.

Thus, among light beams entering the inside of the light guide plate 12 with the spread of ±42.2°, light beams within a range of 18.9° to 42.2° and light beams within a range of −18.9° to −42.2° when measured from a horizontal direction (light beams within a range with broken lines in FIG. 5(b)) pass through the thin film 16 without being reflected off the thin film 16 when entering the thin film 16. In this manner, light beams within a range with broken lines in FIG. 5(b) pass through the thin film 16 near the light sources 15 and are not guided inside the light guide plate 12. Therefore, light with a sufficient amount cannot be guided away from the light sources 15, and the luminance of light emission cannot be sufficiently made uniform.

Also in the second embodiment of Cited Reference 1, the refractive index of the connection layer 13 is 1.41, which is equal to that of the thin film 16 in the first embodiment. Therefore, among light beams entering the inside of the light guide plate 12 with the spread of ±42.2°, light beams within a range of 18.9° to 42.2° and light beams within a range of −18.9° to −42.2° when measured from a horizontal direction pass through the connection layer 13 without being reflected off a smooth region of the light guide plate 12. In this manner, also in the second embodiment, the light beams within the range with the broken lines in FIG. 5(b) pass through the connection layer 13 near the light sources 15 and are not guided inside the light guide plate 12. Therefore, light with a sufficient amount cannot be guided away from the light sources 15, and the luminance of light emission cannot be sufficiently made uniform.

Note that in the specification, to represent the directivity characteristic and the directivity spread of light, a conventional notation may be used. For example, instead of representing the spread of light as described above, that is, −42.2° to +42.2° (that is, −42.2≦χ≦+42.2 where the spread of light is taken as χ), the spread of light may be represented simply as ±42.2°.

[Patent Document 1] Japanese Unexamined Patent Application Publication No. 5-88174

DISCLOSURE OF THE INVENTION

One or more embodiments of the present invention has been made in view of the technical problem as described above, and has an object of providing a surface light source device in which the spread of directivity of light entering a light guide plate in a thickness direction of the light guide plate is narrowed to allow light to be guided inside the light guide plate, and a liquid crystal display device using the surface light source device.

A first surface light source device according to one or more embodiments of the present invention includes a point source of light and a light guide plate provided at a position facing the point source of light and causing light from the point source of light to be introduced from a light incident end face and be emitted from a light emission surface to outside, wherein the light guide plate has a light guide substrate formed of a transparent or translucent material provided with a directivity converting portion and light emitting means, the light guide substrate is integrally configured with a light introducing portion provided at a position facing the point source of light and a light guide plate body including the light emission surface from which light introduced from the light introducing portion is emitted to outside, the light guide plate body has a thickness equal to or larger than a minimum thickness of the light introducing portion in the light guide substrate, on a surface of the light guide substrate on a light emission side or a surface thereof on a side opposite thereto, the light introducing portion is flatly continuous from a portion of the light introducing portion having a thickness equal to a thickness of the light guide plate body toward an end edge of the light introducing portion side of the light guide plate body, or is continuous with an inclined surface from a portion of the light introducing portion having a thickness smaller than the thickness of the light guide plate body toward the end edge of the light introducing portion side of the light guide plate body, the directivity converting portion traps light entering the light introducing portion from the light incident end face inside the light guide plate by narrowing a directivity spread of the light entering the light introducing portion in a thickness direction of the light guide substrate, and is formed on a surface of the light introducing portion on a light emission side or a surface thereof on a side opposite thereto, and the light emitting means emits the light trapped inside the light guide plate body from the light emission surface to outside, and is formed in the light guide plate body. Note that the light introducing portion and the light guide plate body are integrally configured, which means that the light introducing portion and the light guide plate body are connected as one and no air layer is present between the light introducing portion and the light guide plate body. If the light introducing portion and the light guide plate body are separated apart from each other, they are "integrally configured" as long as they are bonded with an adhesive. Also, the light guide substrate is a base material for providing the directivity converting portion and the light emitting means, and the light guide substrate is assumed to be a material without having a directivity converting portion or light emitting means formed thereon.

In the first surface light source device of one or more embodiments of the present invention, light entering the inside of the light introducing portion can be fed to the light guide plate body after a directivity spread in a thickness direction of the light guide plate is narrowed by the directivity converting portion. With this, inside the light guide plate body, light not reflected off the light emitting means and leaking to the outside of the light guide plate body can be reduced. In particular, even when a layer having a refractive index lower than the refractive index of the light guide plate body is provided on the light emission surface of the light guide plate body, light not reflected off the light emitting means and leaking from the interface between the light guide plate body and the low refractive index layer can be reduced. As a result, light can be guided to a position away from the point source of light, and luminance of light emission of the surface light source device can be made uniform.

A second surface light source device according to one or more embodiments of the present invention includes a point source of light and a light guide plate provided at a position facing the point source of light and causing light from the point source of light to be introduced from a light incident end face and be emitted from a light emission surface to outside, wherein the light guide plate has a light guide substrate formed of a transparent or translucent material provided with a directivity converting portion and light emitting means, the light guide substrate is integrally configured with a light introducing portion provided at a position facing the point source of light and a light guide plate body including the light emission surface from which light introduced from the light introducing portion is emitted to outside, the light guide plate body has a thickness equal to or larger than a minimum thickness of the light introducing portion in the light guide substrate, on a surface of the light guide substrate on a light emission side or a surface thereof on a side opposite thereto, the light introducing portion is flatly continuous from a portion of the light introducing portion having a thickness equal to a thickness of the light guide plate body toward an end edge of the light introducing portion side of the light guide plate body, or is continuous with an inclined surface from a portion of the light introducing portion having a thickness smaller than the thickness of the light guide plate body toward the end edge of the light introducing portion side of the light guide plate body, the directivity converting portion is configured of a plurality of patterns extending from a side close to the point source of light to a direction away from the point source of light, and is formed in a region of the light introducing portion parallel to the light emission surface, and the light emitting means emits the light trapped inside the light guide plate body from the light emission surface to outside, and is formed in the light guide plate body. Note that, also in the second surface light source device, the light introducing portion and the light guide plate body are integrally configured, which means that the light introducing portion and the light guide plate body are connected as one and no air layer is present between the light introducing portion and the light guide plate body. If the light introducing portion and the light guide plate body are separated apart from each other, they are "integrally configured" as long as they are bonded with an adhesive. Also, the light guide substrate is a base material for providing the directivity converting portion and the light emitting means, and the light guide substrate is assumed to be a material without having a directivity converting portion or light emitting means formed thereon.

In the second surface light source device of one or more embodiments of the present invention, light entering the inside of the light introducing portion and spreading centering on the position of the point source of light is reflected off the pattern of the directivity converting portion, thereby changing a directivity characteristic, and can be fed to the light guide plate body after a directivity spread in a thickness direction of the light guide plate is narrowed. With this, inside the light guide plate body, light not reflected off the light emitting means and leaking to the outside of the light guide plate body can be reduced. In particular, even when a layer having a refractive index lower than the refractive index of the light guide plate body is provided on the light emission surface of the light guide plate body, light not reflected off the light emitting means and leaking from the interface between the light guide plate body and the low refractive index layer can be reduced. As a result, light can be guided to a position away from the point source of light, and luminance of light eission of the surface light source device can be made uniform.

In an embodiment of the first or second surface light source device of one or more embodiments of the present invention, the directivity converting portion is configured of a plurality of V-grooved directivity conversion patterns. In this embodiment, light inside the light introducing portion can be reflected off the V-grooved directivity conversion patterns, thereby inclining the directivity characteristic. With this, the directivity spread of light inside the light introducing portion can be narrowed in the thickness direction of the light guide plate.

Furthermore, in the above embodiment, in a cross section perpendicular to a ridgeline of a mountain-shaped portion formed by adjacent ones of the directive conversion patterns, a vertical angle of the mountain-shaped portion is preferably equal to or larger than 107° and equal to or smaller than 154°. With the vertical angle of the mountain-shaped portion being equal to or larger than 107° and equal to or smaller than 154°, excellent directivity conversion efficiency and light guide efficiency of the light guide plate can be obtained.

In another embodiment of the first or second surface light source device of one or more embodiments of the present invention, the directivity converting portion is configured of a plurality of directivity conversion patterns radially arranged centering on the point source of light or a position near the point source of light. Light emitted from the point source of light and reaching the light emitting means has a feature of a narrow directivity spread in a plane parallel to the light emission surface of the light guide plate. In this embodiment, the directivity conversion patterns are radially arranged centering on the point source of light or a position near the point source of light, and the light traveling direction and the plane of the directivity conversion patterns are approximately parallel to each other. Therefore, a directivity conversion spreading in the thickness direction tends not to occur, and light leaking due to the directivity conversion patterns is decreased.

In still another embodiment of the first or second surface light source device of one or more embodiments of the present invention, when viewed from a direction perpendicular to the light emission surface of the light guide plate, an angle formed between a direction extending from an arbitrary point of an edge on a side of the directivity converting portion near the point source of light to one end of a light emission window of the point source of light and a direction extending from the arbitrary point to a center of the light emission window is equal to or smaller than 32°, and an angle formed between a direction extending from the arbitrary point of the edge on the side of the directivity converting portion near the point source of light to another end of the light emission window of the point sources of light and a direction extending from the arbitrary point to the center of the light emission window is equal to or smaller than 32°. According to this embodiment, excellent directivity conversion efficiency and light guide efficiency of the light guide plate can be obtained.

In still another embodiment of the first or second surface light source device of one or more embodiments of the present invention, in the surface light source device having a plurality of the point sources of light arranged along an end edge of the light guide plate, and when a direction passing through a center of any one of the point sources of light and being perpendicular to the end edge of the light guide plate when viewed in a direction perpendicular to the light emission surface of the light guide plate is defined as an X axis, and a Y axis is defined along the end edge of the light guide plate, the directivity converting portion corresponding to the point source of light is positioned inside a region simultaneously satisfying the following three equations:

$$X > 0$$

$$X \leq \{-2Y + (2P - W)\}/(2 \tan \alpha)$$

$$X \leq \{2Y + (2P - W)\}/(2 \tan \alpha)$$

(where P: a distance between the point sources of light; W: a width of the light emission window of the point source of light; and α: an angle represented by α=arcsin (1/ng), where a refractive index of the light guide plate is ng). According to this embodiment in the surface light source device in which plurality of point sources of light are arranged along the end edge of the light guide plate and the directivity converting portion is provided at the front of each of the point sources of light, light from another point source of light not relevant to the directivity converting portion can be prevented from entering it for reflection or passage, and leakage of light from the directivity converting portion or the light introducing portion can be reduced.

In still another embodiment of the first surface light source device of one or more embodiments of the present invention, the light introducing portion takes an inclined surface inclined from a surface of the light introducing portion to a surface of the light guide plate body as the directivity converting portion, and the inclined surface is formed in a region of the light introducing portion adjacent to the light guide plate body on a surface on a light emission surface side of the light guide plate or an opposite surface, and a region of the light introducing portion other than the region where the inclined surface is formed has a thickness thinner than a thickness of the light guide plate body.

In this embodiment, the inclined surface is formed at the edge of the light introducing portion so that the thickness is thin on a light introducing portion side. Therefore, by reflecting light entering the inside of the light introducing portion off the inclined surface, the directivity spread in the thickness direction of the light guide plate can be narrowed, and the light with the narrowed directivity spread can be fed to the light guide plate body. With this, inside the light guide plate body, light not reflected off the light emitting means and leaking to the outside of the light guide plate body can be reduced. In particular, even when a layer having a refractive index lower than the refractive index of the light guide plate body is provided on the light emission surface of the light guide plate body, light not reflected off the light emitting means and leaking from the interface between the light guide plate body and the low refractive index layer can be reduced. As a result, light can be guided to a position away from the point source of light, and luminance of light emission of the surface light source device can be made uniform.

In still another embodiment of the first or second surface light source device of one or more embodiments of the present invention, a surface of the light guide plate on a light emission surface side and/or a surface thereof opposite thereto is covered so as to be in intimate contact with a low refractive index layer having a refractive index smaller than a refractive index of the light guide plate. As in this embodiment, when the surface of the light guide plate is covered with a low refractive index layer, if no directivity converting portion is provided, light of the point source of light entering the inside of the light guide plate passes through the low refractive index layer for diffusion, which tends to worsen in-plane luminance unevenness of the liquid crystal display screen. By contrast, in this embodiment, because the directivity converting portion is provided to the light introducing portion, directivity of light entering the light guide plate can be narrowed, leakage of light which would have passed to the low refractive index layer if no directivity converting portion is provided can be reduced, and in-plane luminance unevenness of the liquid crystal display screen can be mitigated.

In still another embodiment of the first or second surface light source device of one or more embodiments of the present invention, the light emitting means of the light guide plate is formed on a surface of the light guide plate on a side opposite to the light emission surface with a pattern having at least one flat surface on the light incident end face side, and in the light emitting means, an average tilt angle θx* of angles each formed between the flat surface and a surface parallel to the light emission surface of the light guide plate is equal to or larger than 35° and equal to or smaller than 70°, and a tilt angle formed between the flat surface of each light emitting means and the surface parallel to the light emission surface of the light guide plate is in a range of θx*±10°. According to this embodiment, the directivity spread of light emitted from the light emission surface of the light guide plate can be set on the order of ±10° to ±20°, and excellent viewability of the liquid crystal display screen can be obtained. Also, by adjusting the average tilt angle θx* in a range of angles equal to or larger than 35° and equal to or smaller than 70°, the peak direction of light emitted from the light emission surface can be adjusted.

A liquid crystal display device according to one or more embodiments of the present invention is formed of the first or second surface light source device, a liquid crystal display panel, and at least one connection layer interposed at least between the light guide plate body of the surface light source device and the liquid crystal display panel and bringing the light guide plate body into intimate contact with the liquid crystal display panel, wherein any of refractive indexes of the connection layers is lower than a refractive index of the light guide plate body.

In the liquid crystal display device of one or more embodiments of the present invention, because the light guide plate body is brought in intimate contact with the liquid crystal display panel via the connection layer, the light guide plate is resistant to warping even if the thickness of the light guide plate is made thin. Therefore, it is possible to slim down the surface light source device without impairing assembling capability, while solving a problem of leakage of light from a warped light guide plate. Furthermore, because the connection layer has a refractive index lower than that of the light guide plate body, with total reflection of light off the interface between the light guide plate body and the connection layer, light can be guided to a position away from the point source of light. Still further, because the surface light source device of one or more embodiments of the present invention is used, with the directivity spread of light entering the light introducing portion being narrowed, the light can be fed to the light guide plate body. Thus, light tends not to leak from the interface between the light guide plate body and the connection layer, thereby improving light use efficiency. And, because light tends not to leak from the interface between the light guide plate body and the connection layer, a more amount of light can reach a position away from the point source of light, and the liquid crystal display panel can be uniformly illuminated.

Note that one or more embodiments of the present invention has a feature obtained by combining, as appropriate, any of the components described above, and one or more embodiments of the present invention allows many variations by combining these components.

BRIEF DESCRIPTION OF THE DRAWINGS

FIG. 10($a$) is an enlarged plan view of a light introducing portion, and FIG. 10($b$) is a sectional view of the light introducing portion of FIG. 10($a$) cut along a circumferential direction A1-A2.

FIGS. 12($a$) and 12($b$) are diagrams depicting directivity of light before entering the directivity converting portion, and FIGS. 12($c$) and 12($d$) are diagrams depicting directivity of light after passing through the directivity converting portion.

FIGS. 13($a$) and 13($b$) are diagrams for describing directivity conversion efficiency.

FIGS. 22($a$) and 22($b$) are diagrams for describing an average tilt angle of the deflection pattern.

FIG. 23 is a diagram for describing the average tilt angle of the deflection pattern and variability of the tilt angle.

FIG. 33 ($a$) is a plan view of the shape of a directivity converting portion according to a third modification example of the first embodiment, and FIG. 33($b$) is a schematic sectional view depicting a section passing though its ridgeline.

FIG. 38($a$) is a diagram of a trial-and-error arrangement of the directivity converting portion, and FIG. 38($b$) is a diagram of a preferred arrangement of the directivity converting portion.

FIG. 42($a$) is a diagram depicting directivity of light immediately after entering the inside the light guide plate, and FIG. 42($b$) is a diagram depicting directivity of light after passing through a directivity converting portion.

FIG. 44($a$) is a schematic diagram for describing a third embodiment of the present invention, FIG. 44($b$) is a schematic diagram for describing a different mode of the third embodiment, and FIG. 44($c$) is a schematic diagram for describing a further different mode of the third embodiment.

FIG. 45($a$) is a schematic diagram for describing a still further different mode of the third embodiment, and FIG.

45(b) is a schematic diagram for describing a still further different mode of the third embodiment.

Figure 46:
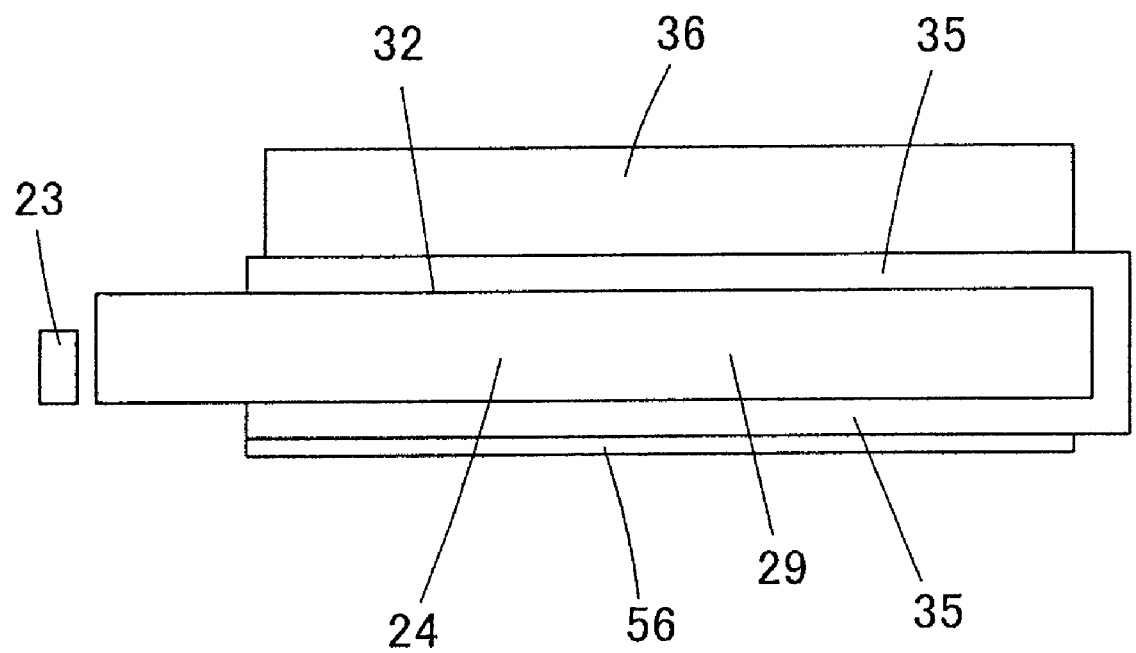

FIG. 46 is a schematic diagram for describing a still further different mode of the third embodiment.

FIGS. 47(a) and 47(b) are schematic sectional views of the structure of a multilayered light guide plate in a fourth embodiment of the present invention.

Figure 48:
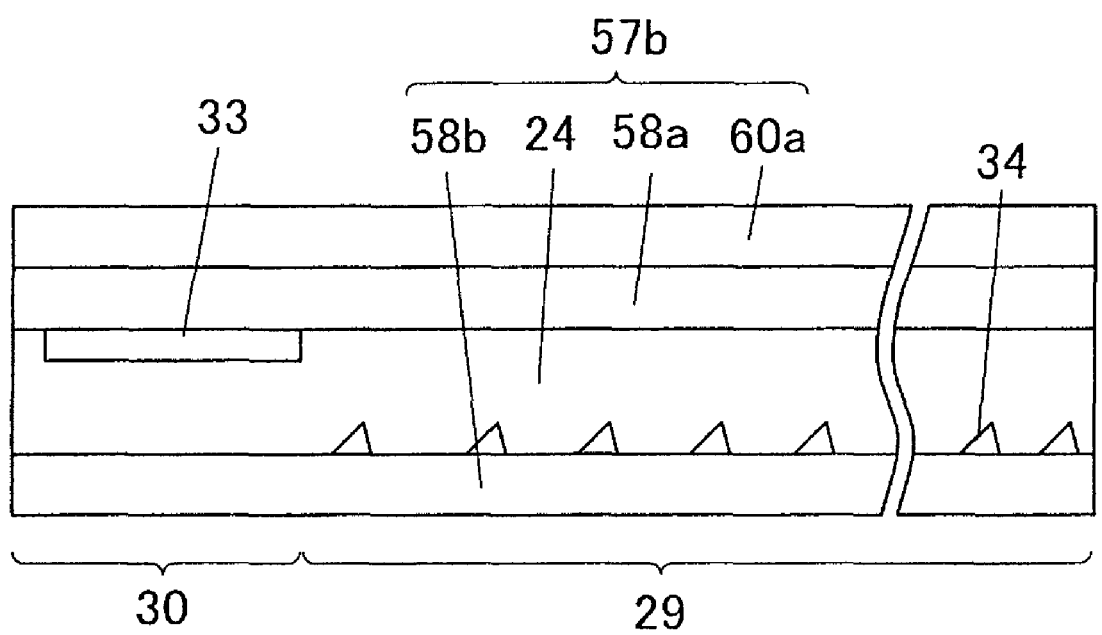

FIG. 48 is a schematic sectional view of the structure of a multilayered light guide plate in a first modification example of the fourth embodiment.

Figure 49:
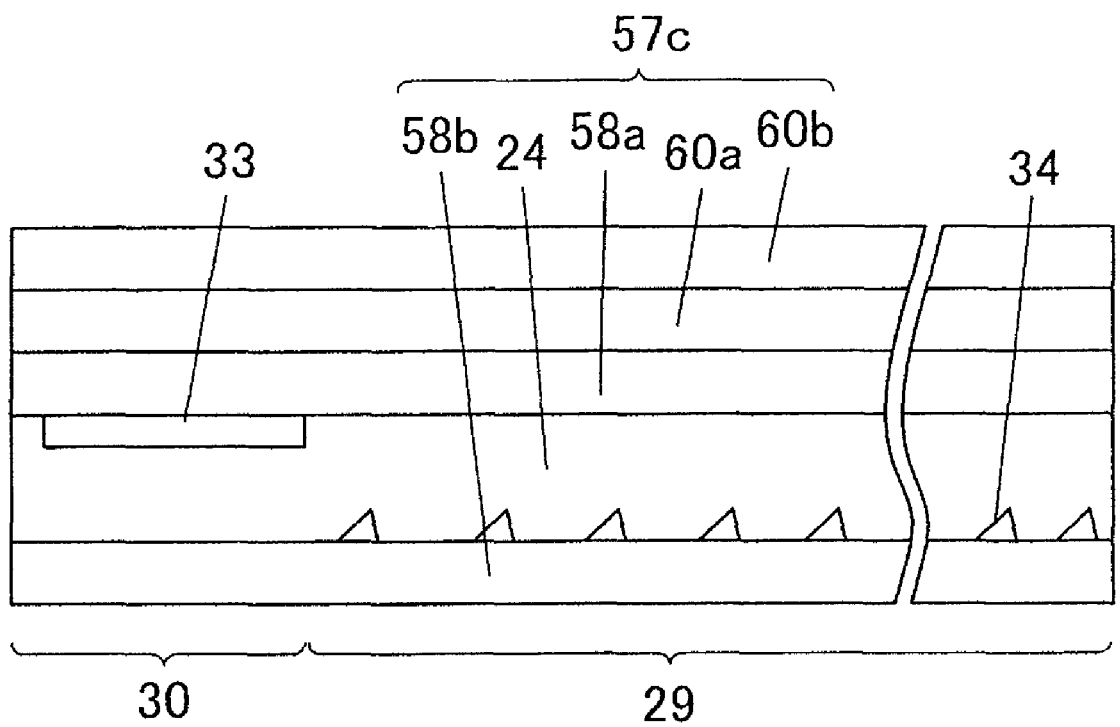

FIG. 49 is a schematic sectional view of the structure of a multilayered light guide plate in a second modification example of the fourth embodiment.

Figure 50:
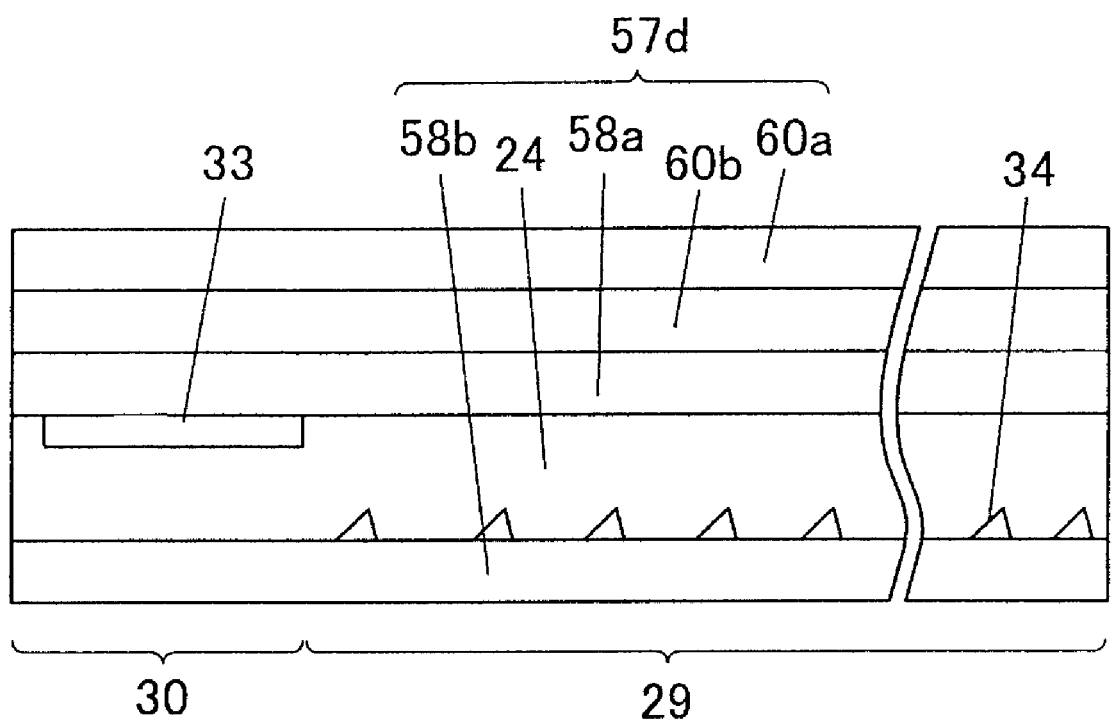

FIG. 50 is a schematic sectional view of the structure of a multilayered light guide plate in a third modification example of the fourth embodiment.

Figure 51:
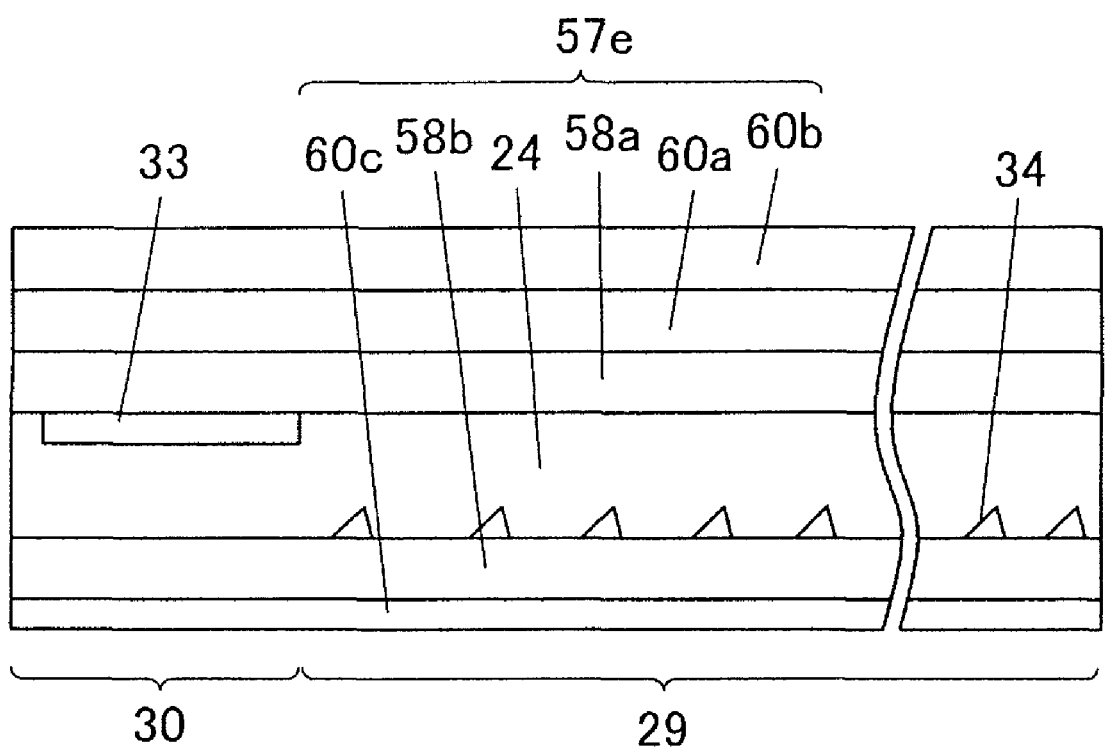

FIG. 51 is a schematic sectional view of the structure of a multilayered light guide plate in a fourth modification example of the fourth embodiment.

Figure 52:
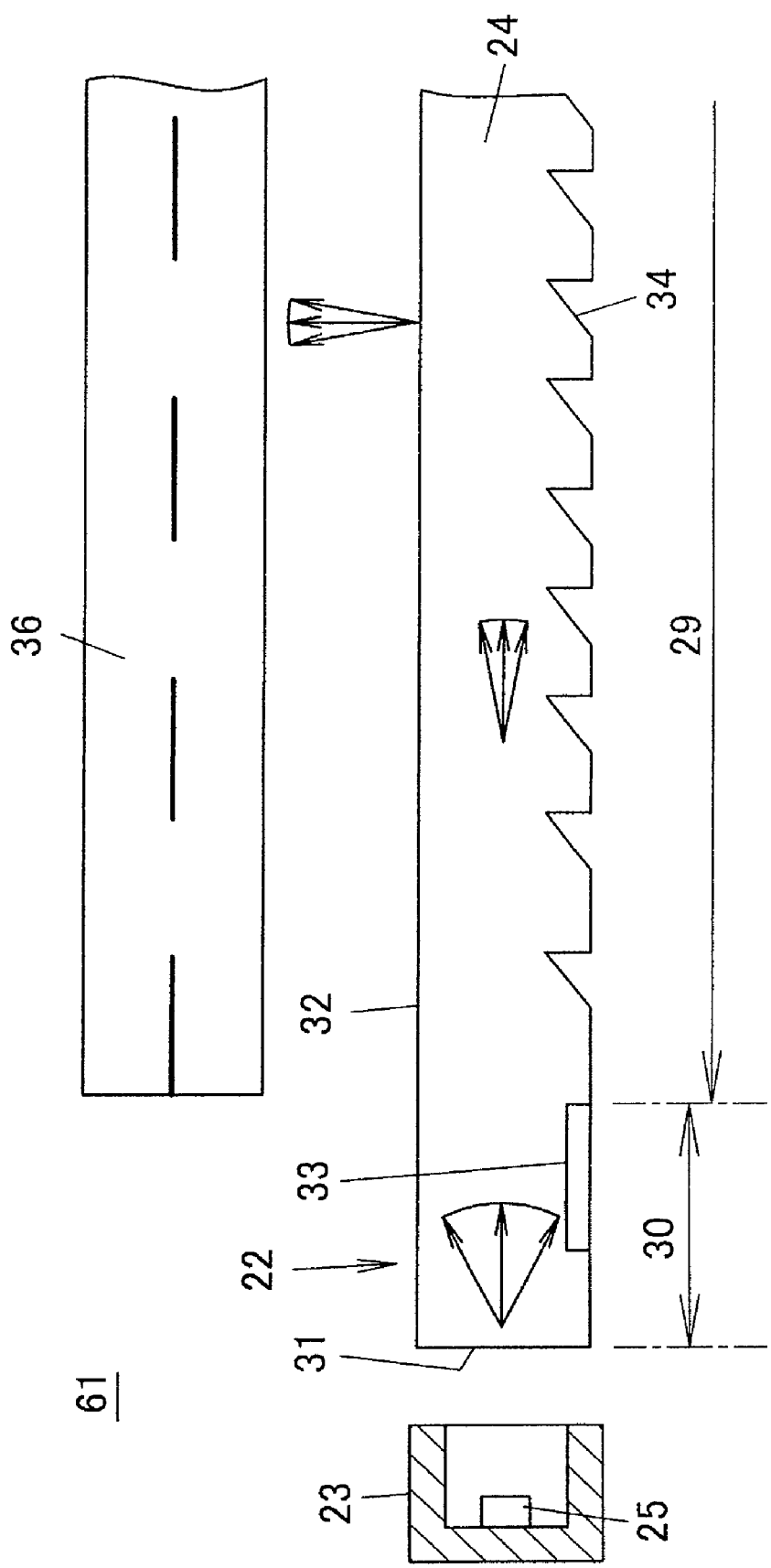

FIG. 52 is a sectional view of a liquid crystal display device according to a fifth embodiment of the present invention.

Figure 53:
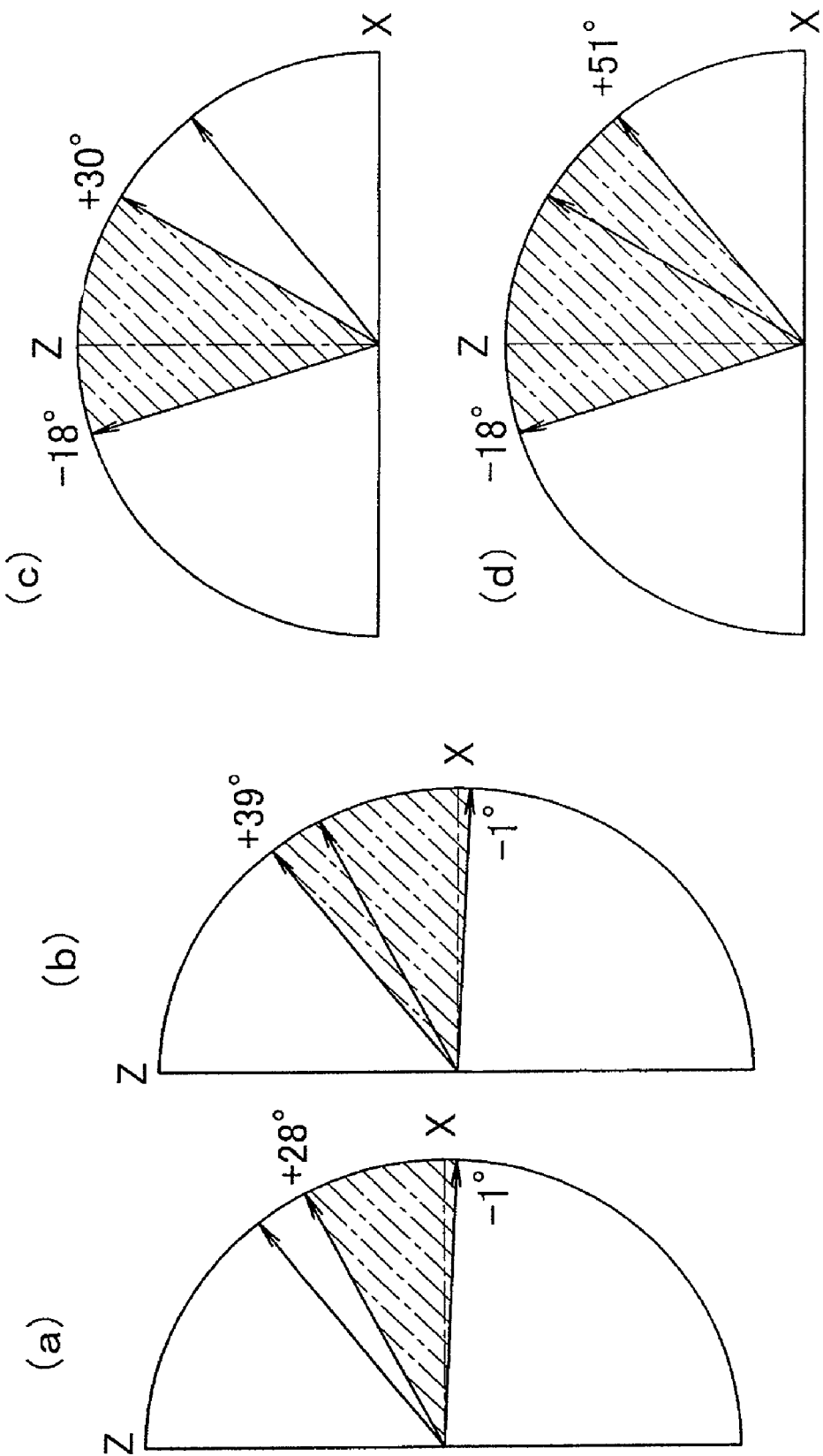

FIGS. 53(a) and 53(c) are diagrams depicting directivity of a surface light source device according to the fifth embodiment, and FIGS. 53(b) and 53(d) are diagrams depicting directivity of comparative examples.

Figure 54:
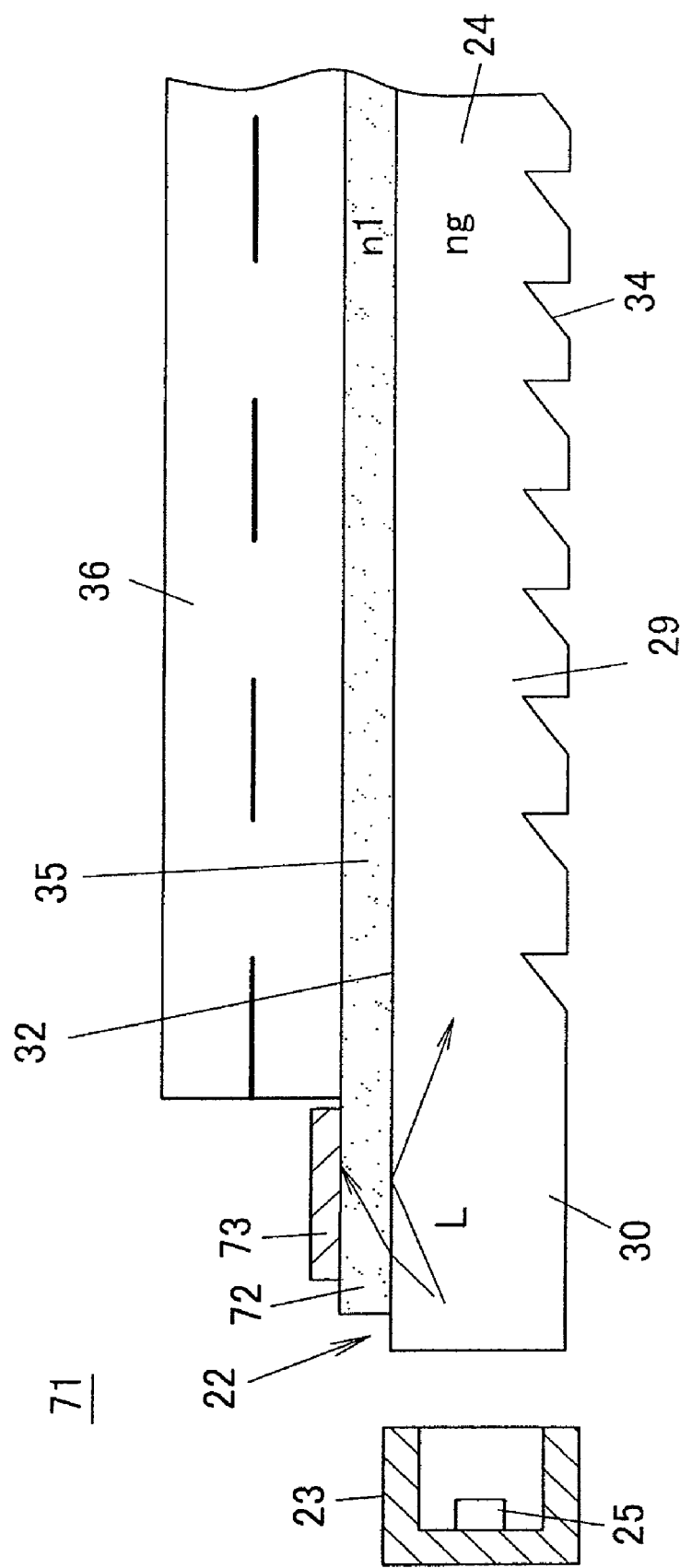

FIG. 54 is a sectional view of a liquid crystal display device according to a sixth embodiment of the present invention.

Figure 55:
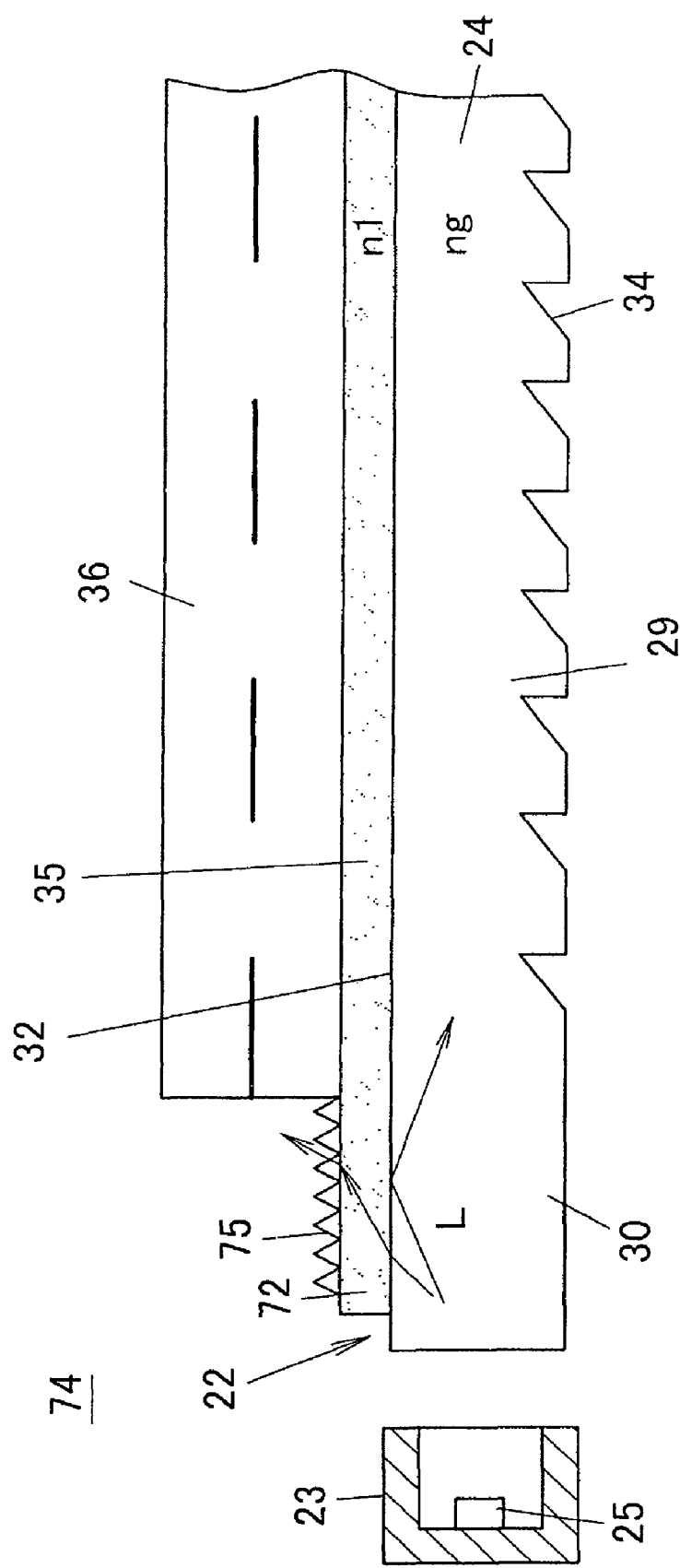

FIG. 55 is a sectional view of a liquid crystal display device according to a modification example of the sixth embodiment.

DESCRIPTION OF REFERENCE NUMERALS

| | |
|---|---|
| 21 | liquid crystal display device |
| 22 | surface light source device |
| 23 | point source of light |
| 24 | light guide plate |
| 28 | light emission window |
| 29 | light guide plate body |
| 30 | light introducing portion |
| 31 | light incident end face |
| 32 | light emission surface |
| 33 | directivity converting portion |
| 34 | deflection pattern |
| 35 | connection layer |
| 36 | liquid crystal display panel |
| 37 | directivity conversion pattern |
| 38a | ridgeline |
| 38b | valley line |
| 52 | directivity converting portion |
| 53 | thin plate portion |
| 54 | columnar member |
| 55 | dispersing agent |
| 56 | print layer |

With reference to the attached drawings, preferred embodiments of the present invention are described below.

First Embodiment

Figure 1:
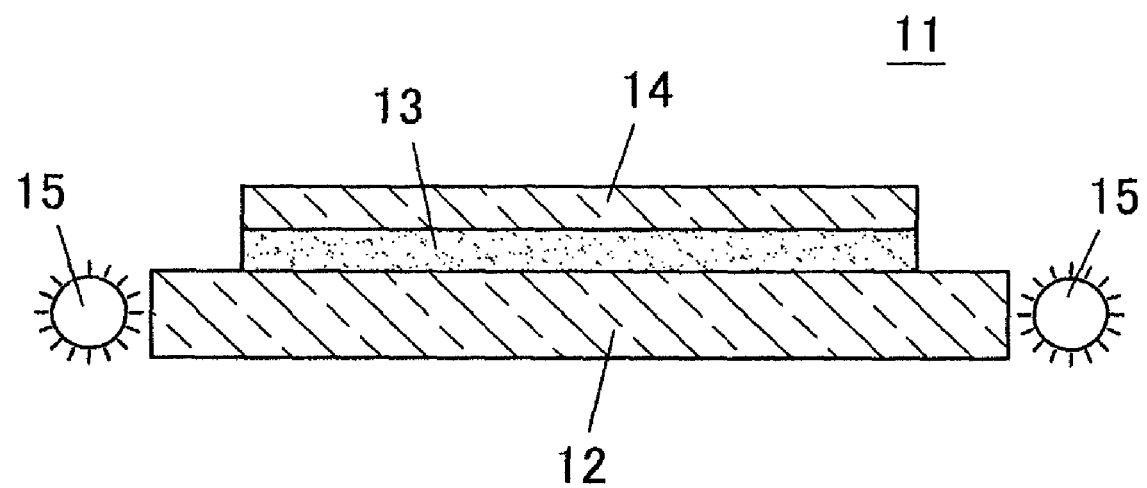
FIG. 1 is a schematic sectional view of a liquid crystal display device of a first comparative example disclosed in Patent Document 1.
Figure 2:
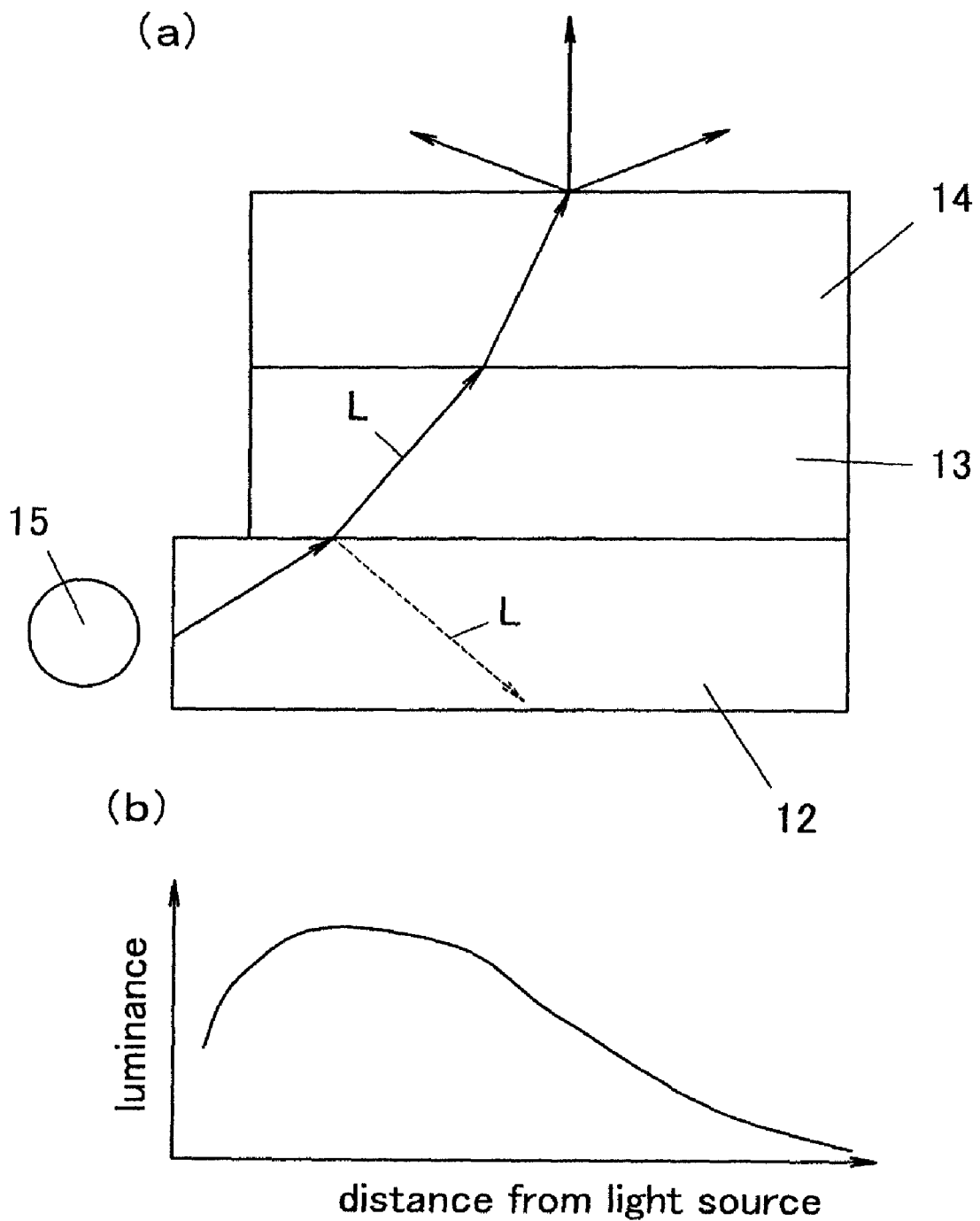
FIG. 2(a) is a diagram depicting the behavior of light entering the inside of a light guide plate of the liquid crystal display device of FIG. 1.
FIG. 2(b) is a drawing for describing the state in which the luminance of the liquid crystal display device changes depending on the distance from light sources.
Figure 3:
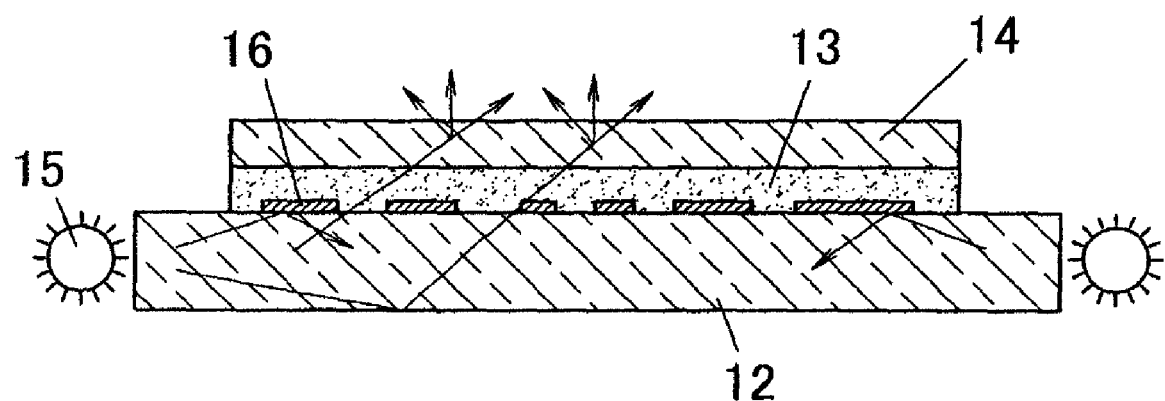
FIG. 3 is a schematic sectional view of a liquid crystal display device of a first embodiment described in Patent Document 1.
Figure 4:
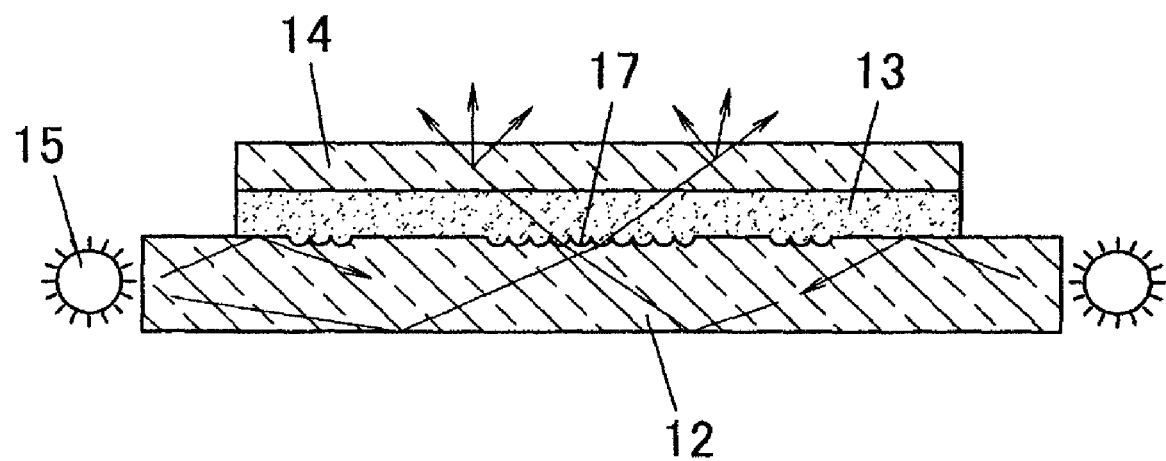
FIG. 4 is a schematic sectional view of a liquid crystal display device of a second embodiment described in Patent Document 1.
Figure 5:
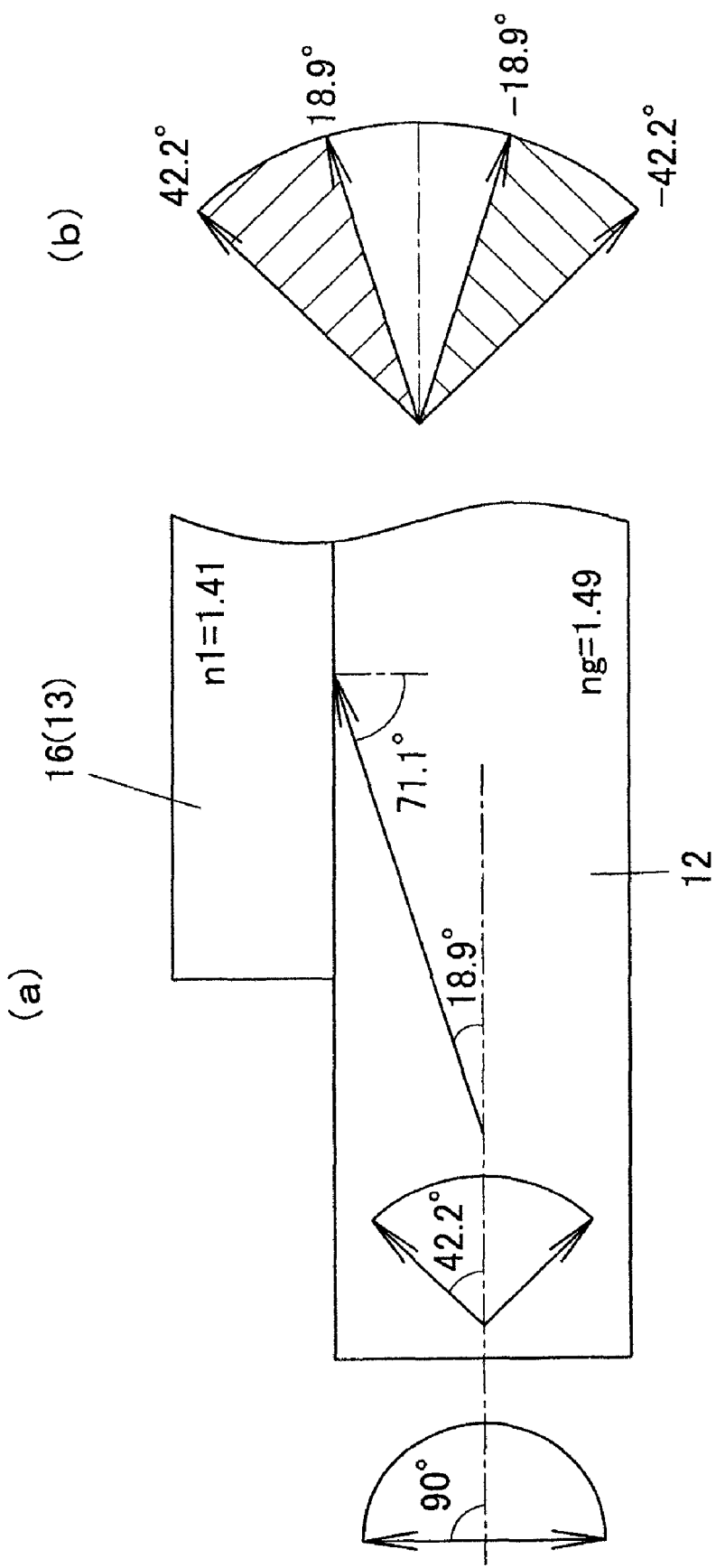
FIG. 5 is a diagram depicting light directivity inside the light guide plate in the liquid crystal display device depicted in FIG. 3.
Figure 6:
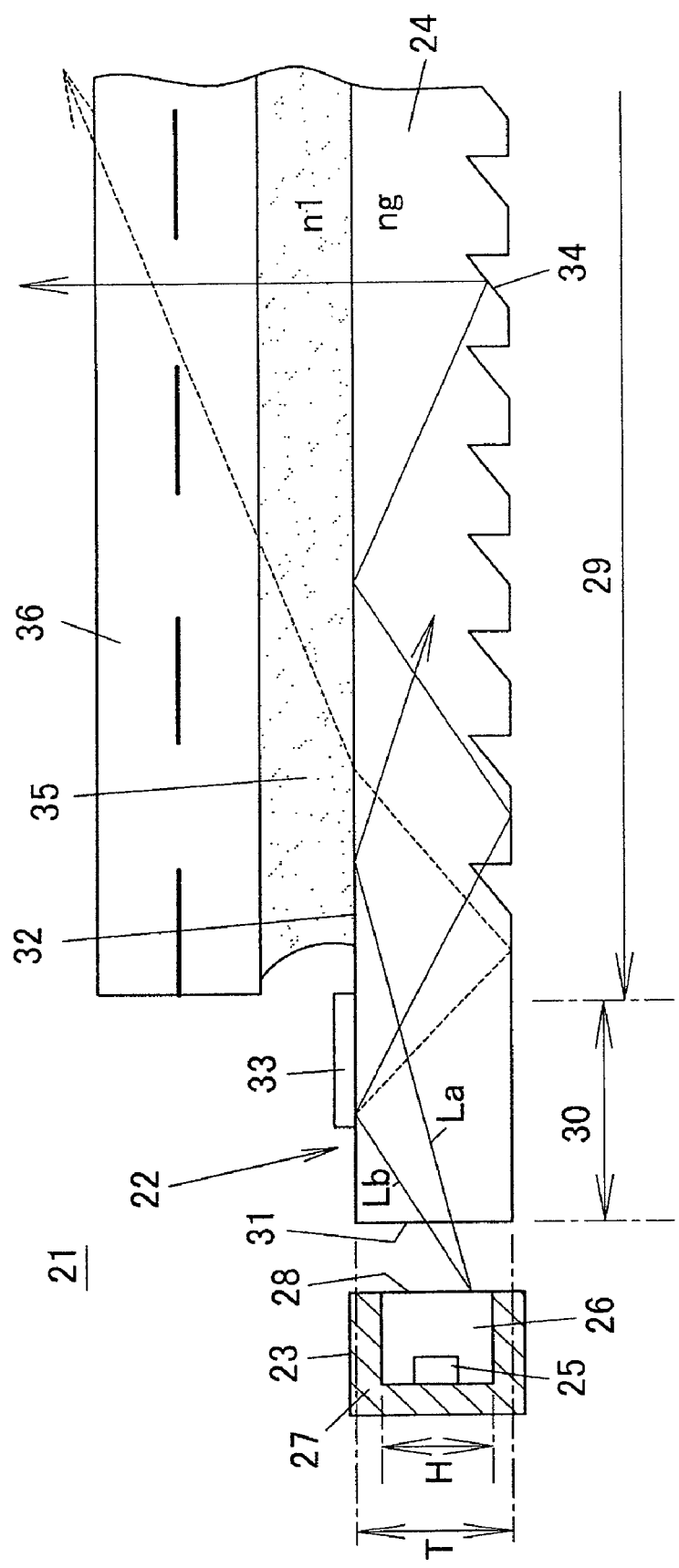
FIG. 6 is a schematic sectional view partially depicting a liquid crystal display device according to a first embodiment of the present invention.
Figure 7:
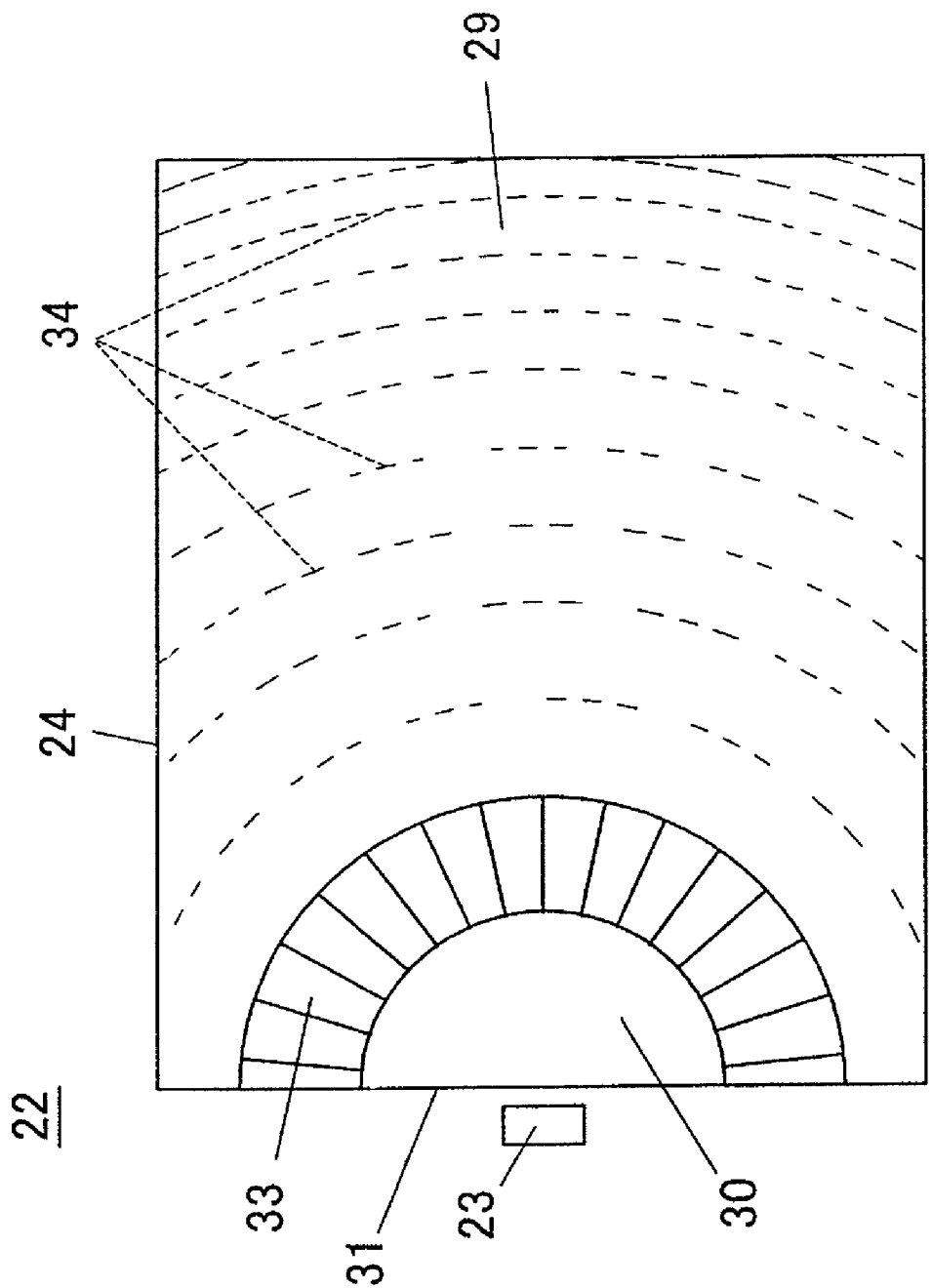
FIG. 7 is a schematic plan view of a surface light source device for use in the liquid crystal display device of the first embodiment.

FIG. 6 is a schematic sectional view partially depicting a liquid crystal display device 21 according to a first embodiment of the present invention. FIG. 7 is a schematic plan view of a surface light source device 22 for use in the liquid crystal display device 21.

The surface light source device 22 is formed of a point source of light 23 and a light guide plate 24. The point source of light 23 has incorporated therein one or a plurality of LEDs adjacent to each other, and emits white light. For example, as depicted in FIG. 6, the point source of light 23 has one or a plurality of LEDs 25 sealed inside a transparent sealing resin 26, and further has each surface except a front surface of the transparent sealing resin 26 covered with a white resin 27. The front surface of the transparent sealing resin 26 is exposed from the white resin 27 to form a light emission window 28. And, light emitted from the LED 25 is directly emitted from the light emission window 28 or is emitted from the light emission window 28 after reflected off the interface between the transparent sealing resin 26 and the white resin 27.

The point source of light 23 is not restricted to that as depicted in FIG. 6. The point source of light 23 herein is not a point source of light in a strict sense, but is a so-called point source of light as opposed to a cold-cathode tube being called a linear source of light. That is, the point source of light means a small light source relative to the width of the light guide plate 24. The point source of light 23 also has a finite width, but does not have a length or width equal to or longer than 10 mm, unlike a cold-cathode tube.

For example, another point source of light 23 is a sideview-type LED or the like. In the sideview-type LED, one or more LED chips may be included within one package, and these plurality of LED chips may be sealed all together. In one having a plurality of LED chips sealed all together, although the width of the emission window may be on the order of 5 mm, it is sufficiently small in comparison with the width of a light emission region of the light guide plate being on the order of 2 inches, and therefore it can be regarded as a point source of light. Also, light guided by using an optical fiber may be introduced to the light guide plate. In this case, the light emission end face of the optical fiber can be regarded as a point source of light.

The light guide plate 24 has an end of a light guide plate body 29 provided with a light introducing portion 30, and the light guide plate body 29 and the light introducing portion 30 are integrally configured. Also, the light guide plate 24 has a light guide substrate formed of a transparent or translucent material provided with the light introducing portion 30 and deflection patterns 34. As for the light guide substrate, a surface of the light introducing portion 30 on a light emission side and a surface of the light guide plate body 29 on a light emission side are flatly continuous, and a surface of the light introducing portion 30 opposite to the light emission side and a surface of the light guide plate body 29 opposite to the light emission side are also flatly continuous. The light guide plate 24 (light guide substrate) is molded of a transparent resin having a high refractive index, such as acrylic resin, polycarbonate resin (PC), cycloolefin-type material, or polymethyl methacrylate (PMMA). In the following description, it is assumed that the light guide plate 24 is made of polycarbonate resin. The end face of the light introducing portion 30 (light incident end face 31) has a thickness T equal to or higher than a height H of the light emission window 28 of the point source of light 23. Therefore, it is possible to cause light emitted from the point source of light 23 to efficiently enter the inside of the light introducing portion 30 from the light incident end face 31, thereby increasing light use efficiency of the surface light source device 22.

In the light introducing portion 30 (light guide substrate), a directivity converting portion 33 is formed on a surface on the same side as that of the light emission surface 32 of the light guide plate body 29. Also, in the light introducing portion 30, the directivity converting portion 33 is formed in a band shape along a region adjacent to the light guide plate body 29. In other words, a region from an edge of the directivity converting portion 33 positioned on a side away from the point source of light 23 when viewed from a direction perpendicular to the light emission surface 32 of the light guide plate 24 to the light incident end face 31 is called the light introducing portion 30, and the other region (a region from an edge of the directivity converting portion 33 positioned on a side away from the point source of light 23 to an end face on an opposite side of the light incident end face 31 of the light guide plate 24) is called the light guide plate body 29.

The light emission surface 32 of the light guide plate body 29 (light guide substrate) and a surface on its opposite side (back surface) are formed in parallel. On the back surface of the light guide plate body 29 (light guide substrate), the plurality of (many) deflection patterns 34 (light emitting means) are provided for causing light to be reflected to be emitted approximately perpendicularly from the light emission surface 32. The deflection patterns 34 can be any as long as they cause light to be emitted, and any can be selected according to the use purpose, such as those of an asperity shape, patterns by screen printing, or those provided with a diffusing material inside the light guide plate 24. Also, the arrangement of the deflection patterns 34 can be obtained by combining known technologies, such as a concentric arrangement, a staggered arrangement, a random arrangement, and a regular arrangement. By way of example, as depicted in FIG. 7, the deflection patterns 34 are arranged in a concentric shape centering at the point source of light 23 or one point near the point source of light 23. Also, in a circumferential direction, the patterns are not continuous in an arc shape from end to end but short deflection patterns 34 are arranged in a circumferential direction. The deflection patterns 34 are formed so that their distribution density is small in a region near the point source of light 23 and larger as they are away from the point source of light 23, thereby equalizing the luminance of light emission of the surface light source device 22. Also, each deflection pattern 34 is a concave portion formed by denting the back surface of the light guide plate body 29 in a V-groove shape or a protruding portion formed by causing the back surface of the light guide plate body 29 to protrude in a triangular prism shape, and is arranged so that a groove direction of the concave portion or an ridgeline direction of the protruding portion is approximately orthogonal to a line segment connecting the position of that deflection pattern and the center of its concentric circles. In this manner, as a light beam Lb depicted in FIG. 6, when light guided inside the light guide plate body 29 enters the deflection patterns 34 to be totally reflected off an inclined surface of the deflection patterns 34, the light reflected off the deflection patterns 34 is emitted from the light emission surface 32 in an approximately perpendicular direction.

The liquid crystal display device 21 is configured by stacking the liquid crystal display panel 36 on the light emission surface 32 of the light guide plate body 29. By interposing the connection layer 35 between the light emission surface 32 and the back surface of the liquid crystal display panel 36, the light emission surface 32 and the back surface of the liquid crystal display panel 36 are brought into intimate contact with each other so as to prevent entrance of air therebetween. Note that the connection layer 35 may not only be present between the light emission surface 32 and the back surface of the liquid crystal display panel 36 but also extend off an end face or a back surface side of the light guide plate body 29 in a region other than the light introducing portion 30.

The refractive index of the connection layer 35 is smaller than that of the light guide plate 24. That is, when the refractive index of the light guide plate 24 is taken as ng and the refractive index of the connection layer 35 is taken as n1, these refractive indexes ng and n1 have the following relation:

ng>n1>1.

Here, n1>1 is set in order to exclude an air layer from the connection layer 35. For example, the refractive index of the light guide plate 24 is ng=1.59 and the refractive index of the connection layer 35 is n1=1.4. As the connection layer 35, an adhesive can be used and, for example, a two-part-curable silicone or ultraviolet-curable resin having a refractive index lower than that of the light guide plate 24 can be used. Note that as the connection layer 35, something without adhesiveness may be used and, for example, a gas having a refractive index higher than that of air and lower than the refractive index of the light guide plate 24 may be interposed between the light guide plate 24 and the liquid crystal display panel 36.

In this surface light source device 22, the behavior of light entering the inside of the light guide plate 24 from the point source of light 23 can be broadly divided into two. One light beam is like a light beam La depicted in FIG. 6, in which the light travelling direction inside the light guide plate 24 forms a relatively small angle with respect to a horizontal plane (a plane parallel to the light emission surface 32 is hereinafter referred to as a horizontal plane). This light beam La does not impinge on the directivity converting portion 33 but directly impinges on the light emission surface 32 or the back surface of the light guide plate body 29 for total reflection. In the course of light guide, a light beam impinging on the deflection patterns 34 is approximately perpendicularly emitted from the light emission surface 32.

Other light, such as the light beam Lb depicted in FIG. 6, is light in which the light travelling direction inside the light guide plate 24 forms a relatively large angle with respect to the horizontal plane. If the directivity converting portion 33 is absent, like a light beam indicated by a broken line in FIG. 6, this light beam Lb is guided by total reflection off the interface between the light guide plate 24 and air and, when reaching the interface between the light guide plate body 29 and the connection layer 35, passes through the connection layer 35 to leak. In the present embodiment, however, because the directivity converting portion 33 is provided to the light introducing portion 30, this light beam Lb impinges on the directivity converting portion 33 and its light guide direction is bent. That is, with the light beam Lb being reflected off the directivity converting portion 33, the light guide direction is bent so that the angle formed with the horizontal plane is small. Thus, total reflection occurs at the interface between the light guide plate body 29 and air and the interface between the light guide plate body 29 and the connection layer 35, and the light beam is trapped inside the light guide plate body 29 to be guided away from the point source of light 23. When the light beam impinges on the deflection patterns 34, it is approximately perpendicularly emitted from the light emission surface 32.

Figure 8:
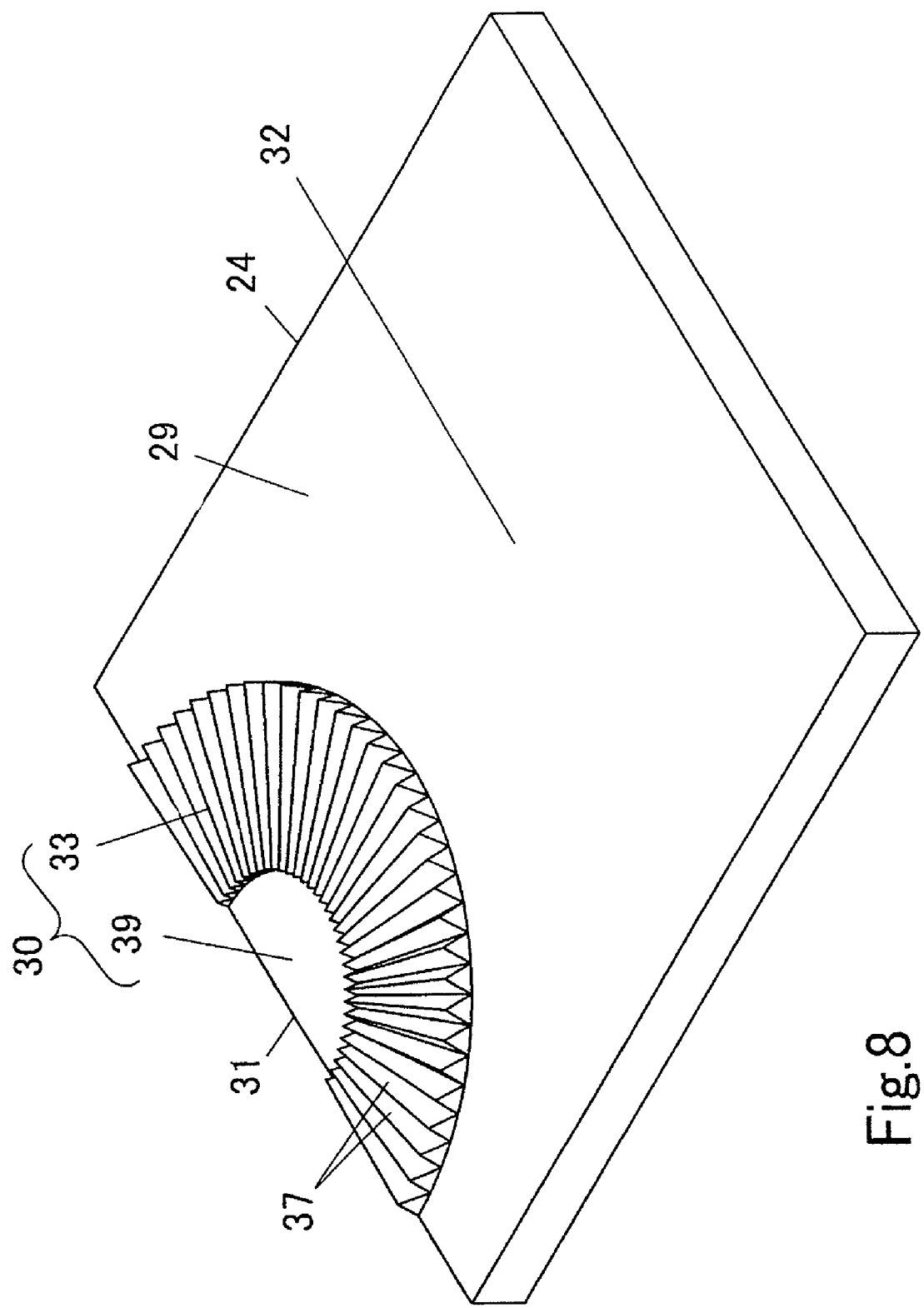
FIG. 8 is a perspective view of a light guide plate for use in the surface light source device mentioned above.
Figure 9:
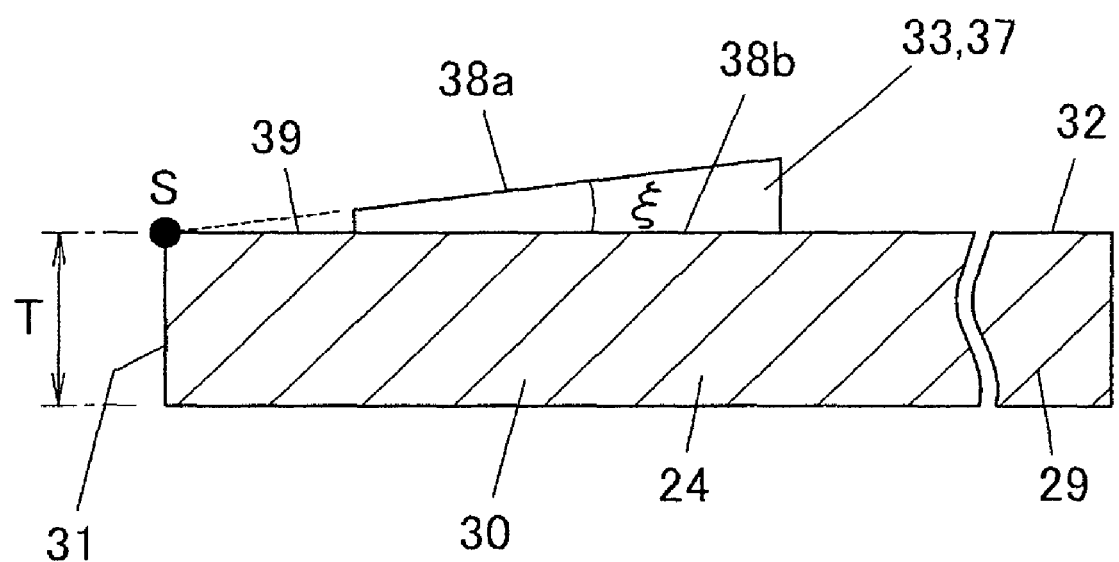
FIG. 9 is a partially-sectional schematic view of the light guide plate mentioned above.

Next, the structure of the directivity converting portion 33 is described. FIG. 8 is a perspective view of the light guide plate 24, and FIG. 9 is a schematic partially-sectional view of the light guide plate 24. Also, FIG. 10(a) is an enlarged plan view of the light introducing portion 30, and FIG. 10(b) is a sectional view of the light introducing portion 30 of FIG. 10(a) cut along a circumferential direction A1-A2.

The directivity converting portion 33 is a band-shaped region in an arc shape when viewed from a direction perpendicular to the light emission surface 32, and directivity conversion patterns 37 of the same V-groove shape are radially arranged along a circumferential direction. Of the light introducing portion 30, a region surrounded by the directivity converting portion 33 is flush with the light emission surface 32 (the flat region surrounded by the directivity converting portion 33 is referred to as a flat surface 39 of the light introducing portion 30), and the directivity converting portion 33 is formed so as to protrude from the light emission surface 32 and the flat surface 39. A valley line 38b of the directivity conversion patterns 37 is within a plane including the light emission surface 32 and the flat surface 39 of the light guide plate 24 and extends in a horizontal direction. Also, a ridgeline 38a of the directivity conversion patterns 37 is linearly tilted so as to be have its peak on a side away from the point source of light 23 and its bottom on a side close to the point source of light 23. A mountain-shaped portion formed between adjacent directivity conversion patterns 37 has both end faces perpendicular to the light emission surface 32 and the flat surface 39.

The ridgelines 38a of the respective directivity conversion patterns 37 gather at one point or in a region near that point when they are three-dimensionally extended. In the present embodiment, as depicted in FIG. 9 and FIG. 10(a), the ridgelines 38a of the respective directivity conversion patterns 37 gather at one point positioned at the center portion of the end face (the light incident end face 31) of the light introducing portion 30 on the flat surface 39, one point near that point, or in a region near these points when they are extended. It is assumed in the present embodiment that they gather at one point S positioned at the center portion of the end face of the light introducing portion 30. Similarly, the valley lines 38b of the respective directivity conversion patterns 37 gather at one point or in a region near that point when they are three-dimensionally extended.

Note that an example of numerical values regarding this light guide plate 24 is as follows. The thickness T of the end face of the light introducing portion 30 and the thickness of the light guide plate body 29 are both 0.37 mm (both thicknesses indicate those in the light guide substrate without consideration of the directivity conversion patterns or the deflection patterns). Also, as depicted in FIG. 10(a), when viewed from a direction perpendicular to the light emission surface 32, an envelope (an inner perimeter edge of the directivity converting portion 33) passing through an end of each ridgeline 38a and valley line 38b of the respective directivity conversion patterns 37 on a side close to the point source of light 23 forms an arc. Similarly, an envelope (an outer perimeter edge of the directivity converting portion 33) passing through an end of each ridgeline 38a and valley line 38b of the respective directivity conversion patterns 37 on a side away from the point source of light 23 forms an arc. This inner perimeter edge of the directivity converting portion 33 has a radius r1 of 2.5 mm, and the outer perimeter edge of the directivity converting portion 33 has a radius r2 of 3.8 mm. A distance r2−r1 from the inner perimeter edge to the outer perimeter edge of the directivity converting portion 33 (the length of each directivity conversion pattern 37) is determined, as described further below, so that light of directivity desired to be converted impinges on the directivity converting portion 33. Therefore, when the thickness T of the light guide plate 24 changes, the values of the radiuses r1 and r2 also change. When viewed from a direction perpendicular to the light emission surface 32, a pitch P1 of the directivity conversion patterns 37 in the inner perimeter edge of the directivity converting portion 33 is 0.30 mm, and a pitch P2 of the directivity conversion patterns 37 in the outer perimeter edge of the directivity converting portion 33 is 0.46 mm. Also, a tilt angle (gradient) ξ of the ridgeline 38a of each directivity conversion pattern 37 is approximately 1°, and the value of the tilt angle of the ridgeline 38a changes according to the values of the pitches P1 and P2.

Figure 11:
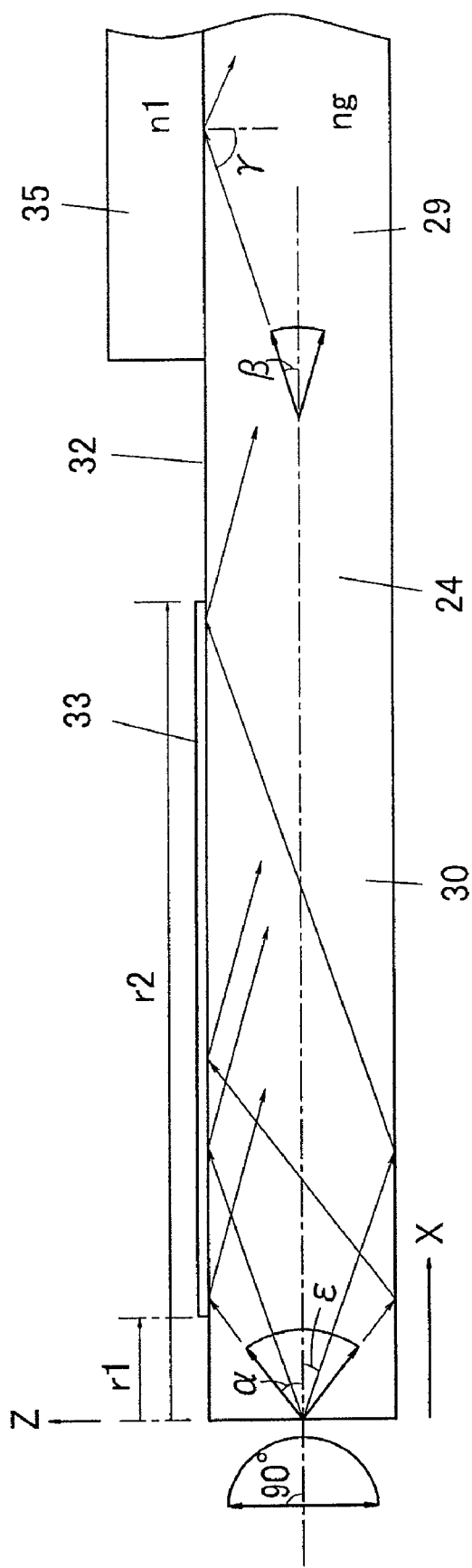
FIG. 11 is a diagram for describing the operation of a directivity converting portion and the behavior of light.

Next, the operation of the directivity converting portion 33 is described. FIG. 11 and FIG. 12 are diagrams for describing the operation of the directivity converting portion 33 and the behavior of light. Now consider a plane perpendicular to the light incident end face 31 and the light emission surface 32 (a ZX plane), and a direction perpendicular to the light incident end face 31 is defined as an X-axis direction, a direction perpendicular to the light emission surface 32 as a Z-axis direction, and a direction parallel to the light incident end face 31 and the light emission surface 32 as a Y-axis direction. Light entering the inside of the light guide plate 24 from the light incident end face 31 has a hemispheric directivity characteristic, and therefore has a directivity spread at ±90° in the ZX plane. Because the refractive index of the light guide plate 24 is ng, when light having a spread at ±90° enters the light introducing portion 30 from the light incident end face 31, as depicted in FIG. 11, the directivity spread inside the light introducing portion 30 is $$\pm\alpha=\pm\arcsin(1/ng) \quad \text{(Equation 1)}.$$

Now when ng=1.59, the directivity spread is ±α=±39.0°.

Also when ng=1.59, the critical angle of total reflection at the interface between the flat surface 39 or its back surface and an air layer is also 39.0°, which is therefore converted to an angle of 51.0° when measured from a horizontal direction (the X-axis direction). That is, light at an angle equal to or larger than 51.0° when measured from the horizontal direction and light at an angle equal to or smaller than −51.0° leak from the interface between the light introducing portion 30 and the air layer. However, because the directivity spread of light entering the light introducing portion 30 has an angle of ±39.0°, the light entering the light introducing portion 30 does not leak from the interface with air, but is guided inside the light guide plate 24 as being totally reflected.

On the other hand, a critical angle γ of total reflection at the interface between the light guide plate body 29 and the connection layer 35 is $$\gamma=\arcsin(n1/ng) \quad \text{(Equation 2)},$$

which is converted to an angle β when measured from the horizontal direction as $$\beta=90°-\gamma=90°-\arcsin(n1/ng) \quad \text{(Equation 3)}.$$

Now with ng=1.59 and n1=1.4, β=28.3° holds.

Therefore, of light having a directivity spread of ±α(=) ±39.0° and entering the light introducing portion 30, light in a range of −β to +β can be totally reflected off both of the interface between the light guide plate 24 and air and the interface between the light guide plate 24 and the connection layer 35, and is guided without leaking from the light guide plate 24. By contrast, light in a range of −α to −β and light in a range of +β to +α are totally reflected off the interface with air when the directivity converting portion 33 is absent, but pass through the interface with the connection layer 35 to the connection layer 35 and leak.

The directivity converting portion 33 performs an operation of causing the directivity characteristic of light to rotate or be tilted about the X axis before and after reflection of light. Light of the point source of light 23 travelling toward the X-axis direction has a narrow directivity characteristic in the Y direction as depicted in FIGS. 12(a) and 12(b). When this light is reflected off the directivity converting portion 33, its directivity characteristic rotates as depicted in FIGS. 12(c) and 12(d). As a result, the directivity spread inside the ZX plane becomes small to be ε. Therefore, when the shape and dimensions of the directivity converting portion 33 are defined so that ε≦β holds, the light reflected off the directivity converting portion 33 does not leak even at the interface with the connection layer 35, thereby allowing light to be carried far away.

Note that FIGS. 12(b) and 12(d) represent a directivity characteristic of light viewed from the inside of the ZX plane. This directivity characteristic, when the point source of light 23 is viewed from a slanting direction inside the XY plane, the directivity spread in a vertical direction differs depending on a viewing direction. Therefore, the directivity converting portion 33 also can have its shape of patterns changed in a front direction and in a slanting direction. However, from ease of pattern manufacturing, each directivity conversion pattern 37 in each direction has the same shape.

Also, to completely eliminate leakage of light, it is theoretically required that light in a range of −α to −β and light in a range of +β to +α be all received by the directivity converting portion 33. However, in consideration of other conditions, it is not necessarily required that light in these ranges be all received by the directivity converting portion 33.

Next, to convert the directivity spread of ±a to a directivity spread smaller than ±β by the directivity converting portion 33, as depicted in FIG. 11, the regions of the directivity converting portion 33 (that is, values of r1 and r2) can be defined so that the light in the range of −α to −β and the light in the range of +β to +α enter the directivity converting portion 33.

As a result, light with its directivity spread converted by the light introducing portion 30 to ±ε is sent to the light guide plate body 29. Inside the light guide plate body 29, light does not leak from the interface with the connection layer 35 until it is reflected off the deflection patterns 34.

Next, how to determine an optimum directivity converting portion 33 is described. First, concepts of directivity conversion efficiency and light guide efficiency are described. Directivity conversion efficiency indicates how much amount of light is included in a range of a target directivity among directivities of light transmitted to the light guide plate body 29.

Directivity conversion efficiency =
(amount of light in the range)/(entire amount of light) =
(entire amount of light − amount of light outside the range)/(entire amount of light)

FIGS. 13(a) and 13(b) depict directivity on the ZY plane as depicted in FIGS. 12(a) and 12(c). Specifically, a region K interposed between two solid lines in FIG. 13(a) indicates a range of a target directivity when the connection layer 35 is in intimate contact with the light emission surface 32 of the light guide plate body 29, and it is assumed that the connection layer 35 having a refractive index of 1.4 is provided on the light guide plate body 29 having a refractive index of 1.59. It is also assumed that the inside of a region Q indicated by a circle in FIG. 13(b) indicates a directive characteristic of light transmitted to the light guide plate body 29. In this case, regions q1 and q2 in the region Q and outside the region K represent amounts of light outside a target range, and a region q3 in the region Q and inside the region K represents an amount of light in the target range. Therefore, directivity conversion efficiency is q3/(q1+q2+q3).

Therefore, directivity conversion efficiency represents a degree of resistance to leakage of light transmitted to the light guide plate body 29 from the interface between the light guide plate body 29 and the connection layer 35. When directivity conversion efficiency is large, light is resistant to leakage from the interface between the light guide plate body 29 and the connection layer 35 and light easily propagates through the light guide plate body 29. Conversely, when directivity conversion efficiency is small, light entering the light guide plate body 29 tends to leak from the interface with the connection layer 35, and a trouble of a bright glow of a region near the light introducing portion 30 of the light guide plate body 29 becomes significant.

Also, light guide efficiency represents a ratio of an amount of light transmitted to the light guide plate body 29 with respect to an amount of light immediately after the light enters the light guide plate 24.

Light Guide Efficiency=(amount of light transmitted to the light guide plate body)/(amount of light immediately after entrance)

That is, light guide efficiency represents a degree of resistance to leakage of light at the light introducing portion 30. Small light guide efficiency means large leakage of light at the directivity converting portion 33 and others, indicating low luminance of the entire light emission surface of the light guide plate body 29. Conversely, large light guide efficiency means small leakage of light at the directivity converting portion 33 and others, and can increase luminance of the entire light emission surface of the light guide plate body 29.

Figure 14:
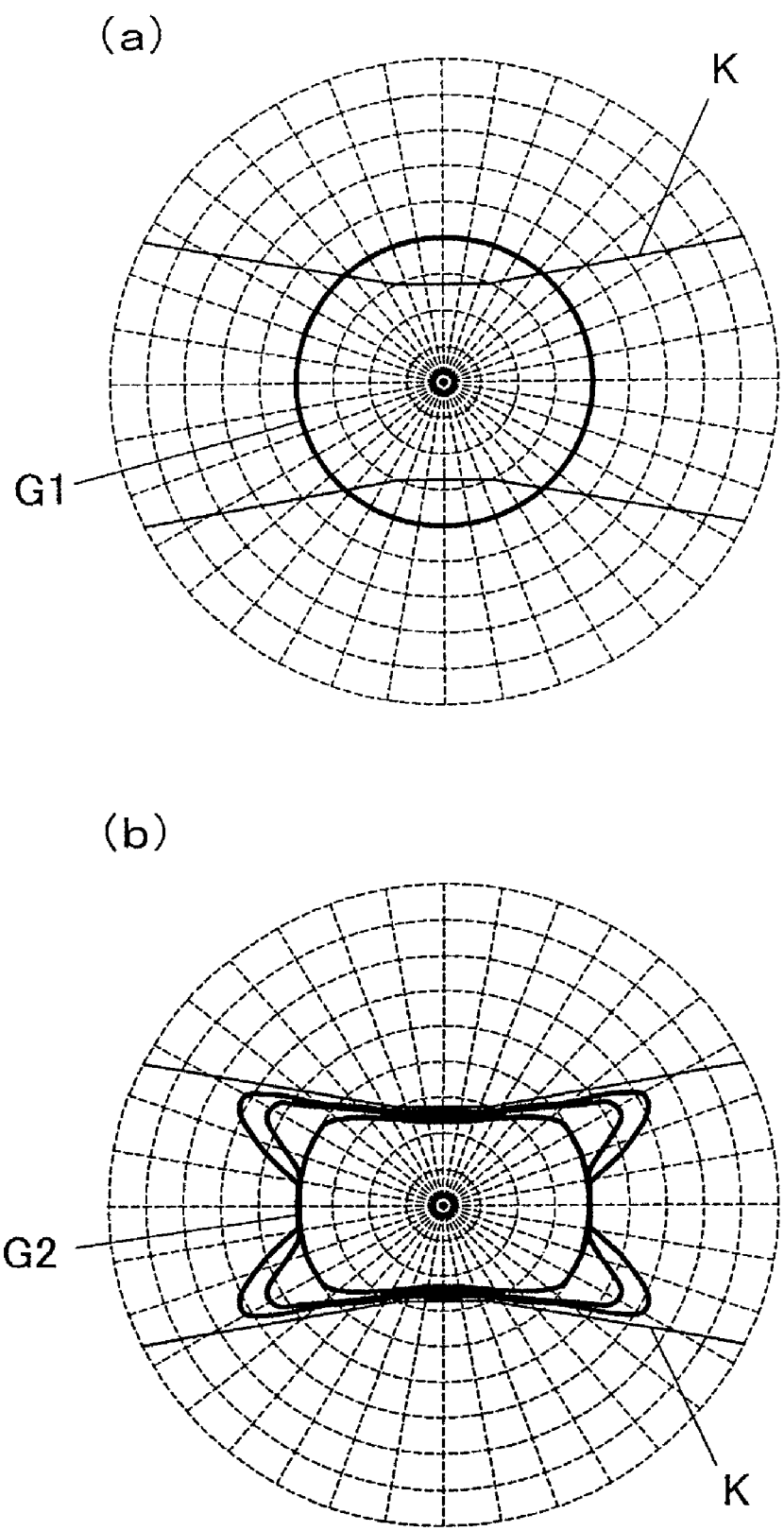
FIG. 14($a$) is a diagram depicting directivity of light immediately after entering the light introducing portion, and FIG. 14($b$) is a diagram depicting directivity of light after passing though the directivity converting portion.

FIGS. 14(a) and 14(b) depict directivity on the ZY plane as depicted in FIGS. 12(a) and 12(c). A directivity characteristic G1 depicted in FIG. 14(a) represents directivity on the ZY plane as depicted in FIGS. 12(a) and 12(c), indicating directivity of light immediately after entering the light introducing portion 30. Also, directivity G2 depicted in FIG. 14(b) represents directivity after light passes through the directivity converting portion 33. Light may not fall within a target range K with directivity G1 of light immediately after entrance unchanged. With provision of the directivity converting portion 33, light outside the range moves in a slanting direction to cause approximately entire light to be within the target range as indicated by directivity G2. The directivity characteristic at this time is depicted in FIG. 12(d) in cross section in the ZX plane.

Figure 15:
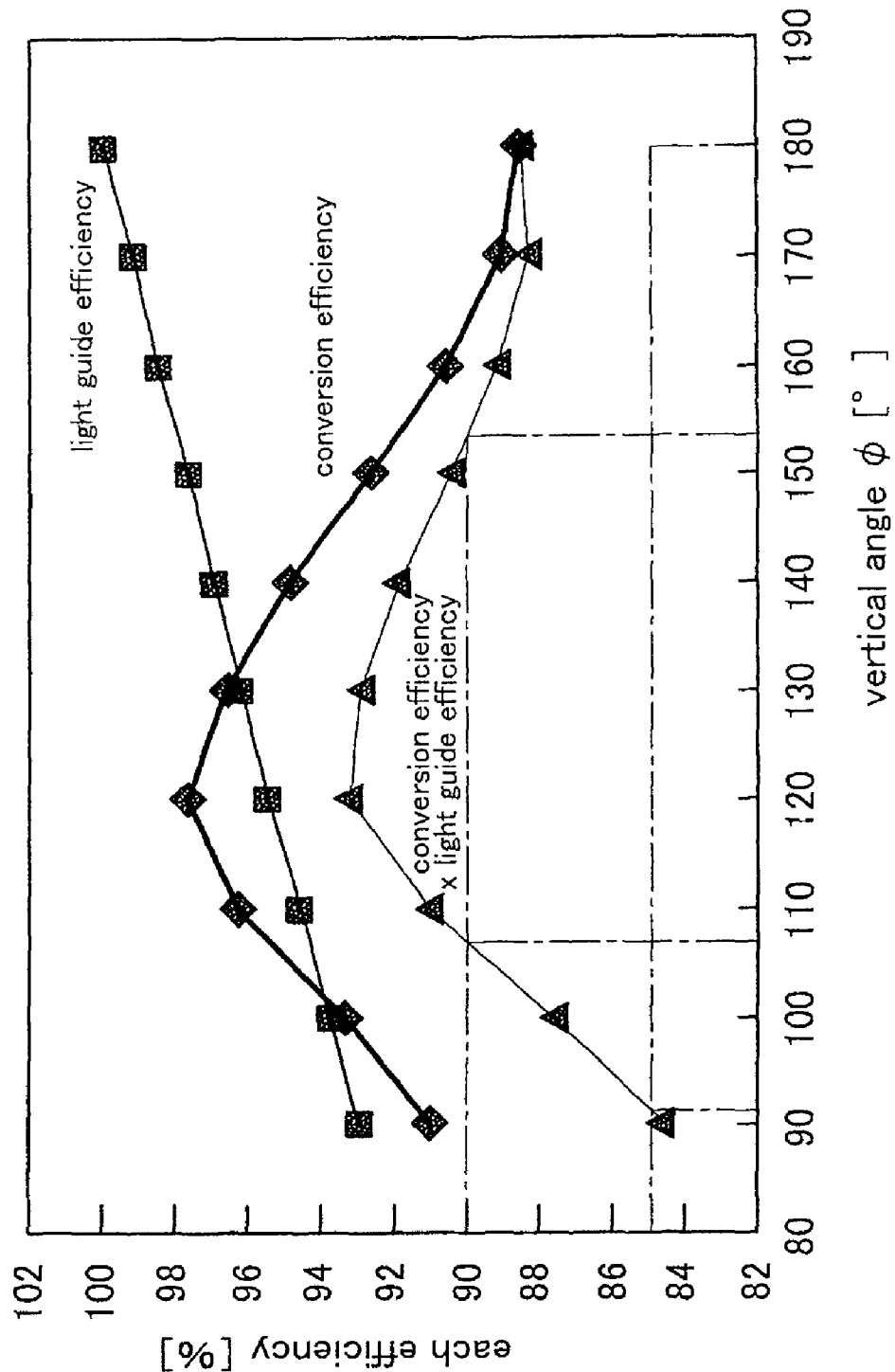
FIG. 15 is a drawing that depicts a relation between a vertical angle $\phi$ of a mountain-shaped portion formed of directivity conversion patterns and directivity conversion efficiency, light guide efficiency, and conversion efficiency× light guide efficiency.

FIG. 15 depicts a relation between a vertical angle φ of a mountain-shaped portion formed of the directivity conversion patterns 37 and directivity conversion efficiency, light guide efficiency, and conversion efficiency×light guide efficiency. This relation is based on r1=2.5 mm and r2=3.8 mm, and a similar tendency is shown in other cases. To accurate, the vertical angle φ of a mountain-shaped portion is a vertical angle in a cross section perpendicular to the ridgeline 38a of the mountain-shaped portion formed between adjacent directivity conversion patterns 37 (a maximum included angle formed by both inclined surface of the mountain-shaped portion). Therefore, the vertical angle φ depicted in FIG. 10(b) is for the purpose of description, and is not correct in the strict sense.

According to FIG. 15, directivity conversion efficiency by the directivity converting portion 33 is the highest when the vertical angle is φ=120°. When the vertical angle φ is smaller than 120°, directivity conversion efficiency is decreased and, at the same time, light leakage occurs at the directivity converting portion 33, thereby decreasing the amount of light transmitted to the light guide plate body 29 to decrease light guide efficiency. When the vertical angle φ is larger than 120°, directivity conversion efficiency is decreased, but light leakage is decreased, thereby increasing light guide efficiency.

From the above, it is required to determine an optimum vertical angle φ in consideration of both of directivity conversion efficiency and light guide efficiency. To this end, evaluation is preferably made with directivity conversion efficiency×light guide efficiency. The value of directivity conversion efficiency×light guide efficiency is preferably directivity conversion efficiency×light guide efficiency>0.85.

To this end, according to FIG. 15, the vertical angle can be

φ>92°.

More preferably, directivity conversion efficiency×light guide efficiency>0.9.

To this end, 107°<φ<154° can be set.

Furthermore, the value of directivity conversion efficiency×light guide efficiency becomes a maximum value when the vertical angle is φ=120°.

Figure 16:
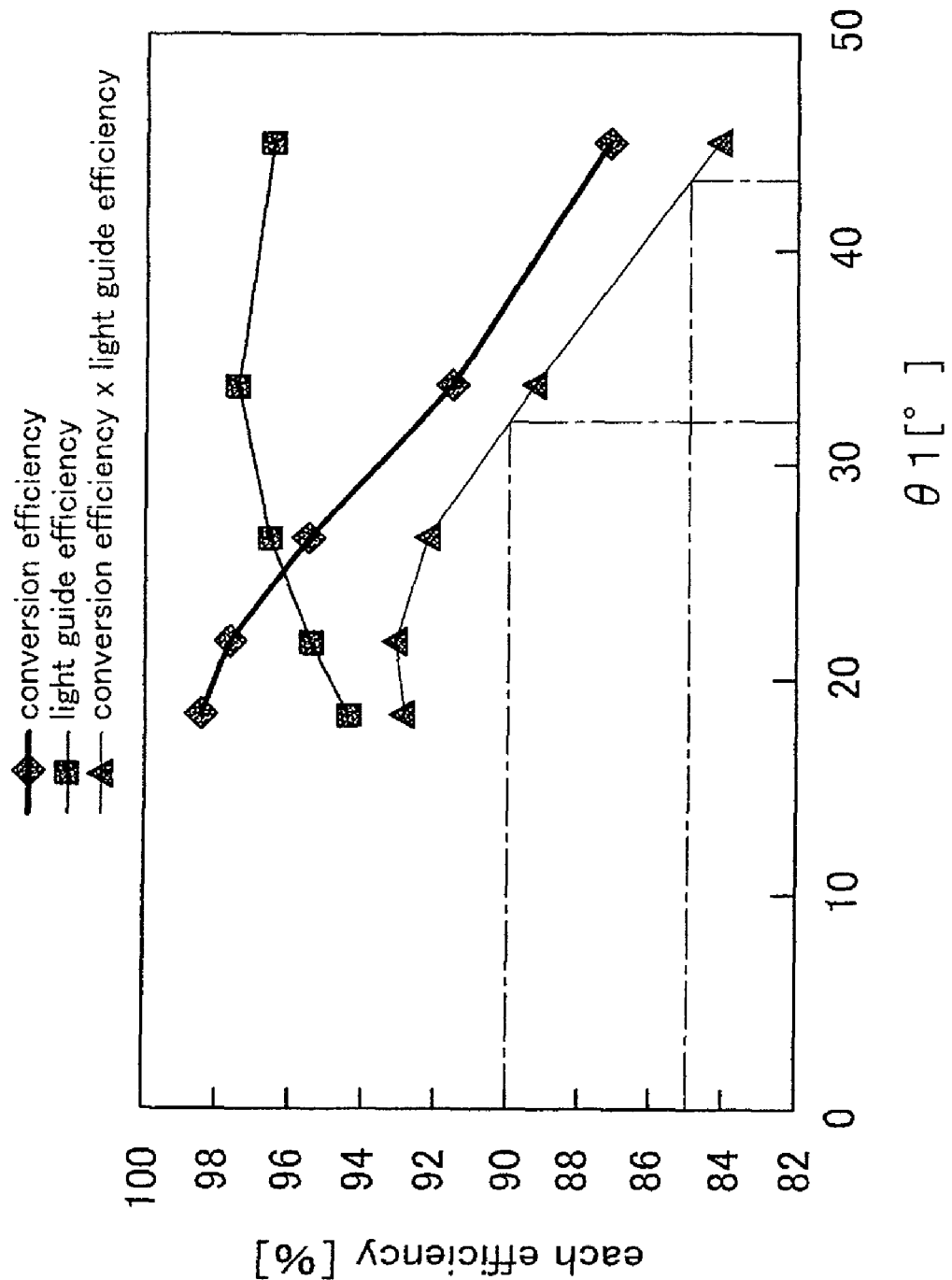
FIG. 16 is a drawing that depicts a relation between an expected angle $\theta 1$ and directivity conversion efficiency, light guide efficiency, and conversion efficiency×light guide efficiency.
Figure 17:
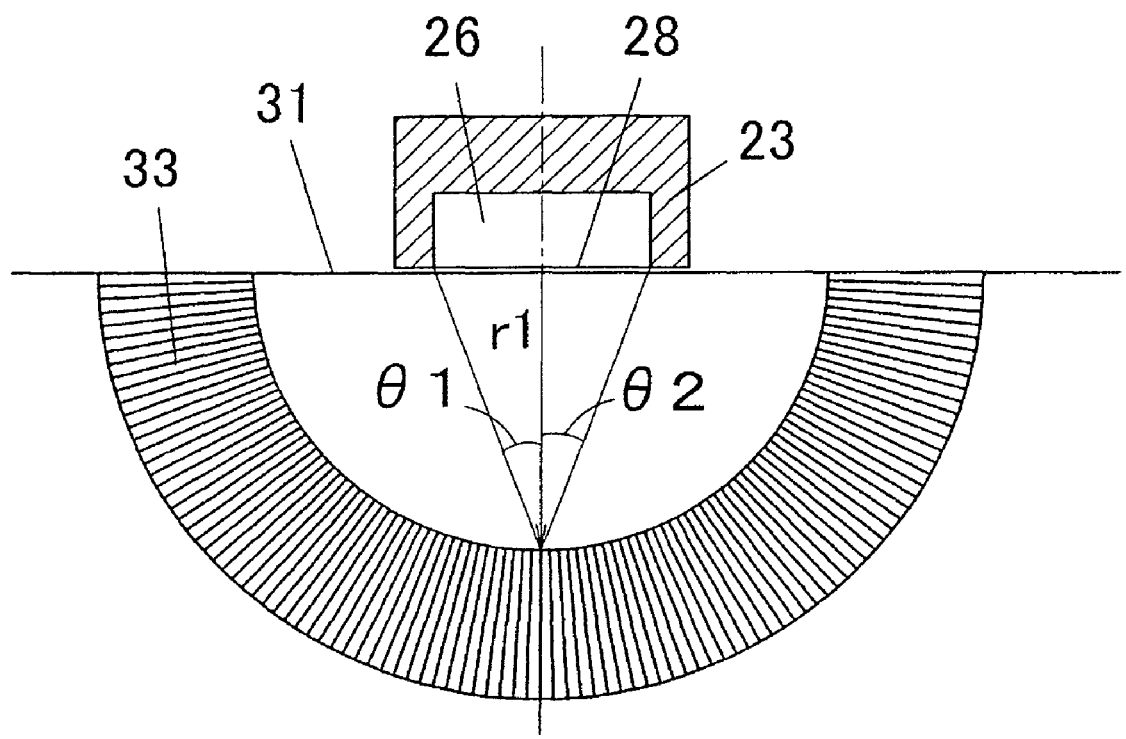
FIG. 17 is a diagram for describing expected angles $\theta 1$ and $\theta 2$.

FIG. 16 depicts a relation between an expected angle θ1 and directivity conversion efficiency, light guide efficiency, and directivity conversion efficiency×light guide efficiency. FIG. 16 shows the results through calculation with the vertical angle φ=120°. Here, as depicted in FIG. 17, the expected angle θ1 is an angle formed between a line segment extending from the center of the inner perimeter edge of the directivity converting portion 33 to one end of the light emission window 28 of the point source of light 23 and a line segment extending from the center of the inner perimeter edge of the directivity converting portion 33 to the center of the light emission window 28. The relation in FIG. 16 also applies to an angle θ2 formed between a line segment extending from the center of the inner perimeter edge of the directivity converting portion 33 to the other end of the light emission window 28 of the point source of light 23 and a line segment extending from the center of the inner perimeter edge of the directivity converting portion 33 to the center of the light emission window 28.

According to FIG. 16, to satisfy directivity conversion efficiency×light guide efficiency>0.85, θ1<43° can be set. Also, to satisfy directivity conversion efficiency×light guide efficiency>0.9, θ1≦32° can be set. Furthermore, when θ1=22°, the value of directivity conversion efficiency×light guide efficiency is maximum. Therefore, the expected angles θ1 and θ2 are preferably set as θ1≦32° and θ2≦32°. In particular, θ1=θ2=22° is particularly preferable to obtain excellent directivity conversion efficiency and light guide efficiency.

Because preferable values or preferable maximum values of the expected angles θ1 and θ2 are determined as such described above, a preferable value or a preferable lower limit value of the distance r1 from the light incident end face 31 to the inner perimeter edge of the directivity converting portion 33 is determined based on the width of the light emission window 28. For example, it is assumed that the inner perimeter edge of the directivity converting portion 33 is shaped as a semicircle centering on the center of the light emission window 28 and the width of the light emission window 28 is taken as W, $$r1 = W/(2 \tan θ1) \quad \text{(Equation 4)}$$

holds. Therefore, to set a directivity conversion efficiency equal to or higher than 0.9, r1≧0.8W can be set. To maximize directivity conversion efficiency, the distance (radius) r1 can be set at approximately 1.24W.

However, when the values of the expected values θ1 and θ2 are too small, the distance r1 to the inner perimeter edge of the directivity converting portion 33 is increased, and the distance to the light guide plate body 29, which is a light emission area, is increased. In such cases, the values can be adjusted as appropriate.

Note that an angle formed between a direction extending from an arbitrary point in the inner perimeter edge of the directivity converting portion 33 to either one end of the light emission window 28 of the point source of light 23 and a direction extending from the arbitrary point to the center of the light emission window 28 is approximately a maximum value at the center of the inner perimeter edge. Therefore, the conditions of θ1≦32° and θ2≦32° can translate to that, when viewed from a direction perpendicular to the light emission surface 32 of the light guide plate 24, an angle formed between a direction extending from an arbitrary point in the inner perimeter edge of the directivity converting portion 33 to one end of the light emission window 28 and a direction extending from the arbitrary point to the center of the light emission window 28 is equal to or smaller than 32° and an angle formed between a direction extending from an arbitrary point in the inner perimeter edge of the directivity converting portion 33 to the other end of the light emission window 28 of the point source of light 23 and a direction extending from the arbitrary point to the center of the light emission window 28 is equal to or smaller than 32°.

Figure 18:
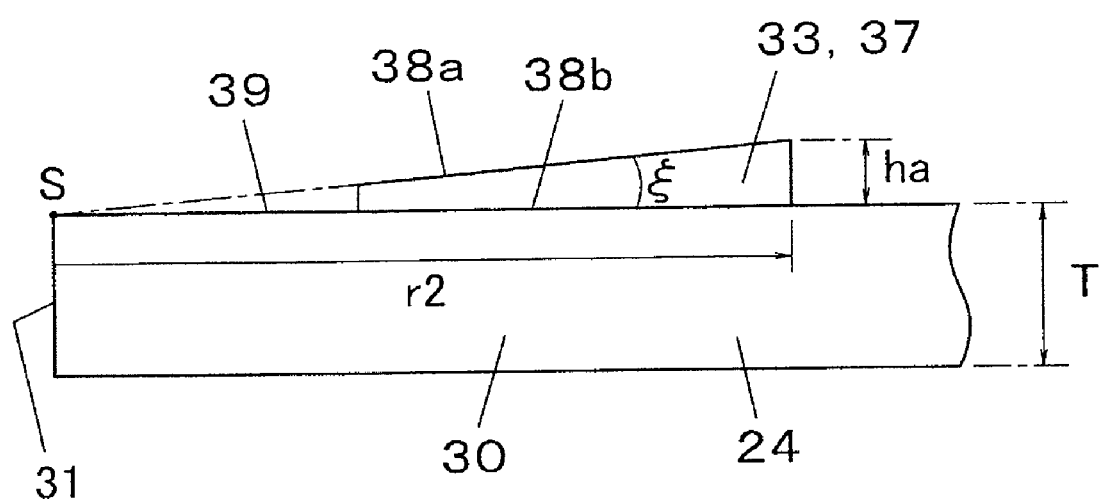
FIG. 18 is a schematic diagram for describing an upper limit value of a radius r2 of an outer perimeter edge of the directivity conversion pattern.

Also, an upper limit value of the distance r2 from the light incident end face 31 to the outer perimeter edge of the directivity converting portion 33 can be determined as follows. FIG. 18 is a schematic sectional view of the light introducing portion 30. In the case of the directivity conversion patterns 37 configured to protrude from the upper surface of the light introducing portion 30 as depicted in FIG. 18, when its maximum height ha is higher than T/2 (where T is the thickness of the light introducing portion 30), the directivity converting portion 33 is too thick in a thickness direction of the light guide plate 24 to make it impossible to satisfy the requirement of slimming the surface light source device. Moreover, in the case of the directivity conversion patterns 37 configured to be recessed on the upper surface of the light introducing portion 30 (refer to FIG. 30 to FIG. 32), when its height (depth) ha is higher than T/2, the thickness of that portion of the light guide plate 24 is too thin to make it impossible to keep the strength of the light guide plate 24. Therefore, the maximum height ha of the directivity conversion patterns 37 is preferably equal to or lower than ½ of the thickness T of the light introducing portion 30, and $$ha ≦ T/2 \quad \text{(Equation 5)}$$

can be set.

Furthermore, in the light introducing portion 30 depicted in FIG. 18, the ridgeline 38a and the valley line 38b of each directivity conversion pattern 37 gather at one point S, for example, one point (point S) positioned at the center portion of the end face (the light incident end face 31) of the light introducing portion 30 on the flat surface 39, when they are extended. In this case, a maximum height of the directivity conversion pattern 37, that is, a height (thickness) in the outer perimeter edge, ha, can be represented by $$ha = r2 \times \tan ξ \quad \text{(Equation 6)},$$

where a reference character r2 is a horizontal distance from the light incident end face 31 to the outer perimeter edge of the directivity converting portion 33 and ξ is a tilt angle (gradient) of the ridgeline 38a of the directivity conversion patterns 37.

Therefore, from Equation 5 and Equation 6, $$r2 \leq T/(2 \tan \xi) \quad \text{(Equation 7)}$$

can be obtained, and it can be found that the upper limit value of the distance (radius) r2 from the light incident end face 31 to the outer perimeter edge of the directivity converting portion 33 is $T/(2 \tan \xi)$.

Next, the tilt angle of each deflection pattern 34 is described. Prior to that, it is explained that the directivity spread (a range where the luminous intensity is equal to or higher than ½ of a peak value) of light emitted from the light emission surface 32 of the light guide plate 24 should be within ±20°, and the reason therefor is also explained.

In portable devices, such as cell phones, the display (liquid crystal display screen) is often viewed by a single person, and therefore a wide angle of visibility is not required for the screen. According to an experiment, when light is emitted only within ±10° when measured from a direction perpendicular to the screen, in a situation in which a person views the screen of the portable device while walking, the direction in which the screen is viewed sways as the person walks, and therefore the screen flickers, and viewing images and characters is difficult. By contrast, when the direction in which light is emitted is on the order of ±20° when measured from the direction perpendicular to the screen, it has been confirmed that images and characters are easy to be viewed even when a person views the screen of the portable device while walking. From this result, it can been seen that light emitted outside of a range of ±20° when measured from the direction perpendicular to the screen becomes a loss, thereby causing a decrease in viewability from a front direction of the display. In other words, to increase light use efficiency of the surface light source device and improve front viewability of the liquid crystal display device, the directivity of light emitted from the surface light source device can be wider than a degree on the order of ±10° and can be narrower than a degree on the order of ±20°.

However, while directivity of light emitted from the light guide plate can be easily widened by using a diffusion plate, it is difficult to narrow directivity. By using a prism sheet, the directions of emitted light beams can be made uniform. However, as for the light beams with the emitting directions once widened, it is difficult to make these emitting directions uniform in a narrow range even by using a prism sheet. Moreover, also to make the thickness of the surface light source device thin, a prism sheet is preferably not used.

Figure 19:
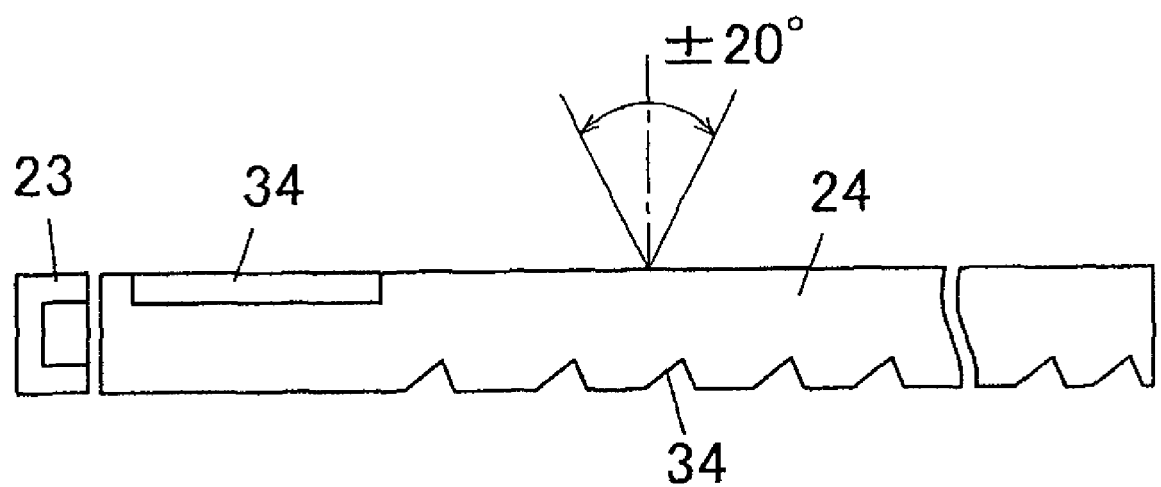
FIG. 19 is a diagram depicting a directivity characteristic of light perpendicularly emitted from a light emission surface of the light guide plate.
Figure 20:
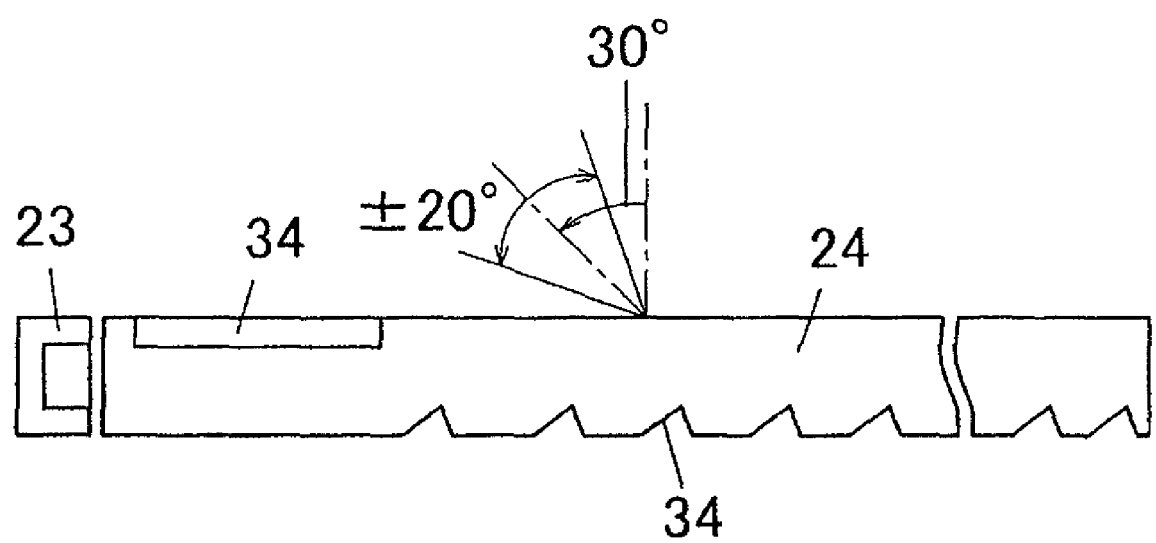
FIG. 20 is a diagram depicting a directivity characteristic of light emitted from the light emission surface of the light guide plate in a direction of 30° with respect to its normal.

Therefore, to manufacture a surface light source device excellent in light use efficiency and viewability, as depicted in FIG. 19, of light emitted from the light guide plate 24 itself, without using a prism sheet a higher ratio of light emitted within ±20° when measured from a normal drawn on a light emission surface is better, and light at a ratio of at least ½ or more of a total amount of light emitted from the light emission surface, preferably, ⅔ or more thereof, is preferably emitted to the inside of that angular region. Also, depending on the use purpose of the surface light source device, a peak value direction of directivity of light emitted from the light guide plate 24 may preferably form an angle such that the direction is tilted from a direction perpendicular to the screen toward a point source of light side. Also in this case, the directivity spread is preferably narrower than a degree on the order of ±20° (that is, the full width at half maximum is on the order of 40°). For example, in monitor for vehicles, as depicted in FIG. 20, directivity is required to have its peak at an angle shifted by 30 degrees from a direction perpendicular to the screen. Also in this case, the directivity spread is preferably narrower than ±20°.

As a method of setting a directivity spread of light emitted from the light guide plate without using a prism sheet on the order of ±20° or narrower, a method of controlling the shape of the deflection patterns of the light guide plate can be thought. Thus, firstly, as a characteristic amount for describing a characteristic of the deflection patterns of various shapes, the concept of an average tilt angle of the deflection patterns is described.

Figure 21:
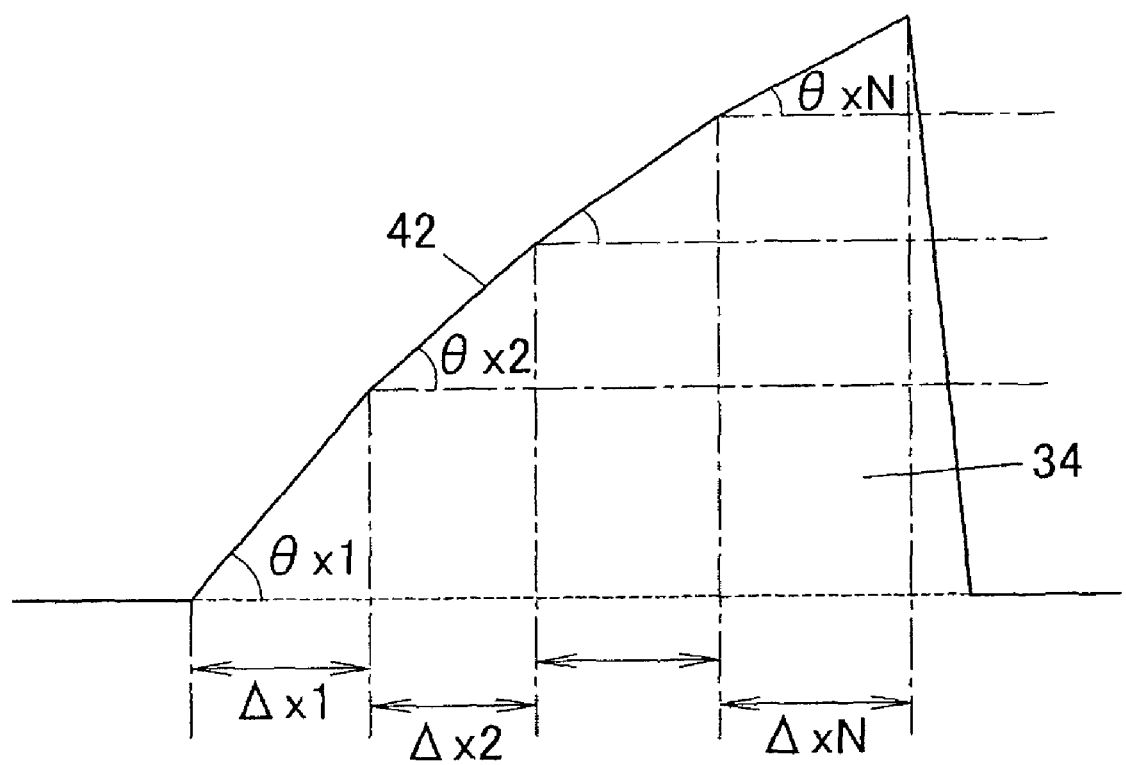
FIG. 21 is a diagram for describing a definition of an average tilt angle of a deflection pattern.

FIG. 21 is an enlarged view of a cross section of a certain deflection pattern 34 perpendicular to a length direction (in particular, a cross-section shape including a line segment connecting the point source of light and the deflection pattern and residing on a plane perpendicular to the light emission surface). In the deflection pattern 34 of FIG. 21, a bent inclined surface 42 serves as a surface for total reflection of light. However, light entering the inclined surface 42 at an angle exceeding a critical angle of reflection leaks outside the inclined surface 42. When the cross section of this deflection pattern 34 is divided into microsections of $\Delta x1, \Delta x2, \ldots, \Delta xN$ along a horizontal direction (a direction parallel to the back surface of the light guide plate 24), and tilt angles of the inclined surface 42 in the respective microsections are taken as $\theta x1, \theta x2, \ldots, \theta xN$, consider an average amount of absolute values of the tilt angles represented by $$\Sigma |\theta xi \times \Delta xi| / \Sigma |\Delta xi| \quad \text{(Equation 8)}.$$

Note that each sum total in Equation 8 is a sum total from i=1 to i=N. In the average amount of the tilt angles represented by this Equation 8, a value obtained when N is a sufficiently large value and $\Delta x1, \Delta x2, \ldots, \Delta xN$ each have an extremely small value (mathematically, when $N \to \infty$, $\Delta x1 = \Delta x2 = \ldots = \Delta xN \to 0$) is defined as an average tilt angle $\theta x^*$ of the deflection pattern 34. Note that as for a surface opposite to the inclined surface 42, the surface can be configured at any tilt angle.

The average tilt angle $\theta x^*$ is described with a specific example. FIG. 22(a) depicts a deflection pattern 34 having the inclined surface 42 at a tilt angle of 50°. In this case, the average tilt angle $\theta x^*$ is also 50°.

Furthermore, FIG. 22(b) depicts a deflection pattern 34 having a region with a tilt angle 50° and a region at a tilt angle 40°. In this deflection pattern 34, it is assumed that a length of the region with the tilt angle 50° projected in a horizontal direction is taken as $2\Lambda/5$ and a length of the region with the tilt angle 40° projected in the horizontal direction is taken as $3\Lambda/5$. $\Lambda$ represents a length of the inclined surface 42 projected in the horizontal direction. In this case, $$\{50° \times (2\Lambda/5) + 40° \times (3\Lambda/5)\}/\Lambda = 44°,$$

and therefore the average tilt angle is $\theta x^* = 44°$

Note that the average tilt angle $\theta x^*$ is 0° on the flat surface.

In which angular direction light emitted from the light emission surface has a peak of directivity is determined by the refractive index of the light guide plate 24, and the average tilt angle $\theta x^*$ of the deflection pattern 34. For example, to set a peak of directivity in a direction perpendicular to the light emission surface (0° direction), when the refractive index of the light guide plate 24 is 1.53, the average tilt angle $\theta x^*$ of the deflection pattern 34 can be set at 50°.

Also, the directivity spread of light emitted from the light emission surface is determined based on the degree of variability of the tilt angle of the inclined surface 42. That is, to set a directivity spread wider than ±10° and narrower than ±20°, the tilt angle of the deflection pattern 34 can be varied in a range of $\theta x^* \pm 10°$. For example, to set a peak of directivity in a direction perpendicular to the light emission surface (0° direction) and set a directivity spread at a midpoint between ±10° and ±20°, when the refractive index of the light guide plate 24 is 1.53, the average tilt angle θx* of the deflection pattern 34 can be set at 50°, and the tilt angle of each deflection pattern 34 can be set in a range of 50°±10°.

Specifically, as depicted in FIG. 23, when the number or frequency of provision of deflection patterns 34 having a length in the horizontal direction of Λ and a tilt angle of 40° is equal to that of deflection patterns 34 having the same length in the horizontal direction of Λ and a tilt angle of 60°, the average tilt angle θx* is 50°, and the tilt angle of each deflection pattern 34 is θx*±10°. In this case, when the light guide plate 24 has a refractive index of 1.53, the peak of directivity is in a direction perpendicular to the light emission surface (0° direction), and the directivity spread is on the order of ±14°.

Figure 24:
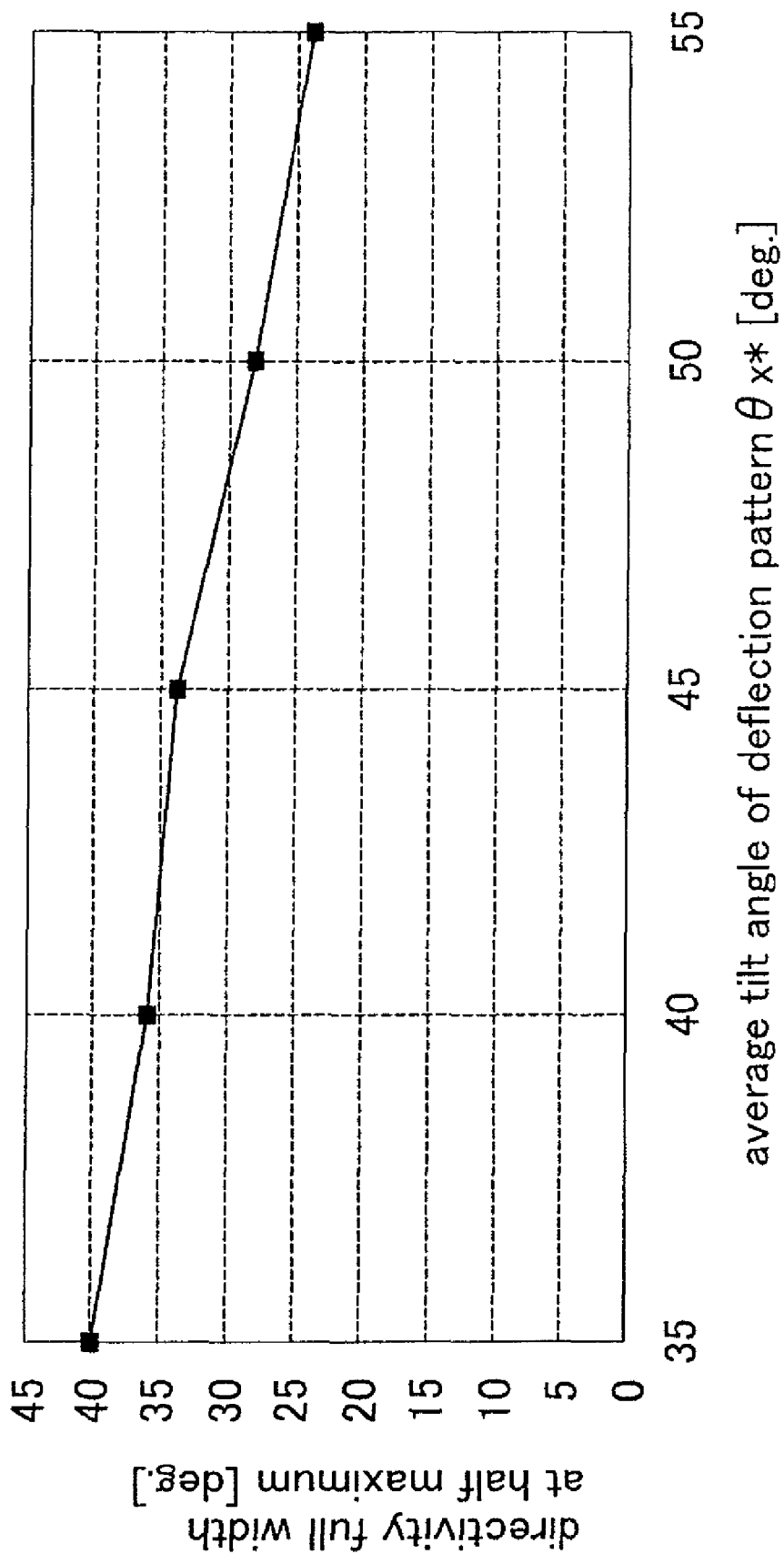
FIG. 24 is a drawing that depicts a relation between a directivity full width at half maximum of a luminous intensity of light emitted from the light guide plate and the average tilt angle of the deflection pattern.

FIG. 24 is a drawing that depicts a relation between the value of the average tilt angle θx* of the deflection pattern 34 and a full width at half maximum of light emitted from the light emission surface when variability of the tilt angle is θx*±10°. As described above, directivity of light emitted from the light emission surface 32 of the light guide plate 24 preferably has a full width at half maximum narrower than 40° (the directivity spread is ±20°). Therefore, according to FIG. 24, the average tilt angle θx* of the deflection pattern 34 is required to be equal to or larger than 35°. Also, although not shown, when the average tilt angle θx* of the deflection pattern 34 is smaller than 35°, the full width at half maximum is widened more than 40°, which is not preferable.

Figure 25:
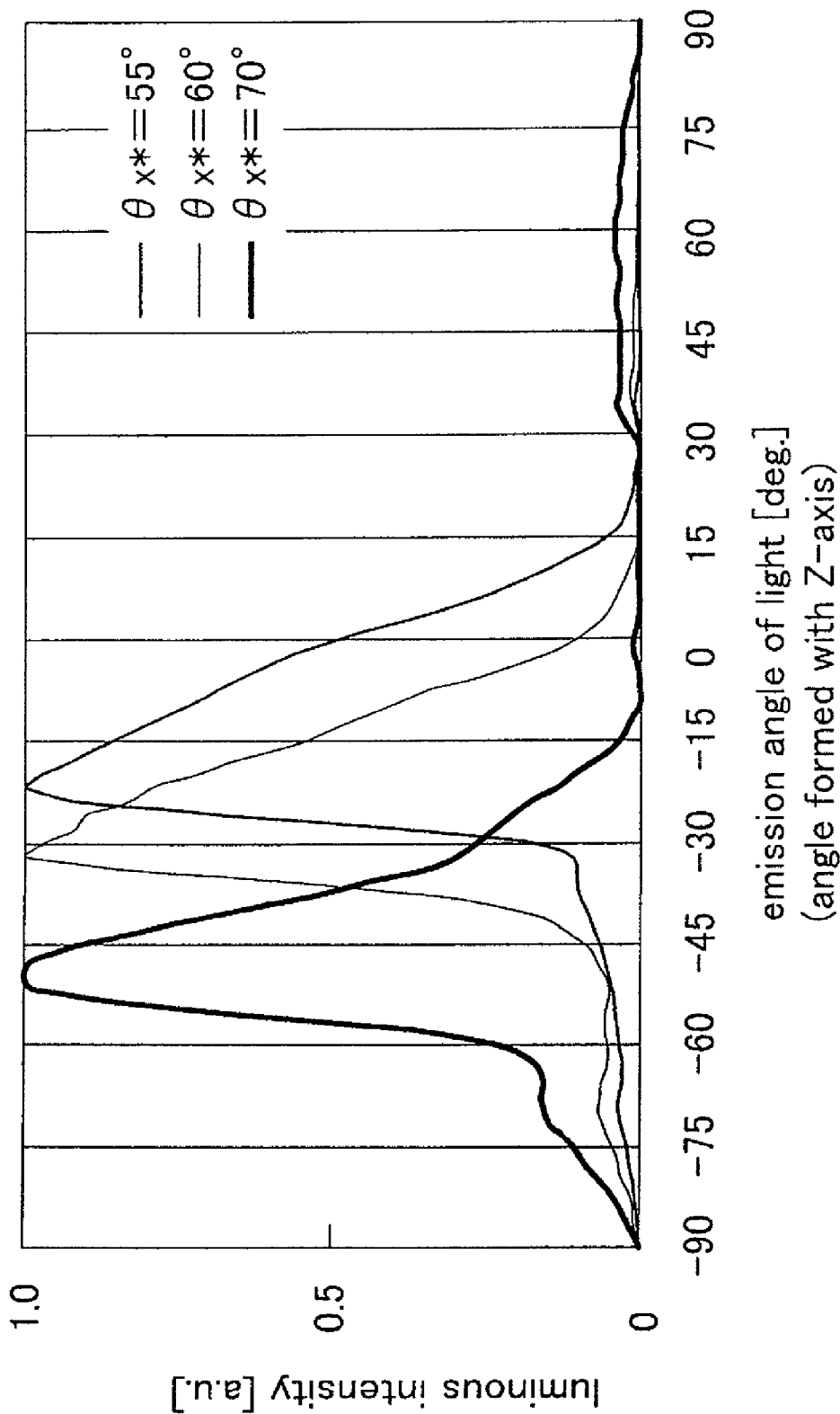
FIG. 25 is a drawing that depicts a directivity characteristic of the luminous intensity of light emitted from the light guide plate.

Furthermore, FIG. 25 is a drawing that depicts a directivity characteristic when the average tilt angle θx* of the deflection pattern 34 is 55°, 60°, and 70° (variability of the tilt angle is θx*±10°, with the horizontal axis representing an emission angle of light emitted from the light emission surface 32 and the vertical axis representing its luminous intensity. According to FIG. 25, when the average tilt angle θx* is 70°, a peak value direction of the directivity characteristic is shifted by 50° from a direction perpendicular to the light emission surface (Z-axis direction). However, because a use purpose requiring a peak value direction shifted by 50° or higher is not thinkable, according to FIG. 24 and FIG. 25, the average tilt angle θx* is required to be in a range of 35° to 70°.

To sum up the above study results, the deflection pattern 34 of the light guide plate 24 preferably has a triangle-shaped cross section perpendicular to its length direction. However, this deflection pattern 34 may be a polygon as long as it has one flat surface facing a light incident end face side. The average tilt angle θx* of the deflection pattern 34 is determined according to the peak direction of light emitted from the light emission surface, the refractive index of the light guide plate 24, and others. For example, as long as the refractive index of the light guide plate 24 is in a range of 1.5 to 1.6, to set a peak of the directivity characteristic in a direction perpendicular to the light emission surface of the light guide plate 24, the tilt angle of each deflection pattern 34 can be set in a range within 50°±10°, and the entire average tilt angle θx* can be set at approximately 50°. Note that the position where the directivity conversion pattern 37 is formed may be on a light emission surface side of the light guide plate 24 or a surface opposite thereto.

Figure 26:
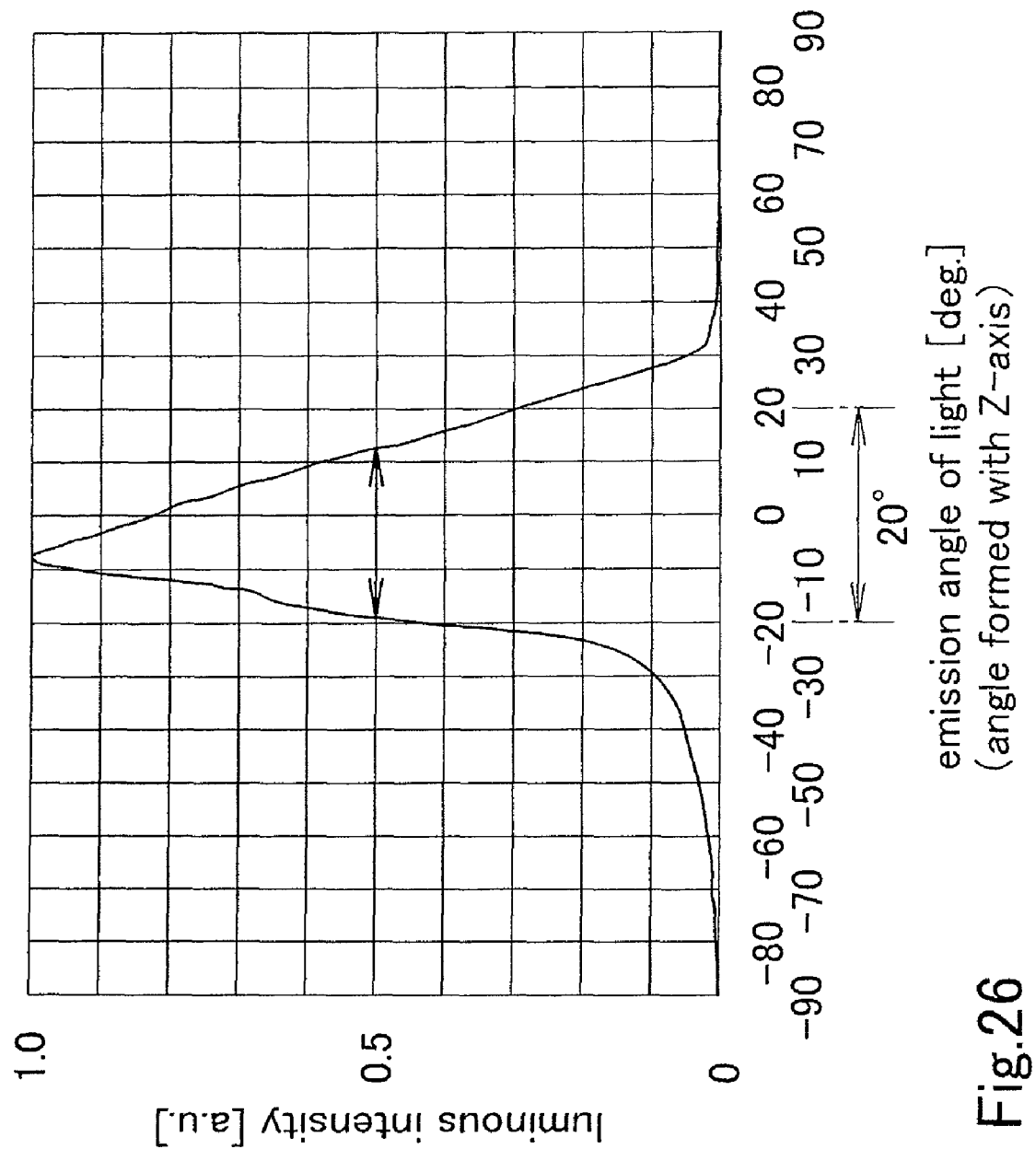
FIG. 26 is a drawing that depicts the directivity characteristic of the luminous intensity of light emitted from the light guide plate.

In a specific example, when the refractive index of the light guide plate 24 is 1.59, the directivity spread of light immediately after entering the light guide plate 24 is ±39°, and the directivity spread inside the light guide plate 24 of light passing through the directivity conversion pattern 37 is approximately ±28°. When light of this directivity spread is reflected off the deflection patterns 34 to be emitted from the light emission surface, in the directivity characteristic of the emitted light as depicted in FIG. 26, the directivity spread of luminous intensity falls in a range within ±20° (a full width at half maximum of 40°), and light with its directivity characteristic narrowed is emitted from the light emission surface of the light guide plate 24. For this reason, a prism sheet or the like is not required on an emission surface side of the light guide plate 24, and therefore the backlight can be slimmed down.

Figure 27:
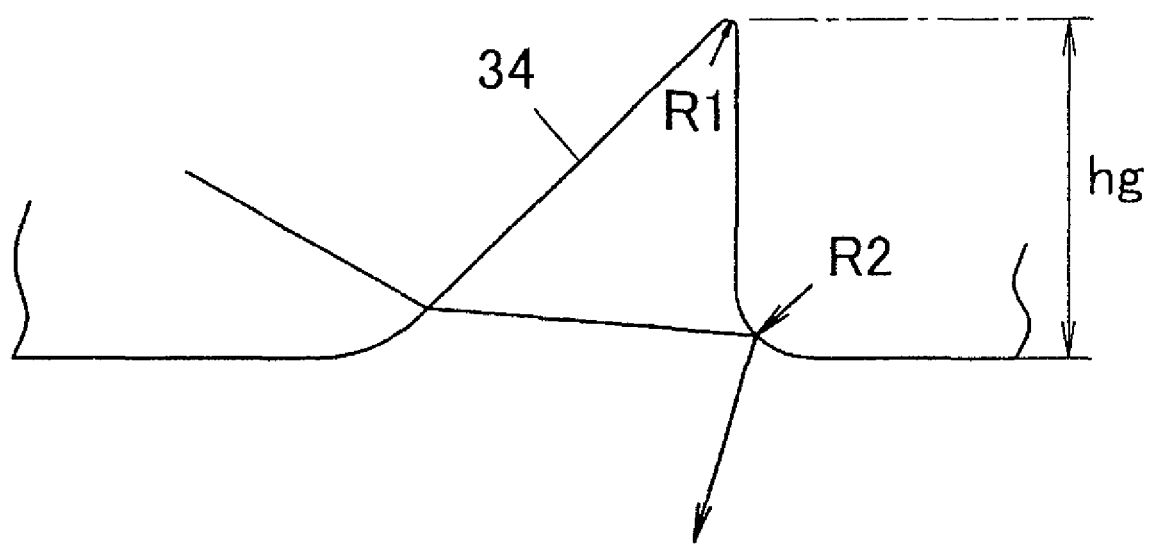
FIG. 27 is a diagram depicting a rounded angle occurring in the deflection pattern.

Note that when the deflection patterns 34 are formed on the light guide plate 24, a vertex of each deflection pattern 34 in a polygon shape and its boundary portion with the back surface of the light guide plate may be rounded. With these portions rounded, as depicted in FIG. 27, light leaks at these portions from the deflection patterns 34, thereby decreasing luminance uniformity. Therefore, radiuses of curvature R1 and R2 of these rounded portions are preferably as small as possible. However, even these portions are made small, individual variability and/or local variability occurs according to some molding conditions, such as variability in lot of resin, which is not preferable. To suppress such variability, a mold for molding is preferably provided in advance with a slight curvature. That is, from a molding limitation, the radiuses of curvature R1 and R2 are set equal to or larger than 0.25 μm. Also, to suppress a decrease in luminance uniformity, the radiuses of curvature R1 and R2 are preferably at least equal to or smaller than ⅓ of a height hg of the deflection patterns 34 and further preferably, equal to or smaller than ⅕ thereof.

First Modification Example of First Embodiment

Figure 28:
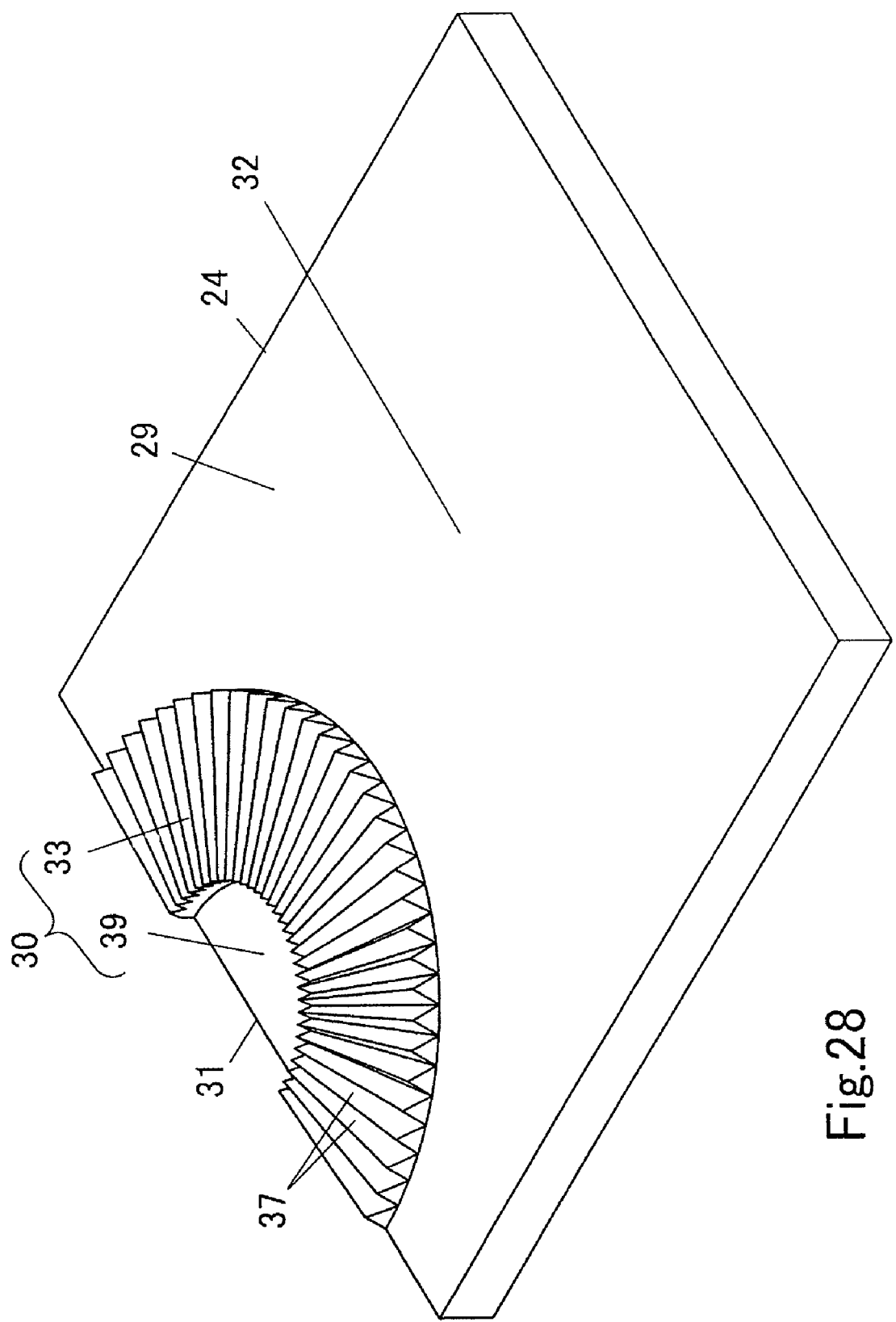
FIG. 28 is a perspective view of a light guide plate according to a first modification example of the first embodiment.
Figure 29:
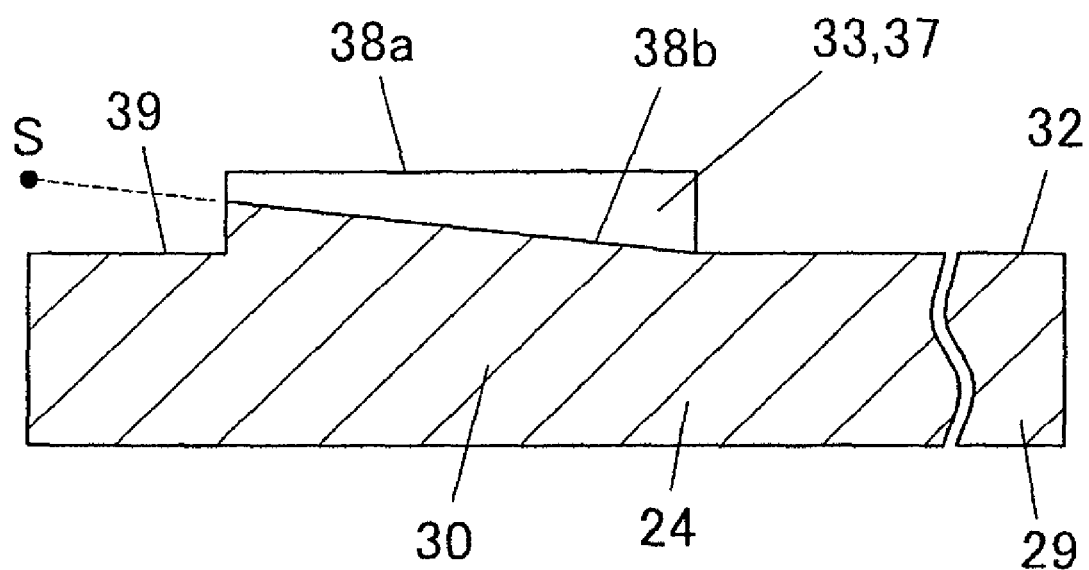
FIG. 29 is a schematic sectional view of the light guide plate according to the first modification example of the first embodiment.

FIG. 28 is a perspective view of a light guide plate 24 according to a first modification example, and FIG. 29 is a partially-sectional schematic view thereof. Also in this light guide plate 24, a directivity converting portion 33 is provided so as to protrude from the surface of the light guide plate 24, but each ridgeline 38a of arranged directive conversion patterns 37 is horizontal. An end of a valley line 38b on a side near a point source of light 23 pops up high, and an end of the valley line 38b on a side away from the point source of light 23 has the same height as that of a light emission surface 32 and is linearly tilted. Thus, the V groove of the directivity converting portion 33 linearly goes deeper as going away from the point source of light 23. The inner perimeter surface and the outer perimeter surface of the directivity converting portion 33 are surfaces perpendicular to a plane parallel to the light emission surface 32. Also, the valley lines 38b gather at one point S when they are extended to a point source of light 23 side.

Second Modification Example of First Embodiment

Figure 30:
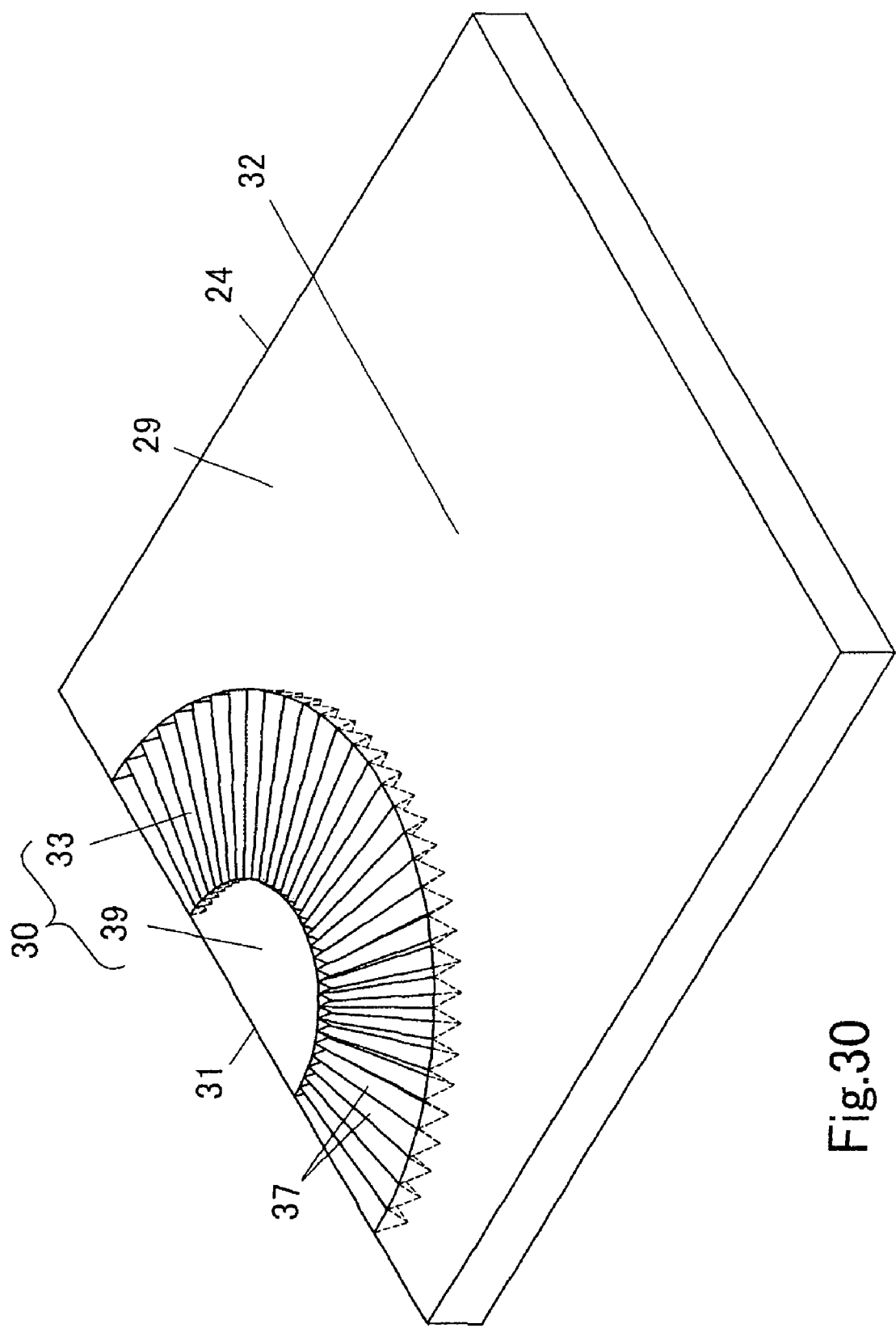
FIG. 30 is a perspective view of a light guide plate according to a second modification example of the first embodiment.
Figure 31:
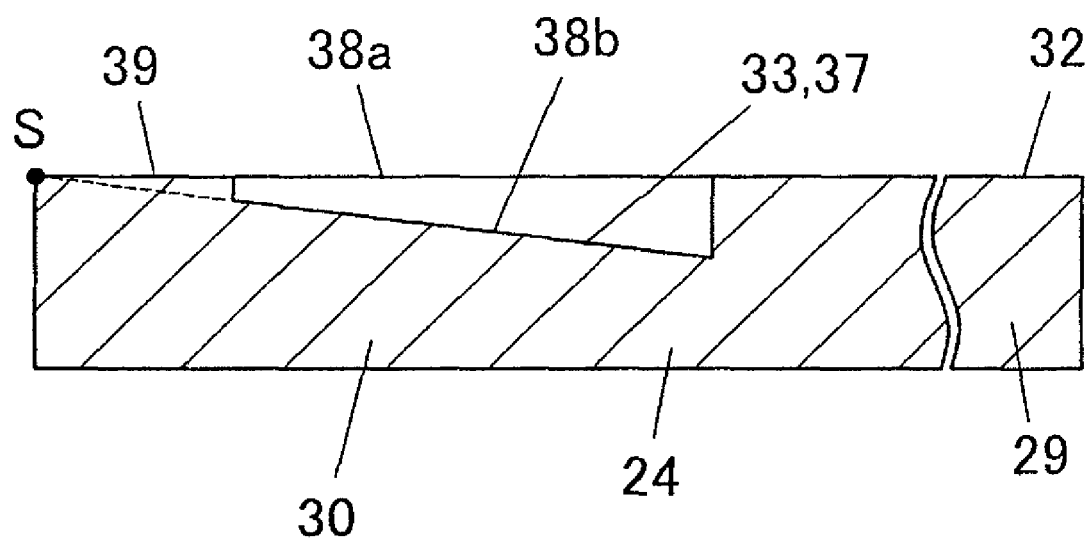
FIG. 31 is a schematic sectional view of the light guide plate according to the second modification example of the first embodiment.

FIG. 30 is a perspective view of a light guide plate 24 according to a second modification example, and FIG. 31 is a partially-sectional schematic view thereof. In this light guide plate 24, a directivity converting portion 33 is formed so that the surface of the light guide plate 24 is recessed, and each ridgeline 38a of arranged V-grooved directivity conversion patterns 37 is horizontal, and is in the same plane as that of the light emission surface 32. An end of a valley line 38b on a side near a point source of light 23 has a shallow depth, and an end of the valley line 38b on a side away from the point source of light 23 has a deep depth. Therefore, the V groove of the directivity converting portion 33 linearly goes deeper as going away from the point source of light 23, and the valley line 38b is also linearly tilted. Also, the inner perimeter surface and the outer perimeter surface of the directivity converting portion 33 are perpendicular surfaces with respect to a flat surface 39 and the light emission surface 32. The valley lines 38b gather at one point S when they are extended to a point source of light 23 side.

Figure 32:
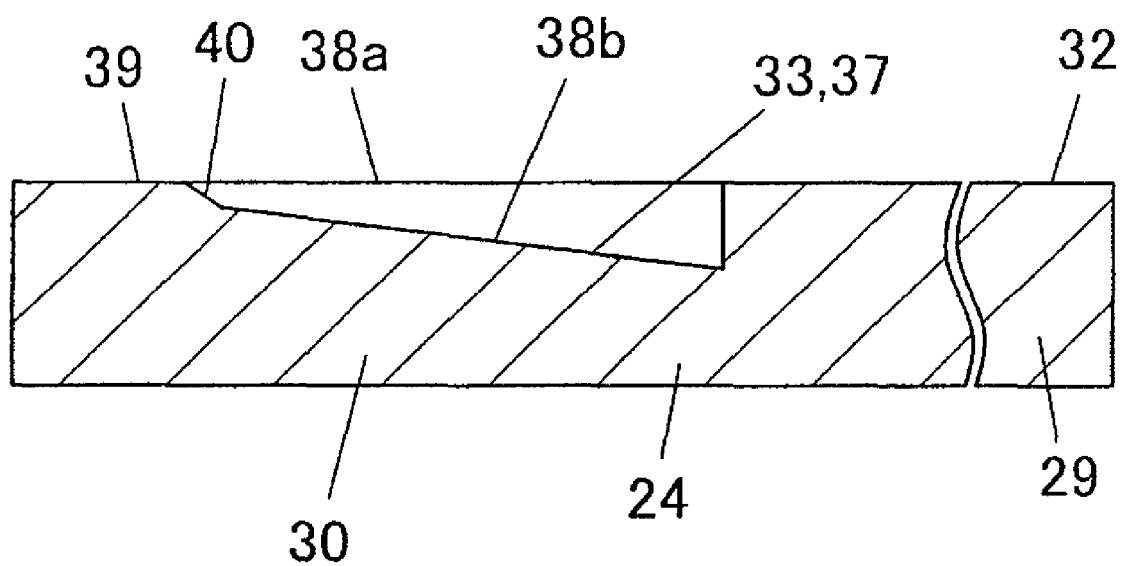
FIG. 32 is a schematic sectional view depicting a different example of a directivity converting portion.

Also, as depicted in FIG. 32, an inner perimeter surface 40 of the directivity converting portion 33 with a recessed structure may be tilted. When the inner perimeter surface 40 of the directivity converting portion 33 with a recessed structure is a perpendicular surface, light may leak from this inner perimeter surface to the outside. By tilting the inner perimeter surface 40 as depicted in FIG. 32, leakage of light from this can be suppressed. However, when the inner perimeter surface of the directivity converting portion 33 is tilted and the end of the valley line 38b is extended to the inside, the distance from the point source of light 23 becomes short, and therefore part of light tends to leak from the inclined surface. Thus, the inclined surface is required to be designed in consideration of balance therebetween.

Third Modification Example of First Embodiment

FIG. 33(a) is a plan view of the shape of a directivity converting portion 33 according to a third modification example, and FIG. 33(b) is a schematic sectional view thereof passing through its ridgeline 38a. In the first embodiment, the inner perimeter edge and the outer perimeter edge of the directivity converting portion 33 are in an arc shape, and the inner perimeter surface and the outer perimeter surface of the directivity converting portion 33 are perpendicular surfaces. In the first embodiment, because the outer perimeter surface is a perpendicular surface, when light enters the outer perimeter surface of the directivity converting portion 33 at an angle of incidence smaller than the critical angle of total reflection, light may leak from the outer perimeter surface.

By contrast, in the third modification example, the inner perimeter edge of the directivity converting portion 33 is in an arc shape, but the outer perimeter edge of the directivity converting portion 33 is serrated with asperities. That is, a distance r2 to an end of the ridgeline 38a on a side away from the point source of light 23 is longer than a distance r2 to an end of the valley line 38b on a side away from the point source of light 23. And, the outer perimeter surface of the directivity converting portion 33 forms an inclined surface 41 tilted from a direction perpendicular to the light emission surface 32. Therefore, light tends not to leak from the inclined surface 41 of the directivity converting portion 33, thereby obtaining an effect of light leak prevention.

However, when the inclined surface 41 is provided on the outer perimeter surface of the directivity converting portion 33, the ridgeline 38a is prolonged to increase the area of the directivity converting portion 33. Thus, this is not very preferable in view of space-saving design. Therefore, it is also effective to decrease a projection at an outside end of the ridgeline 38a as much as possible to curve the ridgeline 38a between inclined surfaces 41 for space saving.

Note that not only the outer perimeter surface of the directivity converting portion 33 but also the inner perimeter surface of the directivity converting portion 33 may be formed with an inclined surface. However, because the inner perimeter surface of the directivity converting portion 33 is a portion shadowed when viewed from the point source of light 23, it does not matter whether the inner perimeter surface is a perpendicular surface or an inclined surface. Therefore, the inner perimeter surface of the directivity converting portion 33 may be an inclined surface as required. Also, when the inner perimeter surface of the directivity converting portion 33 is a perpendicular surface, abnormal light emission may occur at a corner portion between the inner perimeter surface of the directivity converting portion 33 and the flat surface 39. Therefore, it is also preferable to mildly round this portion.

Fourth Modification Example of First Embodiment

Figure 34:
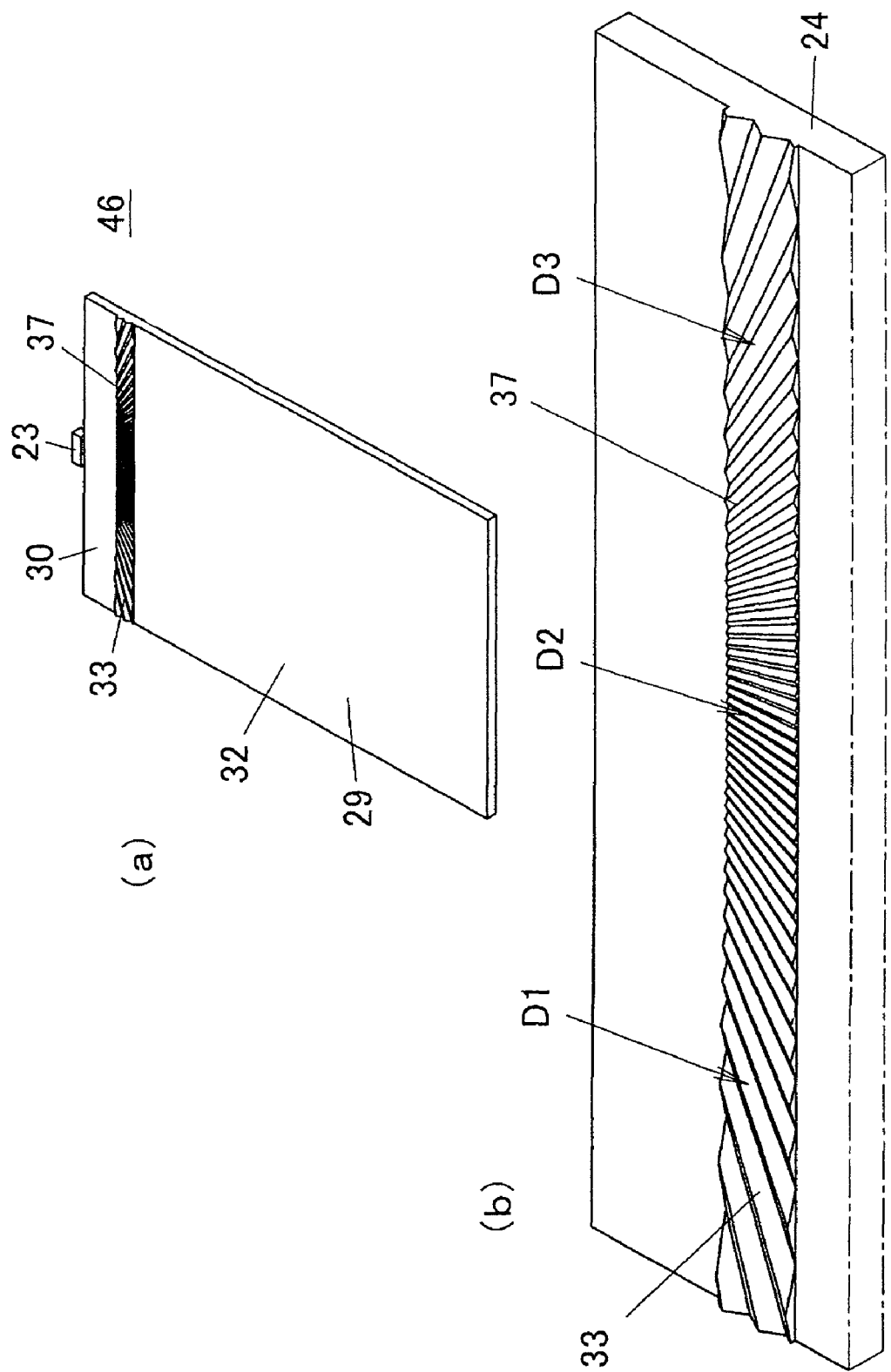
FIG. 34($a$) is a perspective view of a surface light source device according to a fourth modification example of the first embodiment, and FIG. 34($b$) is a partially-enlarged perspective view thereof.
Figure 35:
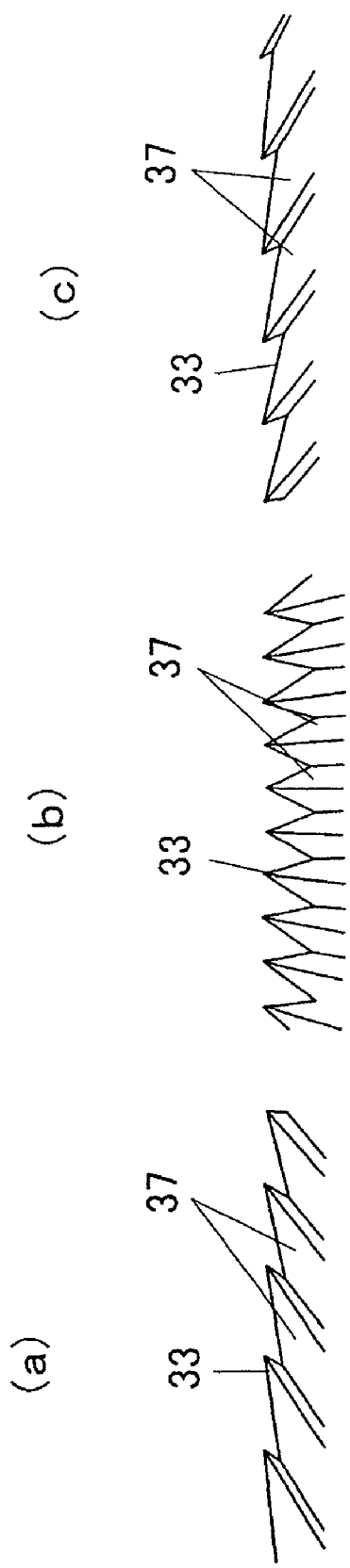
FIGS. 35($a$), 35($b$), and 35($c$) are diagrams each depicting a shape of a directivity conversion pattern at positions D1 to D3 in FIG. 34($b$), respectively.

FIG. 34(a) is a perspective view of a surface light source device 46 according to a fourth modification example, and FIG. 34(b) is a partially-enlarged perspective view thereof. In this surface light source device 46, a directivity converting portion 33 is provided in a linear band-shaped region from one side end of the surface of a light guide plate 24 to another side end. Although the directivity converting portion 33 has a bilaterally symmetrical shape, each directivity conversion pattern 37 forming the directivity converting portion 33 is radially formed centering on a point source of light 23 or one point near the point source of light 23. Therefore, as depicted in FIGS. 35(a), 35(b), and 35(c), the directivity conversion pattern 37 has a different shape depending on the position of the directivity converting portion 33. That is, FIG. 35(a) depicts a part of the shape of the directivity conversion pattern 37 in a portion D1 in FIG. 34, FIG. 35(b) depicts a part of the shape of the directivity conversion pattern 37 in a portion D2 in FIG. 34, and FIG. 35(c) depicts a part of the shape of the directivity conversion pattern 37 in a portion D3 in FIG. 34. The others are similar to those in the first embodiment.

Fifth Modification Example of First Embodiment

Figure 36:
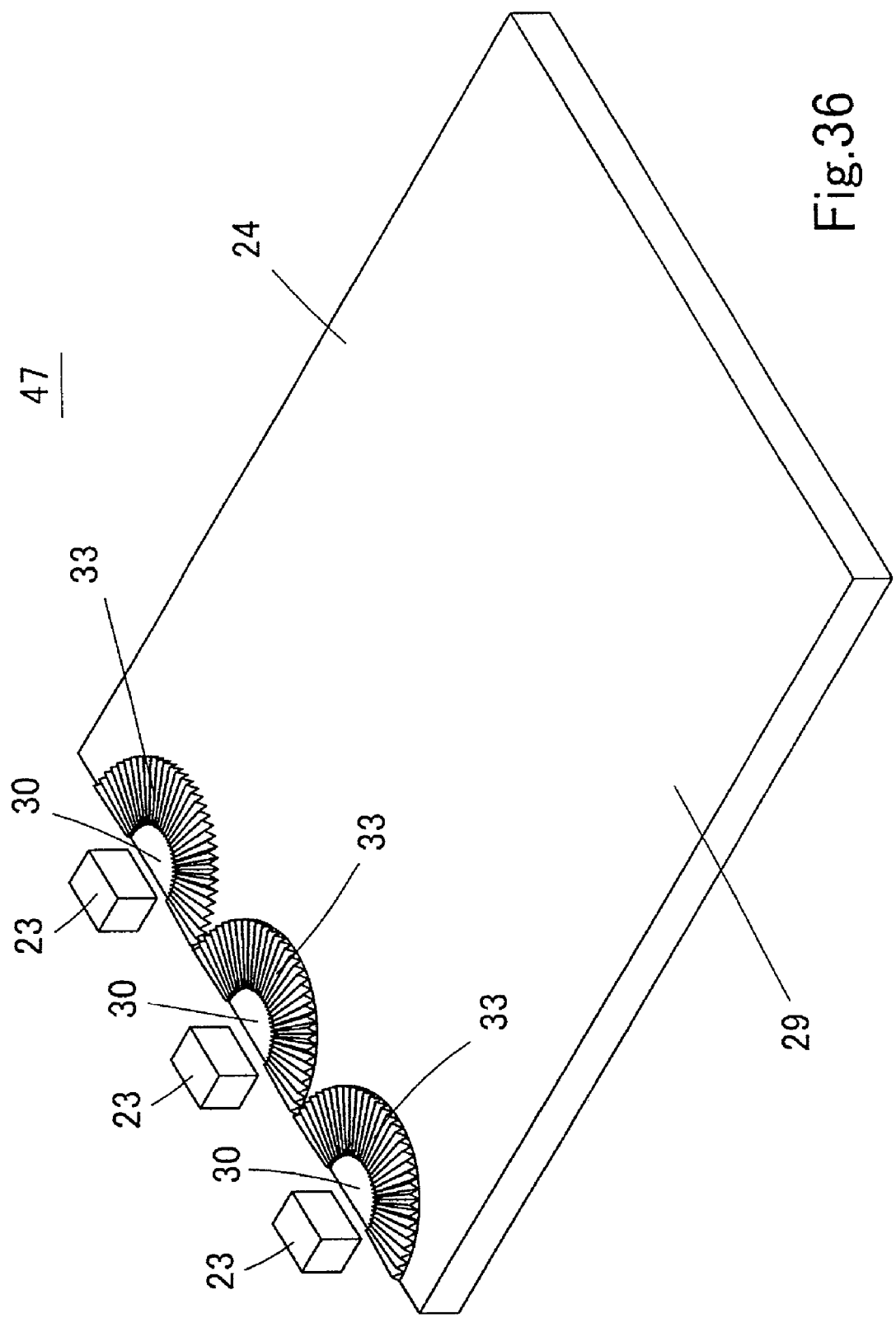
FIG. 36 is a perspective view of a surface light source device according to a fifth modification example of the first embodiment.

FIG. 36 is a perspective view of a surface light source device 47 according to a fifth modification example. This surface light source device 47 has a plurality of light introducing portions 30 each having an arc-shaped directivity converting portion 33 arranged along an end edge of a light guide plate 24. At the position facing a light incident end face 31 of each light introducing portion 30, a point source of light 23 is placed. In this surface light source device 47, the plurality of point sources of light 23 can be used, and therefore luminance of light emission of the surface light source device 47 can be increased. Note that when adjacent directivity converting portions 33 are arranged so as to be superposed each other, it is preferable to delete a superposing portion of each directivity converting portion 33 to prevent superposition between the directivity converting portions 33.

Also, when a plurality of point sources of light 23 are used and the plurality of directivity converting portions 33 are arranged along an end edge of the light guide plate 24 in this manner, a distance (radius) r2 from a light incident end face 31 to an outer perimeter edge of the directivity converting portion 33 is further restricted in addition to Equation 7 mentioned above, which is described below.

Figure 37:
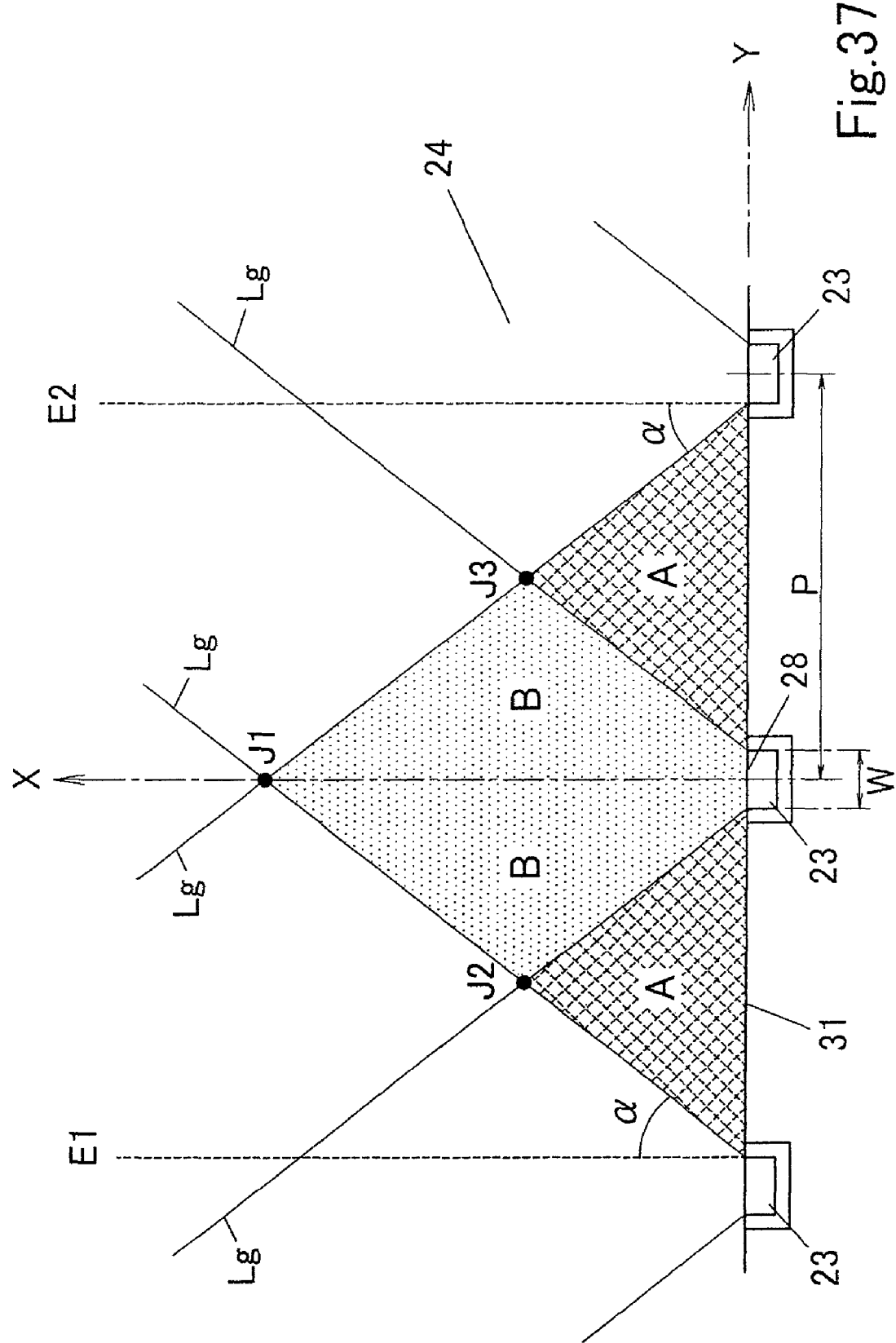
FIG. 37 is a schematic diagram depicting a range inside the light guide plate where light emitted from each of point sources of light configured to be arranged in a line can reach.

FIG. 37 is a schematic diagram depicting the light introducing portions 30 viewed from a vertical direction, with the plurality of point sources of light 23 arranged along the end face of the light introducing portion 33. In FIG. 37, when viewed from a direction perpendicular to the light guide plate 24, a direction passing through the center of one point source of light 23 and perpendicular to the end face of the light guide plate 24 is defined as an X axis, and a direction along the light incident end face 31 of the light guide plate 24 is defined as a Y axis. When a refractive index of the light guide plate 24 is taken as ng, the spread of light emitted from a light emission window 28 of the point source of light 23 and entering the light introducing portion 30 from the light incident end face 31 is $\pm\alpha=\pm\arcsin(1/ng)$. In FIG. 37, each light beam passing through the edge of the directivity spread inside the light introducing portion 30 of light emitted from each point source of light 23 is represented as Lg. When attention is focused on a region (a region between line segments E1 and E2 in FIG. 37) between two point sources of light 23 interposing one point source of light 23 (hereinafter referred to as a center point source of light 23), regions A depicted in FIG. 37 are regions that light from any of the point sources of light 23 does not reach, regions B are regions that only light from the center point source of light 23 reaches, and regions other than the regions A and B are regions that light of any of the point sources of light 23 positioned at both sides of the center point source of light 23 reaches.

To cause the directivity converting portion 33 placed toward the front of the center point source of light 23 to reflect only light of the center point source of light 23 and not to reflect light from the point sources of light 23 on both sides thereof, the directivity converting portion 33 is required to be within a region obtained by merging the regions A and the regions B. Therefore, at the front of the center point source of light 23, the directivity converting portion 33 is required to be within a region satisfying the following three equations:

$$X > 0 \quad \text{(Equation 9)};$$

$$X \leq \{-2Y+(2P-W)\}/(2 \tan \alpha) \quad \text{(Equation 10); and}$$

$$X \leq \{2Y+(2P-W)\}/(2 \tan \alpha) \quad \text{(Equation 11)}.$$

Here, P is an arrangement pitch of the plurality of point sources of light 23, W is a width of the light emission window 28 of the point source of light 23, α is arcsin (1/ng), and ng is a refractive index of the light guide plate 24.

Note that X coordinates and Y coordinates of a front end J1 of the regions B and front ends J2 and J3 of the regions A are:

$$J1((2P-W)/(2 \tan \alpha), 0);$$

$$J2((P-W)/(2 \tan \alpha), -P/2); \text{ and}$$

$$J3((P-W)/(2 \tan \alpha), P/2).$$

For example, when P=6.5 mm, ng=1.59, and W=2 mm, these coordinates are J1 (6.8, 0), J2 (2.78, −3.25), and J3 (2.78, 3.25).

However, even within the regions A and B, as the directivity converting portion 33 indicated by broken lines in FIG. 38(a), when the directivity converting portion 33 is provided near the front end J1 of the region B, part of light emitted from the center point source of light 23 reaches a light guide plate body 29 without passing through the directivity converting portion 33. Also, the height of the outer perimeter edge of the directivity converting portion 33 may too high or too deep. Therefore, as depicted in solid lines in FIG. 38(a), as for the largest directivity converting portion 33, it is preferably defined that its outer perimeter edge passes through the front ends J2 and J3 of the regions A. Furthermore, even if the outer perimeter edge of the directivity converting portion 33 passes through the front ends J2 and J3 of the regions A, in the case of $\sin^2\alpha \leq (P-W)/(2P-W)$ [or $ng^2 \geq (2P-W)/(P-W)$], when the length of the directivity converting portion 33 in an arc direction is long, as the directivity converting portion 33 indicated by the solid lines in FIG. 38(a), both ends of the directivity converting portion 33 extend off the regions A and B.

Therefore, in the case of $\sin^2\alpha \leq (P-W)/(2P-W)$, it is preferable that each directivity converting portion 33 be provided at the front of each point source of light 23 as depicted in FIG. 38(b) so that its outer perimeter edge passes though the front ends J2 and J3 of the regions A and the directivity converting portion 33 does not extend off the regions A and B. At this time, the radius r2 from the center of the light emission window 28 to the outer perimeter edge of the directivity converting portion 33 can be represented by the following Equation 12.

$$r2 = \sqrt{\left(\frac{P-W}{2\tan\alpha}\right)^2 + \frac{P^2}{4}} \quad \text{(Equation 12)}$$

found.

The radius r2 of the outer perimeter edge of the directivity converting portion 33 can be set smaller than the value of the above Equation 12 as long as another condition, such as r2>r1, is satisfied. Therefore, in the case of $\sin^2\alpha \leq (P-W)/(2P-W)$, the value indicated by the Equation 12 is taken as an upper limit value of the radius r2 of the outer perimeter edge of the directivity converting portion 33. Therefore, it is enough for the radius r2 to satisfy the following Equation 13.

$$r2 \leq \sqrt{\left(\frac{P-W}{2\tan\alpha}\right)^2 + \frac{P^2}{4}} \quad \text{(Equation 13)}$$

Figure 39:
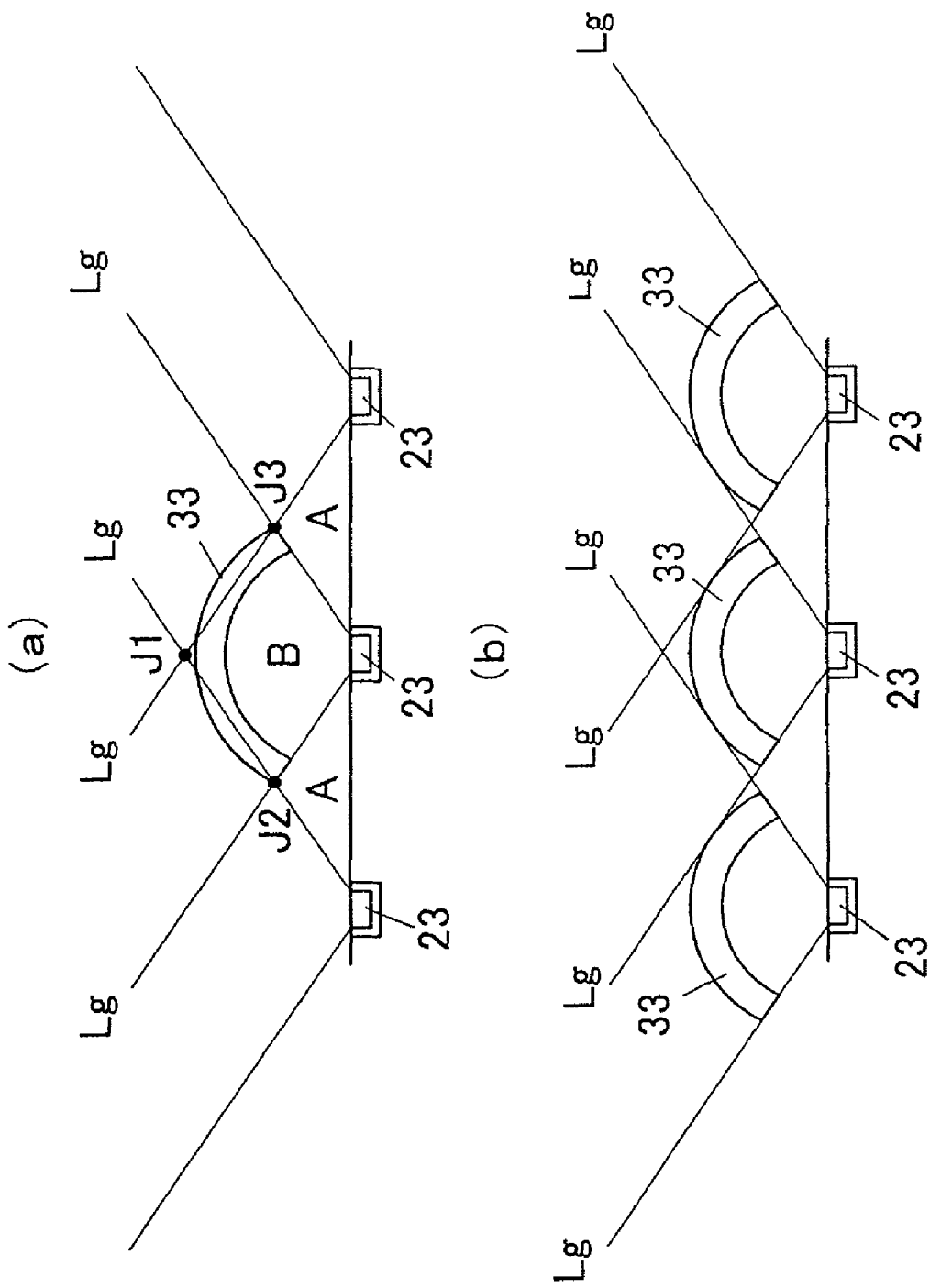
FIG. 39($a$) is a diagram of a trial-and-error arrangement of the directivity converting portion and FIG. 39($b$) is a diagram of a preferred arrangement of the directivity converting portion.

On the other hand, in the case of $\sin^2\alpha \leq (P-W)/(2P-W)$ [or $ng^2 \leq (2P-W)/(P-W)$], if the directivity converting portion 33 is provided so that the outer perimeter edge passes through the front ends J2 and J3 of the regions A, as depicted in FIG. 39(a), the directivity converting portion 33 extends off the regions A and B. Therefore, in this case, as depicted in FIG. 39(b), the outer perimeter edge of the directivity converting portion 33 is required to be decreased until it abuts on edges Lg of the directivity spread. At this time, the radius r2 of the outer perimeter edge is:

$$r2 = \{P-(W/2)\} \cos \alpha \quad \text{(Equation 14)}.$$

Therefore, in the case of $\sin^2\alpha \geq (P-W)/(2P-W)$, it is enough for the radius r2 of the outer perimeter edge of the directivity converting portion 33 to satisfy a condition indicated by the following Equation 15.

$$r2\{P-(W/2)\} \cos \alpha \quad \text{(Equation 15)}$$

Second Embodiment

Figure 40:
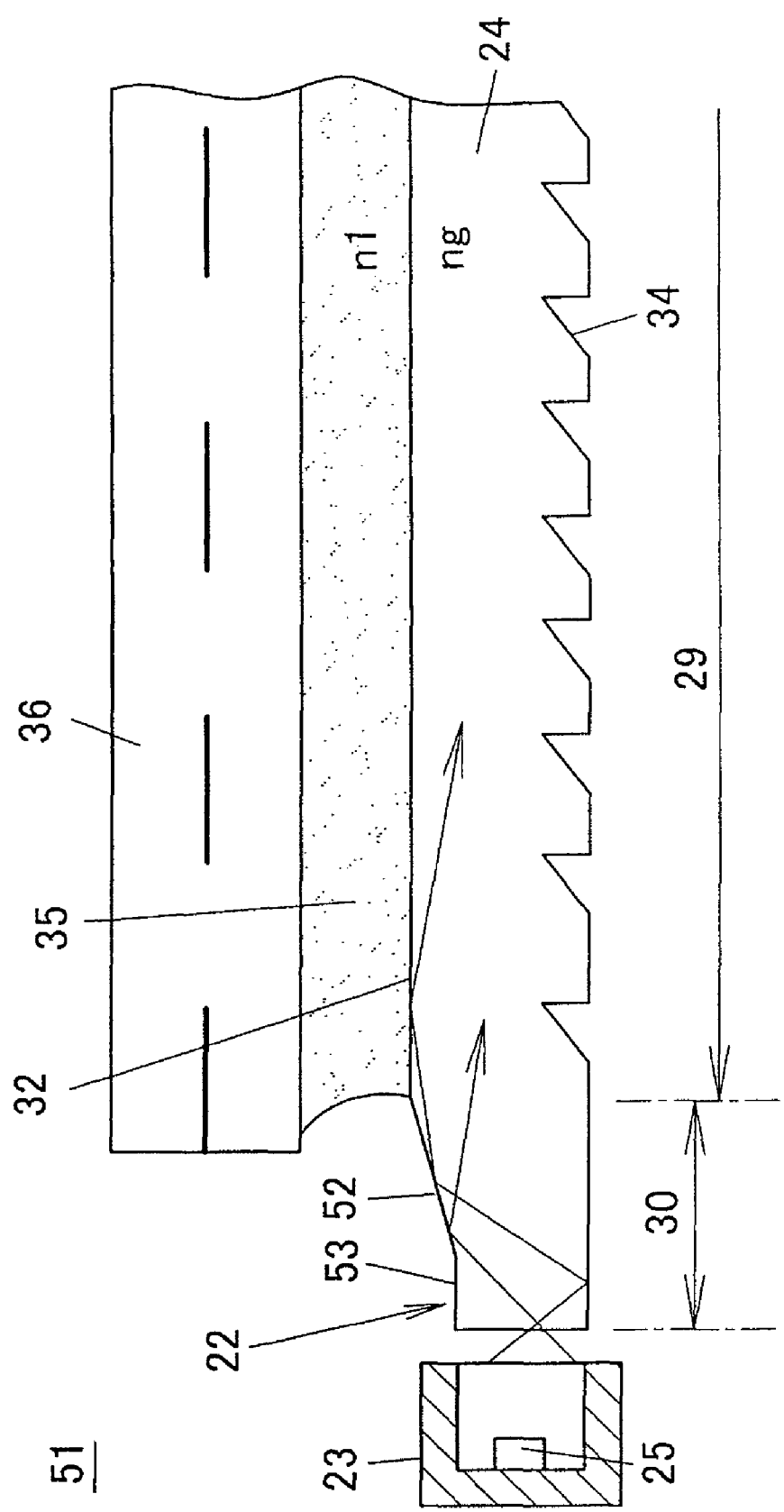
FIG. 40 is a sectional view of a liquid crystal display device according to a second embodiment of the present invention.
Figure 41:
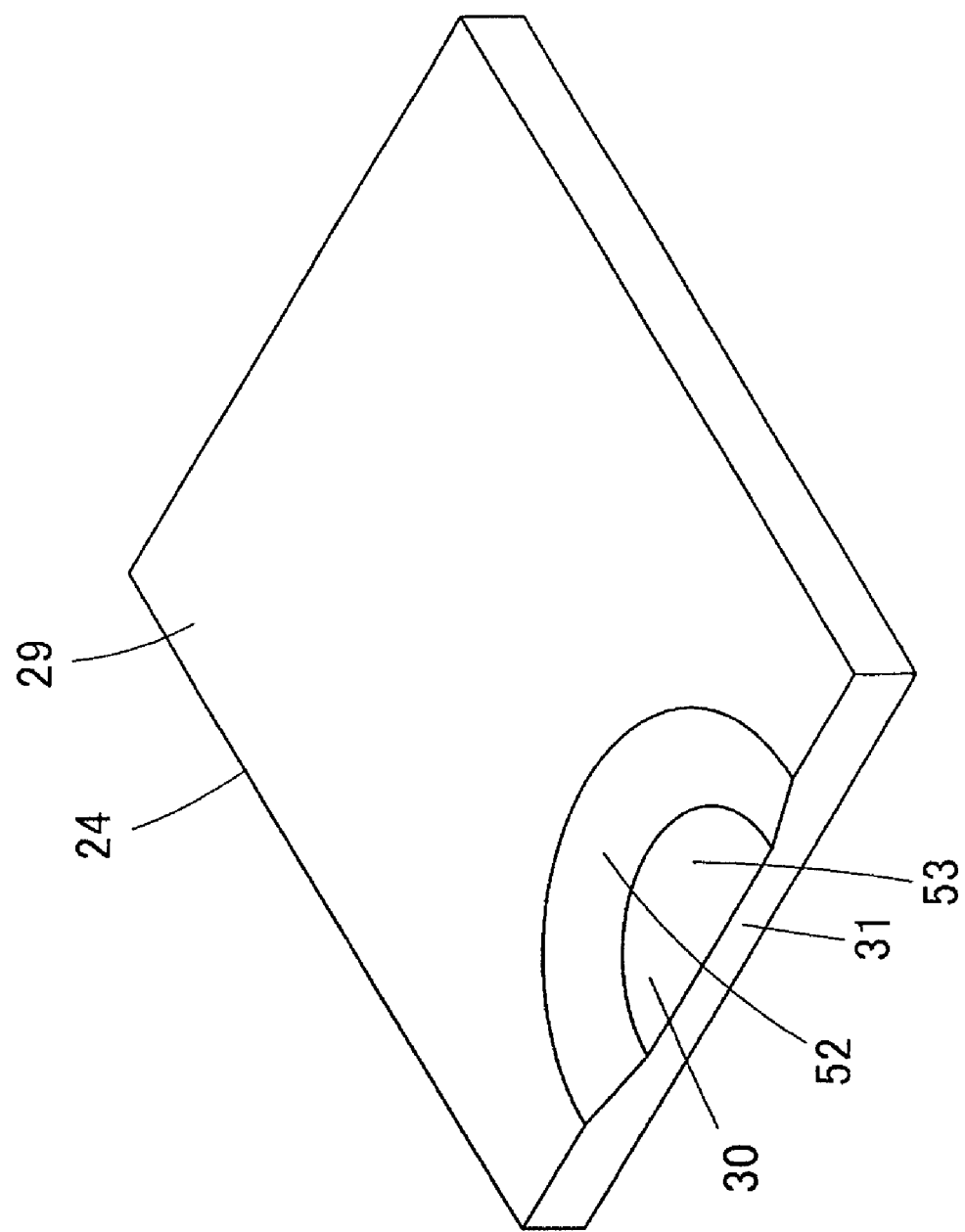
FIG. 41 is a perspective view of a light guide plate for use in the liquid crystal display device according to the second embodiment.

FIG. 40 is a sectional view of a liquid crystal display device 51 according to a second embodiment of the present invention. FIG. 41 is a perspective view of a light guide plate 24 thereof. In the light guide plate 24 for use in the liquid crystal display device 51 of the second embodiment, a light introducing portion 30 is formed of a directivity converting portion 52 formed of a smooth inclined surface and a thin plate portion 53 having a thickness thinner than that of a light guide plate body 29. The directivity converting portion 52 is formed in an arc shape along a region adjacent to the light guide plate body 29 of the light introducing portion 30, and has an inclined surface like a cone inclined down from the surface of the light guide plate body 29 to the surface of the thin plate portion 53. Also, an end face of the thin plate portion 53 serves as a light incident end face 31, to which faces a point source of light 23.

Here, when light entering the inside of the light introducing portion 30 is reflected off the directivity converting portion 52, as depicted in FIG. 40, an angle formed by a direction in which light passes after reflection with respect to a horizontal plane is smaller than an angle formed by light before reflection with respect to the horizontal plane. That is, by being reflected off the directivity converting portion 52, light becomes near parallel to the horizontal plane, and its directivity characteristic becomes narrow in a thickness direction of the light guide plate 24.

K in FIGS. 42(a) and 42(b) represents a target characteristic of the light guide plate body 29 having formed on its surface a connection layer 35. That is, as long as light is within the regions K, light inside the light guide plate body 29 does not pass through the connection layer 35 to leak unless light is reflected off deflection patterns 34. A directivity G1 depicted in FIG. 42(a) represents a directivity of light immediately after entering inside the light guide plate 24. With this light with this directivity G1 being reflected off the directivity converting portion 52, the directivity spread in the thickness direction of the light guide plate 24 becomes narrow. Thus, by making the inclination, length, and others of the directivity converting portion 52 appropriate, the directivity of light reflected off the directivity converting portion 52 is caused to be within the region K, as a directivity G3 depicted in FIG. 42(b), thereby preventing light from leaking from the interface between the light guide plate body 29 and the connection layer 35 and efficiently trapping light inside the light guide plate body 29 for light guide. For example, when the refractive index of the light guide plate 24 is ng=1.59 and the refractive index of the connection layer 35 is n1=1.40, the directivity spread of light reflected off the directivity converting portion 52 in the thickness direction of the light guide plate is set equal to or smaller than ±28°, thereby preventing leakage of light inside the light guide plate body 29.

Also, in the case of the second embodiment, no V-grooved directivity conversion patterns 37 are used, and the directivity converting portion 52 is configured of a smooth inclined surface. Therefore, the directivity of light is only narrowed in the thickness direction, and light hardly spreads horizontally. Thus, when viewed from a direction perpendicular to a light emission surface 32, the course of light inside the light guide plate 24 is linear, which makes light controlled with ease.

As an example of numerical values, the tilt angle of the directivity converting portion 52 is 5.3°, the thickness of the thin plate portion 53 is 0.37 mm, and the thickness of the light guide plate body 29 is 0.52 mm, for example. The length of the thin plate portion 53 in the horizontal direction is 1.66 mm.

First Modification Example of Second Embodiment

Figure 43:
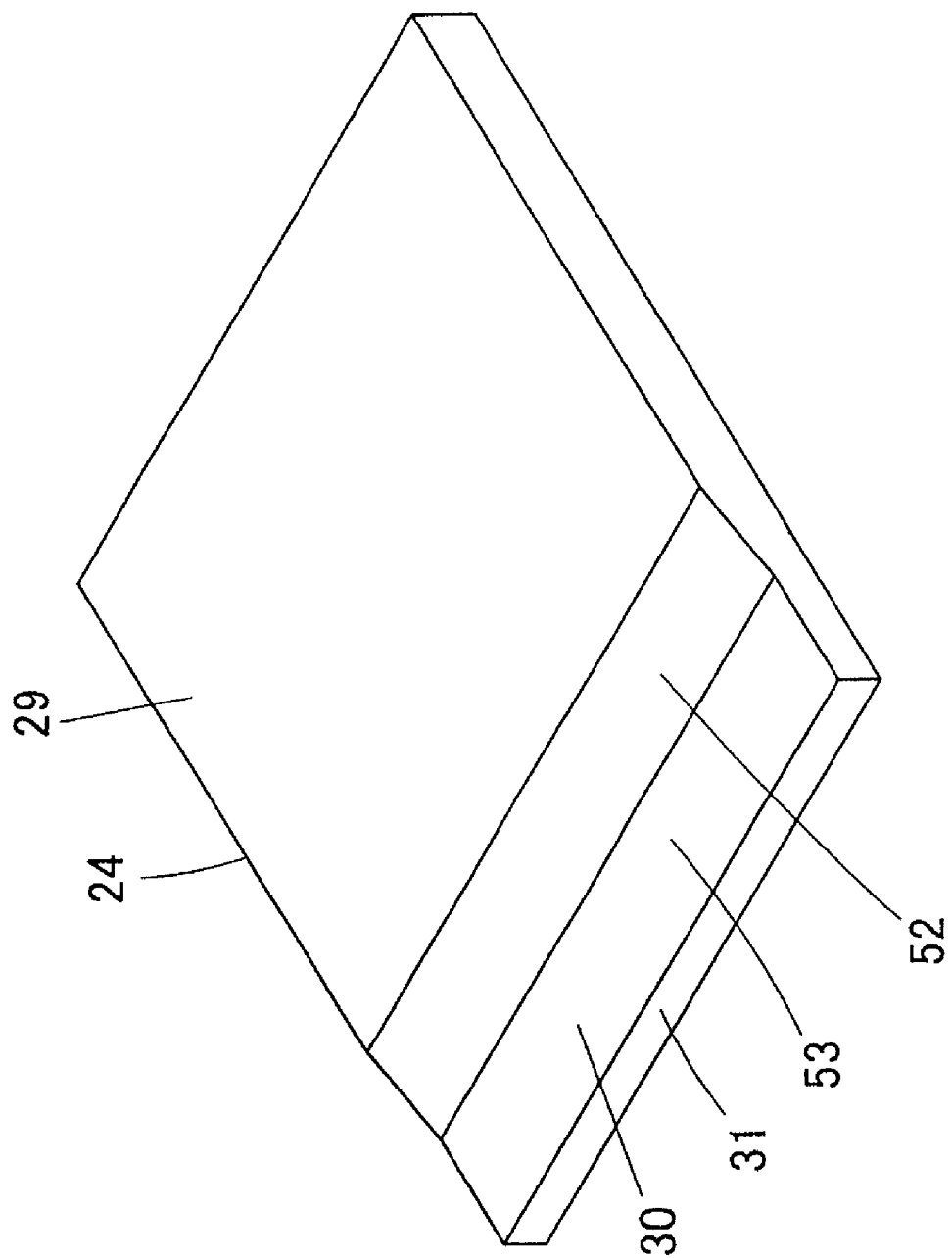
FIG. 43 is a perspective view of the structure of a light guide plate for use in a first modification example of the second embodiment.

FIG. 43 is a perspective view of the structure of a light guide plate 24 for use in a first modification example of the second embodiment. In the second embodiment, the directivity converting portion 52 is formed in an arc shape. In the first modification example, the directivity converting portion 52 formed of a smooth inclined surface is formed linearly. By using this light guide plate 24, directivity in the thickness direction of light reflected off the directivity converting portion 52 can be narrowed. Note that the directivity converting portion 52 may not be provided with the thin plate portion 53 and may start immediately with the light incident end face 31.

Third Embodiment

In a third embodiment, various structures of a connection layer 35 are described. Note that in the third embodiment, the structure of a directivity converting portion 33 is not particularly restricted, and therefore the directivity converting portion 33 is not described or shown herein.

In a mode depicted in FIG. 44(a), the connection layer 35 has a three-layer structure with a low refractive index layer 35b interposed between paired high refractive index layers 35a. The high refractive index layers 35a have a refractive index higher than a refractive index ng of the light guide plate 24, and the low refractive index layer 35b has a refractive index (>1) lower than the refractive index ng of the light guide plate 24.

In a mode depicted in FIG. 44(b), the connection layer 35 has a two-layer structure with the low refractive index layer 35b formed on one high refractive index layer 35a.

In a mode depicted in FIG. 44(c), the connection layer 35 has a two-layer structure with the high refractive index layer 35a formed on the low refractive index layer 35b.

In any of the connection layers 35 of FIGS. 44(a) to 44(c), the connection layer 35 includes the high refractive index layer 35a. However, if the low refractive index layer 35b is included in a multilayer structure, light is totally reflected off the low refractive index layer 35b, and therefore an effect similar to that when only one low refractive index layer 35b is provided can be obtained.

Also, in an embodiment depicted in FIG. 45(a), columnar members 54 having a refractive index lower than that of the light guide plate 24 are arranged so as to be spaced apart from each other between the light guide plate 24 and a liquid crystal display panel 36 to form the connection layer 35. According to this mode, by adjusting the arrangement density of the columnar members 54, a ratio between light to be reflected and light to be caused to pass can be adjusted. Therefore, by adjusting the arrangement of the columnar members 54, luminance of light emission can be made uniform.

In an embodiment depicted in FIG. 45(b), a fine dispersing agent 55 is mixed inside the connection layer 35. When the dispersing agent 55 is mixed into the connection layer 35 for dispersion, the luminance of the liquid crystal display device in a front direction is decreased by the dispersing agent 55, but directivity can be widened as a whole. Therefore, this is effective when a wide angle of visibility is desired, such as in the case where one-segment broadcasting is viewed by a plurality of persons. With dispersion of the dispersing agent 55 in the connection layer 35, moire on the screen can be made hardly viewable, and the pattern of the deflection patterns 34 can be made hardly conspicuous.

In an embodiment depicted in FIG. 46, the connection layer 35 is provided from a light emission surface 32 of the light guide plate body 29 to its back surface. On a front surface side of the light guide plate body 29, the liquid crystal display panel 36 is placed so as to be n intimate contact with an upper surface of the connection layer 35. On a back surface side of the light guide plate body 29, a print layer 56 having a white, silver, or metal gloss is provided on a lower surface of the connection layer 35. In this embodiment, the print layer 56 is used as a substitute for a reflection sheet, and therefore an additional reflection sheet is not required.

Note that in any of the embodiments and modification examples that have been described above, the directivity converting portions 33 and 52 is provided on a front surface side (a light emission surface side) of the light guide plate 24. However, in any of the embodiments and modification examples, the directivity converting portions 33 and 52 can be provided on a back surface side of the light guide plate 24.

Fourth Embodiment

In a surface light source device according to a fourth embodiment of the present invention, a low refractive index layer made of resin having a refractive index lower than that of a light guide plate 24 is formed on either one or both of a light emission side surface and a surface opposite thereto of the light guide plate 24, thereby forming a multilayered light guide plate formed of a plurality of layers as a light guide plate portion.

In an embodiment depicted in FIG. 47(a), a light guide plate 24 is formed of a light introducing portion 30 and a light guide plate body 29, a directivity converting portion 33 is formed on a light emission side surface (an upper surface) of the light introducing portion 30, and deflection patterns 34 are formed on a surface (a lower surface) opposite to the light emission side of the light guide plate body 29. The deflection patterns 34 are formed of micropatterns each in a triangular prism shape, and an inclined surface on the light emission side has a tilt angle on the order of 50°.

On an upper surface of this light guide plate 24, a low refractive index layer 58a is laminated. On a lower surface of the light guide plate 24, a low refractive index layer 58b is laminated. The light guide plate 24 and the low refractive index layers 58a and 58b form a multilayered light guide plate 57a. The low refractive index layers 58a and 58b and the light guide plate 24 are in intimate contact with each other at their interface without intervention of an air layer. The low refractive index layers 58a and 58b are formed by using a UV-cured resin having a refractive index smaller than the refractive index of the light guide plate 24. For example, on the surface of the light guide plate 24 made of a polycarbonate resin (PC), the low refractive index layers 58a and 58b are molded by using UV-curable polymethyl methacrylate (PMMA) having a refractive index lower than that of the light guide plate 24. Furthermore, the low refractive index layer 58a on the light emission side is subjected to a light diffusion process for diffusing passing light. As a light diffusion process, for example, as depicted in FIG. 47(a), many fine asperity portions 59 may be provided on the surface of the low refractive index layer 58a, or fine particles dispersed in the resin of the low refractive index layer 58a and having a refractive index different from that of the low refractive index layer 58a may be provided. The low refractive index layer 58b positioned on a side opposite to the light emission side is not particularly required, and can be omitted.

Note that although the directivity converting portion 33 may be provided on a light guide plate 24 side at the interface between the light guide plate 24 and the low refractive index layer 58a as indicated by a solid line in FIG. 47(a), the directivity converting portion 33 may be provided on a low refractive index layer 58a side at the interface between the light guide plate 24 and the low refractive index layer 58a as indicated by a broken line in FIG. 47(a). Also, the directivity converting portion 33 may be provided on a light guide plate 24 side at the interface between an opposite surface of the light guide plate 24 on a light emission side and the low refractive index layer 58b as indicated by a solid line in FIG. 47(b), or the directivity converting portion 33 may be provided on a low refractive index layer 58b side at the interface between the opposite surface of the light guide plate 24 on the light emission side and the low refractive index layer 58b as indicated by a broken line in FIG. 47(b).

When the refractive index of the light guide plate 24 is ng=1.59 and the refractive index of the low refractive index layer 58a is n1=1.49, the directivity spread of light immediately after entering the light guide plate 24 is ±39°. Thus, when the light guide plate 24 without the presence of a directivity converting portion 33 is used, of light entering the low refractive index layer 58a, light travelling at an angle of −20.4° to +20.4° with respect to a horizontal direction is totally reflected and is introduced into the light guide plate 24. However, light traveling at an angle smaller than −20.4° or light travelling at an angle larger than +20.4° pass through the low refractive index layer 58a for diffusion to the outside, thereby worsening in-plane luminance unevenness of the liquid crystal display screen. By contrast, with the directivity converting portion 33 provided to the light guide plate 24, light directivity of passing through the low refractive index layer 58a to leak is converted to be narrowed, and then light can be caused to re-enter the light guide plate 24. Therefore, worsening of in-plane luminance unevenness of the liquid crystal display screen can be prevented, the number of components can be reduced by the multilayered structure with the low refractive index layers 58a and 58b, and the multilayered light guide plate 57a can be slimmed down.

First Modification Example of Fourth Embodiment

FIG. 48 is a schematic sectional view of a multilayered light guide plate 57b in a first modification example of the fourth embodiment. In this modification example, a low refractive index layer 58a is not subjected to a light diffusion process, and a diffusion layer 60a is laminated on an upper surface of the low refractive index layer 58a. The diffusion layer 60a is in intimate contact with the upper surface of the low refractive index layer 58a without intervention of an air layer. The diffusion layer 60a is to diffuse passing light. For example, D11 manufactured by Tsujiden Co., Ltd. (a haze of 74.5%) can be used and a film can be formed on the upper surface of the low refractive index layer 58a by spin coating. Even with the above-structured multilayered light guide plate 57b, an effect similar to that of the multilayered light guide plate 57a of the fourth embodiment can be obtained. Note that a directivity converting portion 33 may be provided at the interface between an upper surface of a light guide plate 24 and the low refractive index layer 58a, or may be provided at the interface between a lower surface of the light guide plate 24 and the low refractive index layer 58b (the same goes for the following second to fourth modification examples).

Second Modification Example of Fourth Embodiment

FIG. 49 is a schematic sectional view of a multilayered light guide plate 57c according to a second modification example of the fourth embodiment. In this modification example, a diffusion layer 60a is laminated on an upper surface of a low refractive index layer 58a not subjected to a light diffusion process, and a light gathering layer 60b is further laminated on an upper surface of the diffusion layer 60a. The diffusion layer 60a is in intimate contact with the upper surface of the low refractive index layer 58a without intervention of an air layer, and the light gathering layer 60b is also in intimate contact with the upper surface of the diffusion layer 60a without intervention of an air layer. As the diffusion layer 60a, for example, D11 manufactured by Tsujiden Co., Ltd. (a haze of 74.5%) can be used. Also, as the light gathering layer 60b, a component that narrows directivity of light passing therethrough can be used, such as BEF (a prism sheet having a vertical angle of 90°) manufactured by Sumitomo 3M Limited.

Third Modification Example of Fourth Embodiment

FIG. 50 is a schematic sectional view of a multilayered light guide plate 57d according to a third modification example of the fourth embodiment. In this modification example, a light gathering layer 60b is laminated on an upper surface of a low refractive index layer 58a not subjected to a light diffusion process, and a diffusion layer 60a is further laminated on an upper surface of the light gathering layer 60b. The light gathering layer 60b is in intimate contact with the upper surface of the low refractive index layer 58a without intervention of an air layer, and the diffusion layer 60a is also in intimate contact with the upper surface of the light gathering layer 60b without intervention of an air layer. As the diffusion layer 60a, for example, D11 manufactured by Tsujiden Co., Ltd. (a haze of 74.5%) can be used. Also, as the light gathering layer 60b, for example, BEF (a prism sheet having a vertical angle of 90°) manufactured by Sumitomo 3M Limited can be used.

Fourth Modification Example of Fourth Embodiment

FIG. 51 is a schematic sectional view of a multilayered light guide plate 57e according to a fourth modification example of the fourth embodiment. In this modification example, a reflecting layer 60c is laminated on a lower surface of a low refractive index layer 58b formed on a surface on a side opposite to a light emission side of the light guide plate 24. The reflecting layer 60c is in intimate contact with the lower surface of the low refractive index layer 58b without intervention of an air layer. As the reflecting layer 60c, a metal-evaporated film of Ag, Au, or others, a white or silver print layer, a print layer having metal gloss, or others can be used. Note that any of the layer structures on a light emission side on the upper surface of the light guide plate 24 in the fourth embodiment and its first to third modification examples can be used.

Fifth Embodiment

FIG. 52 is a schematic sectional view of a liquid crystal display device 61 according to a fifth embodiment of the present invention. In this liquid crystal display device 61, the connection layer 35 is not used between a light guide plate body 29 and a liquid crystal display panel 36 of a surface light source device 22. That is, the light guide plate body 29 and the liquid crystal display panel 36 face each other via an air layer. While the liquid crystal display device of one or more embodiments of the present invention is useful when the light guide plate body 29 is brought in intimate contact with the back surface of the liquid crystal display panel 36 via a connection layer, the device is also useful as will be described below when the connection layer 35 is not used.

In a surface light source device 22 depicted in FIG. 52, a directivity converting portion 33 is provided on a back surface side of a light guide plate 24, but may be provided on a front surface side. Other structure is the same as the structure described in the first embodiment. With the same structure as in the first embodiment, when the refractive index of the light guide plate 24 was ng=1.59, the directivity spread of light entering a light introducing portion 30 was ±39°. Then, when this light passes through the directivity converting portion 33, the directivity spread of light entering the light guide plate body 29 was approximately ±28°. The light having a spread of ±28° enters deflection patterns 34 (in the following, the angle of a reflection surface of each deflection pattern 34 is assumed to be 50°. Here, the angle of a reflection surface of each deflection pattern 34 is an angle of the reflection surface with the back surface of the light guide plate 24) and is reflected off the deflection patterns 34, the light is emitted from a light emission surface 32 to the outside. Light in a direction smaller than −1° passes through the deflection patterns 34 to leak from the back surface. Thus, the range of light to be reflected off the deflection patterns 34 and be emitted from the light emission surface 32 (light before reflected off the deflection patterns 34) is, as depicted in FIG. 53(a), −1° to +28° with reference to an X-axis direction. When this light of −1° to 28° is reflected off the deflection patterns 34 and emitted from the light emission surface 32 to the outside, the spread of the emitted light is −18° to +30° as depicted in FIG. 53(c) with reference to a Z-axis direction.

By contrast, when the directivity converting portion 33 is not provided (comparative example), the light with a spread of ±39° entering the light introducing portion 30 enters the inside of the light guide plate body 29 as it is. Therefore, the directivity spread of light inside the light guide plate body 29 is ±39°. And, because light in a direction equal to or smaller than −1° is not reflected off the deflection patterns 34, the range of light to be reflected off the deflection patterns 34 and be emitted from the light emission surface 32 (light before reflected off the deflection patterns 34) is, as depicted in FIG. 53(b), −1° to +39° with reference to the X-axis direction. When this light of −1° to 39° is reflected off the deflection patterns 34 and emitted from the light emission surface 32 to the outside, the spread of the emitted light is −18° to +50° as depicted in FIG. 53(d) with reference to the Z-axis direction.

In comparison between the directivity spread when the directivity converting portion 33 is provided depicted in FIGS. 53(a) and 53(c) and the directivity spread when the directivity converting portion 33 is not provided depicted in FIGS. 53(b) and 53(d), it can be found that the directivity of light emitted from the light emission surface 32 can be narrowed by providing the directivity converting portion 33. Furthermore, in the case of not providing the directivity converting portion 33, as evident from FIG. 53(d), the range of light emitted from the light emission surface 32 is greatly shifted to a side opposite to the point source of light. In the case of providing the directivity converting portion 33, as can be seen from FIG. 53(c), a difference between the spread of light emitted to a light source side and the spread of light emitted to a side opposite to the light source is small, and directivity of light emitted from the light emission surface 32 is approximately symmetrical. As a result, in this liquid crystal display device 61, even when a point source of light 23 is provided only on one side of the light guide plate 24, the image viewable range is symmetrical, and the appearance of the screen is improved.

Sixth Embodiment

FIG. 54 is a schematic sectional view of a liquid crystal display device 71 according to a sixth embodiment of the present invention. In this embodiment, a low refractive index layer 72 having a refractive index smaller than that of a light guide plate 24 is provided on an upper surface of a light introducing portion 30 without a directivity converting portion. In the depicted example, a layer identical to a connection layer 35 is applied onto the upper surface of the light introducing portion 30 as the low refractive index layer 72. However, the connection layer 35 and the low refractive index layer 72 may have different refractive indexes. Furthermore, on an upper surface of the low refractive index layer 72, a light absorbing layer 73 (light-guide inhibiting means) is provided, such as a black film or a black coating.

Thus, in this liquid crystal display device 71, light passing through the interface between the light guide plate 24 and the low refractive index layer 72 to enter the inside of the low refractive index layer 72 impinges on the light absorbing layer 73 to be absorbed. As a result, directivity of light entering a light guide plate body 29 is narrowed.

A specific description is made as follows. When the refractive index of the light guide plate 24 is ng=1.59 and the refractive index of the low refractive index layer 72 is n1=1.4, the directivity spread of light immediately after entering the light introducing portion 30 is ±39°. Also, at the interface between the light introducing portion 30 and the low refractive index layer 72, light traveling in a direction at an angle smaller than 28° with respect to a horizontal direction is totally reflected, and light traveling at an angle larger than 28° passes through the inside of the low refractive index layer 72 and is then absorbed by the light absorbing layer 73. Thus, of light in a range of −39° to +39°, light of −39° to −28° and light of 28° to 39° enter the inside of the low refractive index layer 72 and are absorbed by the light absorbing layer 73. Thus, only light of −28° to +28° travels to the light guide plate body 29. As a result inside the light guide plate body 29, directivity of light is narrowed down to ±28°.

Modification Example of Sixth Embodiment

FIG. 55 depicts a modification example of the sixth embodiment, in which a light scattering layer 75, such as a diffusion sheet or a prism sheet, is provided on an upper surface of the low refractive index layer 72 in place of the light absorbing layer 73. Light reaching the light scattering layer 75 is scattered outward so as not to re-enter the inside of the light guide plate 24.

The invention claimed is:

1. A surface light source device comprising:
a point source of light; and
a light guide plate provided at a position facing the point source of light and causing light from the point source of light to be introduced from a light incident end face and be emitted from a light emission surface to outside,
wherein the light guide plate comprises a light guide substrate formed of a transparent or translucent material provided with a directivity converting portion and light emitting means,
wherein the light guide substrate is integrally configured with a light introducing portion provided at a position facing the point source of light and a light guide plate body including the light emission surface from which light introduced from the light introducing portion is emitted to outside,
wherein the light guide plate body has a thickness equal to or larger than a minimum thickness of the light introducing portion in the light guide substrate,
wherein, on a surface of the light guide substrate on a light emission side or a surface thereof on a side opposite thereto, the light introducing portion is flatly continuous from a portion of the light introducing portion having a thickness equal to a thickness of the light guide plate body toward an end edge of the light introducing portion side of the light guide plate body, or is continuous with an inclined surface from a portion of the light introducing portion having a thickness smaller than the thickness of the light guide plate body toward the end edge of the light introducing portion side of the light guide plate body,
wherein the directivity converting portion traps light entering the light introducing portion from the light incident end face inside the light guide plate by narrowing a directivity spread of the light entering the light introducing portion in a thickness direction of the light guide substrate, and is formed on a surface of the light introducing portion on a light emission side or a surface thereof on a side opposite thereto, and
wherein the light emitting means emits the light trapped inside the light guide plate body from the light emission surface to outside, and is formed in the light guide plate body.

2. A surface light source device comprising:
a point source of light; and
a light guide plate provided at a position facing the point source of light and causing light from the point source of light to be introduced from a light incident end face and be emitted from a light emission surface to outside,
wherein the light guide plate comprises a light guide substrate formed of a transparent or translucent material provided with a directivity converting portion and light emitting means,
wherein the light guide substrate is integrally configured with a light introducing portion provided at a position facing the point source of light and a light guide plate body including the light emission surface from which light introduced from the light introducing portion is emitted to outside,
wherein the light guide plate body has a thickness equal to or larger than a minimum thickness of the light introducing portion in the light guide substrate,
wherein, on a surface of the light guide substrate on a light emission side or a surface thereof on a side opposite thereto, the light introducing portion is flatly continuous from a portion of the light introducing portion having a thickness equal to a thickness of the light guide plate body toward an end edge of the light introducing portion side of the light guide plate body, or is continuous with an inclined surface from a portion of the light introducing portion having a thickness smaller than the thickness of the light guide plate body toward the end edge of the light introducing portion side of the light guide plate body,
wherein the directivity converting portion is configured of a plurality of patterns extending from a side close to the point source of light to a direction away from the point source of light, and is formed in a region of the light introducing portion parallel to the light emission surface, and
wherein the light emitting means emits the light trapped inside the light guide plate body from the light emission surface to outside, and is formed in the light guide plate body.

3. The surface light source device according to claim 1, wherein the directivity converting portion is configured of a plurality of V-grooved directivity conversion patterns.

4. The surface light source device according to claim 3, wherein
in a cross section perpendicular to a ridgeline of a mountain-shaped portion formed by adjacent ones of the directive conversion patterns, a vertical angle of the mountain-shaped portion is equal to or larger than 107° and equal to or smaller than 154°.

5. The surface light source device according to claim 1, wherein
the directivity converting portion is configured of a plurality of directivity conversion patterns radially arranged centering on the point source of light or a position near the point source of light.

6. The surface light source device according to claim 1, wherein
when viewed from a direction perpendicular to the light emission surface of the light guide plate, an angle formed between a direction extending from an arbitrary point of an edge on a side of the directivity converting portion near the point source of light to one end of a light emission window of the point source of light and a direction extending from the arbitrary point to a center of the light emission window is equal to or smaller than 32°, and an angle formed between a direction extending from the arbitrary point of the edge on the side of the directivity converting portion near the point source of light to another end of the light emission window of the point source of light and a direction extending from the arbitrary point to the center of the light emission window is equal to or smaller than 32°.

7. The surface light source device according to claim 1, wherein in the surface light source device having a plurality of the point sources of light arranged along an end edge of the light guide plate, when a direction passing through a center of any one of the point sources of light and being perpendicular to the end edge of the light guide plate when viewed from a direction perpendicular to the light emission surface of the light guide plate is defined as an X axis, and a Y axis is defined along the end edge of the light guide plate, the directivity converting portion corresponding to the point source of light is positioned inside a region simultaneously satisfying the following three equations:

$X > 0$ $X \leq \{-2Y+(2P-W)\}/(2 \tan \alpha)$ $X \leq \{2Y+(2P-W)\}/(2 \tan \alpha)$ (where
P: a distance between the point sources of light
W: a width of the light emission window of the point source of light
α: an angle represented by $\alpha = \arcsin(1/ng)$, where a refractive index of the light guide plate is ng).

8. The surface light source device according to claim 1, wherein the light introducing portion takes an inclined surface inclined from a surface of the light introducing portion to a surface of the light guide plate body as the directivity converting portion, and the inclined surface is formed in a region of the light introducing portion adjacent to the light guide plate body on a surface on a light emission surface side of the light guide plate or an opposite surface thereof, and a region of the light introducing portion other than the region where the inclined surface is formed has a thickness thinner than a thickness of the light guide plate body.

9. The surface light source device according to claim 1, wherein a surface of the light guide plate on a light emission surface side and/or a surface thereof opposite thereto is covered so as to be in intimate contact with a low refractive index layer having a refractive index smaller than a refractive index of the light guide plate.

10. The surface light source device according to claim 1, wherein the light emitting means of the light guide plate is formed on a surface of the light guide plate on a side opposite to the light emission surface with a pattern having at least one flat surface on the light incident end face side, and in the light emitting means, an average tilt angle θx* of angles each formed between the flat surface and a surface parallel to the light emission surface of the light guide plate is equal to or larger than 35° and equal to or smaller than 70°, and a tilt angle formed between the flat surface of each light emitting means and the surface parallel to the light emission surface of the light guide plate is in a range of θx*±10°.

11. A liquid crystal display device formed of the surface light source device according to claim 1, a liquid crystal display panel, and at least one connection layer interposed at least between the light guide plate body of the surface light source device and the liquid crystal display panel and bringing the light guide plate body into intimate contact with the liquid crystal display panel, wherein any of refractive indexes of the connection layers is lower than a refractive index of the light guide plate body.

12. The surface light source device according to claim 2, wherein the directivity converting portion is configured of a plurality of V-grooved directivity conversion patterns.

13. The surface light source device according to claim 12, wherein in a cross section perpendicular to a ridgeline of a mountain-shaped portion formed by adjacent ones of the directive conversion patterns, a vertical angle of the mountain-shaped portion is equal to or larger than 107° and equal to or smaller than 154°.

14. The surface light source device according to claim 2, wherein the directivity converting portion is configured of a plurality of directivity conversion patterns radially arranged centering on the point source of light or a position near the point source of light.

15. The surface light source device according to claim 2, wherein when viewed from a direction perpendicular to the light emission surface of the light guide plate, an angle formed between a direction extending from an arbitrary point of an edge on a side of the directivity converting portion near the point source of light to one end of a light emission window of the point source of light and a direction extending from the arbitrary point to a center of the light emission window is equal to or smaller than 32°, and an angle formed between a direction extending from the arbitrary point of the edge on the side of the directivity converting portion near the point source of light to another end of the light emission window of the point source of light and a direction extending from the arbitrary point to the center of the light emission window is equal to or smaller than 32°.

16. The surface light source device according to claim 2, wherein in the surface light source device having a plurality of the point sources of light arranged along an end edge of the light guide plate, when a direction passing through a center of any one of the point sources of light and being perpendicular to the end edge of the light guide plate when viewed from a direction perpendicular to the light emission surface of the light guide plate is defined as an X axis, and a Y axis is defined along the end edge of the light guide plate, the directivity converting portion corresponding to the point source of light is positioned inside a region simultaneously satisfying the following three equations:

$$X > 0$$

$$X \leq \{-2Y+(2P-W)\}/(2 \tan \alpha)$$

$$X \leq \{2Y+(2P-W)\}/(2 \tan \alpha)$$

(where

P: a distance between the point sources of light

W: a width of the light emission window of the point source of light

α: an angle represented by $\alpha = \arcsin(1/ng)$, where a refractive index of the light guide plate is ng).

17. The surface light source device according to claim 2, wherein a surface of the light guide plate on a light emission surface side and/or a surface thereof opposite thereto is covered so as to be in intimate contact with a low refractive index layer having a refractive index smaller than a refractive index of the light guide plate.

18. The surface light source device according to claim 2, wherein the light emitting means of the light guide plate is formed on a surface of the light guide plate on a side opposite to the light emission surface with a pattern having at least one flat surface on the light incident end face side, and in the light emitting means, an average tilt angle θx* of angles each formed between the flat surface and a surface parallel to the light emission surface of the light guide plate is equal to or larger than 35° and equal to or smaller than 70°, and a tilt angle formed between the flat surface of each light emitting means and the surface parallel to the light emission surface of the light guide plate is in a range of θx*±10°.

19. A liquid crystal display device formed of the surface light source device according to claim 2, a liquid crystal display panel, and at least one connection layer interposed at least between the light guide plate body of the surface light source device and the liquid crystal display panel and bringing the light guide plate body into intimate contact with the liquid crystal display panel, wherein any of refractive indexes of the connection layers is lower than a refractive index of the light guide plate body.

* * * * *